(12) United States Patent
Zhang et al.

(10) Patent No.: US 12,143,337 B2
(45) Date of Patent: Nov. 12, 2024

(54) METHOD AND APPARATUS FOR MEASURING INTERFERENCE, FEEDING BACK DEMODULATION RELATED INFORMATION AND SCHEDULING TERMINALS, CHANNEL SWITCHING, AND INTERFERENCE PROCESSING

(71) Applicant: Samsung Electronics Co., Ltd., Gyeonggi-do (KR)

(72) Inventors: Chuang Zhang, Beijing (CN); Chen Qian, Beijing (CN); Di Su, Beijing (CN); Peng Lin, Beijing (CN); Bin Yu, Beijing (CN)

(73) Assignee: Samsung Electronics Co., Ltd (KR)

( * ) Notice: Subject to any disclaimer, the term of this patent is extended or adjusted under 35 U.S.C. 154(b) by 463 days.

(21) Appl. No.: 17/604,234

(22) PCT Filed: Apr. 20, 2020

(86) PCT No.: PCT/KR2020/005220
§ 371 (c)(1),
(2) Date: Oct. 15, 2021

(87) PCT Pub. No.: WO2020/214007
PCT Pub. Date: Oct. 22, 2020

(65) Prior Publication Data
US 2022/0216976 A1    Jul. 7, 2022

(30) Foreign Application Priority Data

Apr. 18, 2019  (CN) .......................... 201910311687.3
Jul. 12, 2019  (CN) .......................... 201910629952.2
(Continued)

(51) Int. Cl.
*H04L 5/00*         (2006.01)
*H04B 17/24*        (2015.01)
(Continued)

(52) U.S. Cl.
CPC ........... *H04L 5/0073* (2013.01); *H04B 17/24* (2015.01); *H04B 17/327* (2015.01);
(Continued)

(58) Field of Classification Search
CPC ..... H04L 5/0073; H04B 17/24; H04B 17/327; H04B 17/345; H04W 72/23; H04W 72/541
See application file for complete search history.

(56) References Cited

U.S. PATENT DOCUMENTS

2010/0120446 A1    5/2010  Gaal
2013/0010634 A1*   1/2013  Lim ..................... H04L 1/0026
                                                        370/252
(Continued)

FOREIGN PATENT DOCUMENTS

EP         3 429 107          1/2019

OTHER PUBLICATIONS

PCT/ISA/210 Search Report issued on PCT/KR2020/005220, Jul. 23, 2020, pp. 3.
(Continued)

*Primary Examiner* — Sharmin Chowdhury
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety
(Continued)

services. The present disclosure provides a method of measuring interference and a corresponding device. The method of measuring interference includes: receiving a downlink reference signal from abase station; based on a received downlink reference signal of a first category, acquiring interference strength information of co-channel interference or self-interference caused by a user equipment (UE), which performs uplink transmission on a time frequency resource where the received downlink reference signal of the first category is transmitted, to a current user equipment, or information for the base station to acquire the interference strength information of the co-channel interference or the self-interference; and reporting the acquired interference strength information or the acquired information for the base station to acquire the interference strength information to the base station, wherein the downlink reference signal of the first category is: a downlink reference signal transmitted on a time frequency resource with scheduled uplink transmission. According to the method of measuring interference and the corresponding device, interference strength of co-channel interference between UEs or self-interference of a user equipment can be measured accurately. The present disclosure provides a method and apparatus for a first terminal to transmit information on demodulation failure to a base station in a wireless communication system, and a method and apparatus for a base station to schedule uplink transmission based on the fed back information on demodulation failure. The method for the first terminal includes: receiving and demodulating data from the base station; determining at least one demodulation failure reason respectively associated with at least one second terminal causing inter-terminal interference to the first terminal, when demodulation of the data fails; generating information on demodulation failure based on the determined at least one demodulation failure reason; and transmitting the information on demodulation failure to the base station. The application relates to a method, a base station (BS), a user equipment (UE) and a system thereof for channel switching. The method includes: receiving, from the UE, information indicating that the UE has a full-duplex communication capability; transmitting, to the UE, control signaling notifying the UE to activate the full-duplex communication capability; and scheduling full-duplex transmission for the UE after the UE completes initialization of a self-interference cancellation module, wherein, the base station further configures a full-duplex mode timer and notifies the UE of configuration of the full-duplex mode timer. The present disclosure provides a base station, an apparatus and operation methods thereof for performing interference processing in a wireless communication system. The base station is configured to allocate resources for a plurality of apparatuses communicating with the base station based on a level of inter-apparatus interference among the plurality of apparatuses; and to indicate the allocated resources to the plurality of apparatuses. The apparatus is configured to acquire, from a base station, resources allocated for the apparatus by the base station based on a level of inter-apparatus interference among a plurality of apparatuses communicating with the base station; and to communicate based on the allocated resources.

16 Claims, 25 Drawing Sheets

(30) Foreign Application Priority Data

Jul. 15, 2019 (CN) .......................... 201910634910.8
Dec. 3, 2019 (CN) .......................... 201911223439.X

(51) Int. Cl.
*H04B 17/327* (2015.01)
*H04B 17/345* (2015.01)
*H04W 72/23* (2023.01)
*H04W 72/541* (2023.01)

(52) U.S. Cl.
CPC .......... *H04B 17/345* (2015.01); *H04W 72/23* (2023.01); *H04W 72/541* (2023.01)

(56) References Cited

U.S. PATENT DOCUMENTS

| | | | |
|---|---|---|---|
| 2013/0044621 A1 | 2/2013 | Jung et al. | |
| 2013/0201854 A1* | 8/2013 | Cosimini | H04W 24/02 370/252 |
| 2016/0044689 A1* | 2/2016 | Wen | H04W 72/541 370/330 |
| 2016/0127114 A1 | 5/2016 | Kim et al. | |
| 2018/0132125 A1* | 5/2018 | Li | H04W 24/10 |
| 2018/0159669 A1 | 6/2018 | Chung et al. | |
| 2018/0323887 A1 | 11/2018 | Azarian Yazdi et al. | |
| 2019/0052450 A1 | 2/2019 | Fodor et al. | |
| 2019/0116602 A1* | 4/2019 | Zhang | H04W 72/0446 |
| 2019/0260543 A1* | 8/2019 | Gong | H04L 27/2607 |
| 2020/0067614 A1* | 2/2020 | Wang | H04J 11/0056 |
| 2020/0220585 A1* | 7/2020 | John Wilson | H04L 5/0053 |
| 2021/0136699 A1* | 5/2021 | Scholand | H04W 4/40 |
| 2021/0153043 A1* | 5/2021 | Gao | H04L 5/0048 |

OTHER PUBLICATIONS

PCT/ISA/237 Written Opinion issued on PCT/KR2020/005220, Jul. 23, 2020, pp. 8.
European Search Report dated Mar. 31, 2022 issued in counterpart application No. 20790608.2-1205, 11 pages.
European Search Report dated Sep. 9, 2024 issued in counterpart application No. 20790608.2-1206, 8 pages.

\* cited by examiner

[Fig. 1]
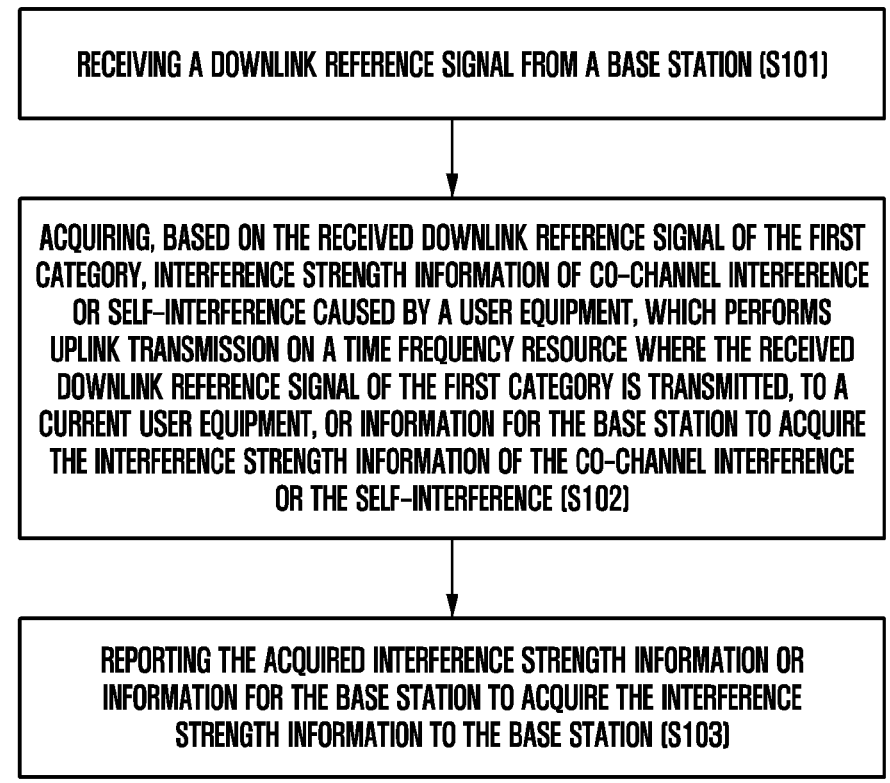
[Fig. 2]
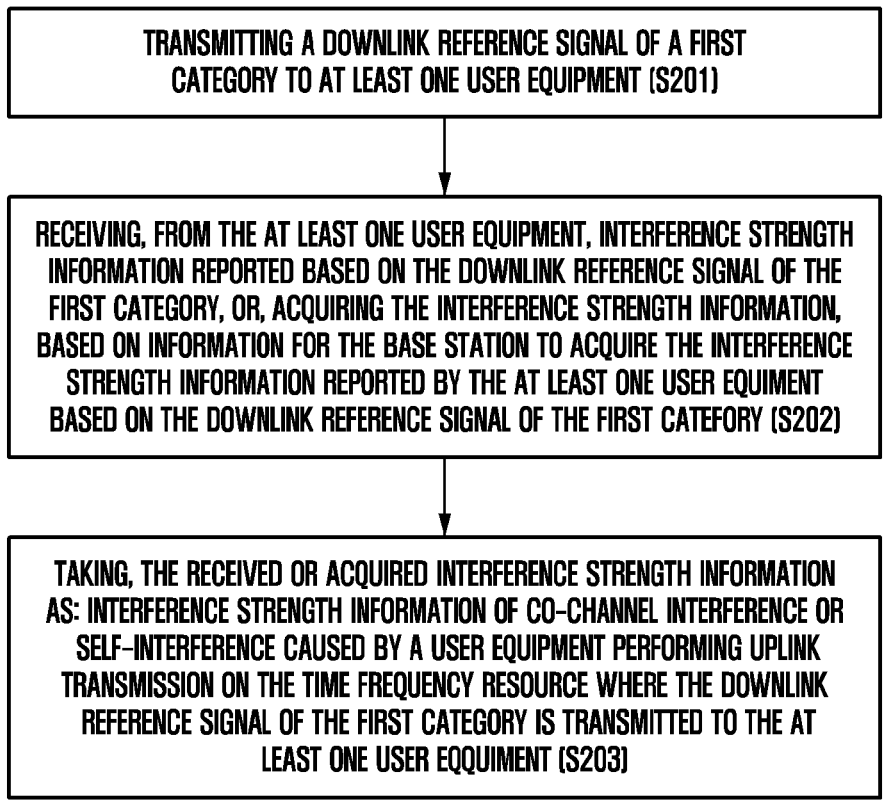

[Fig. 3]
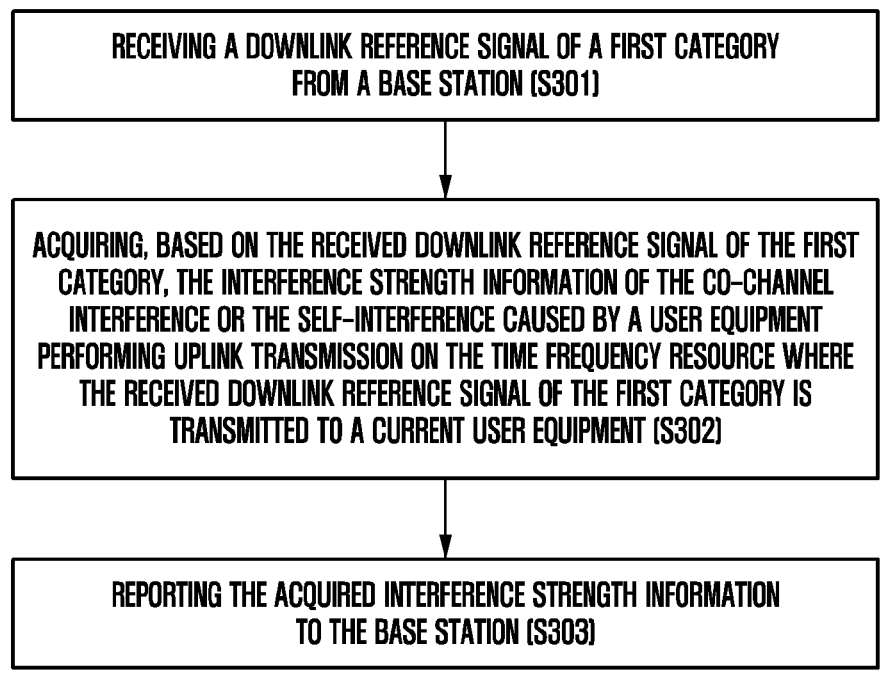

[Fig. 5]
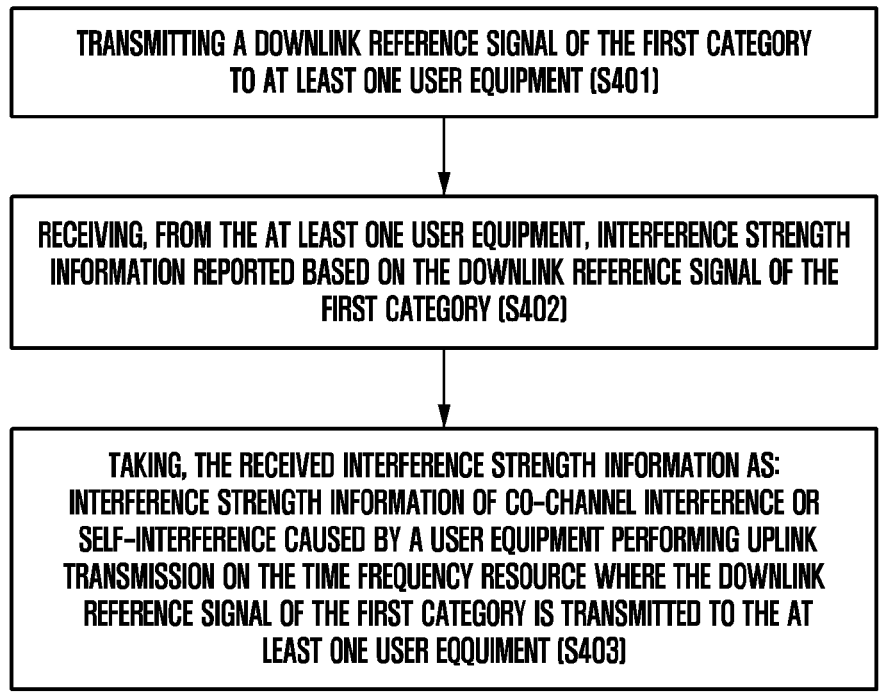
[Fig. 6]
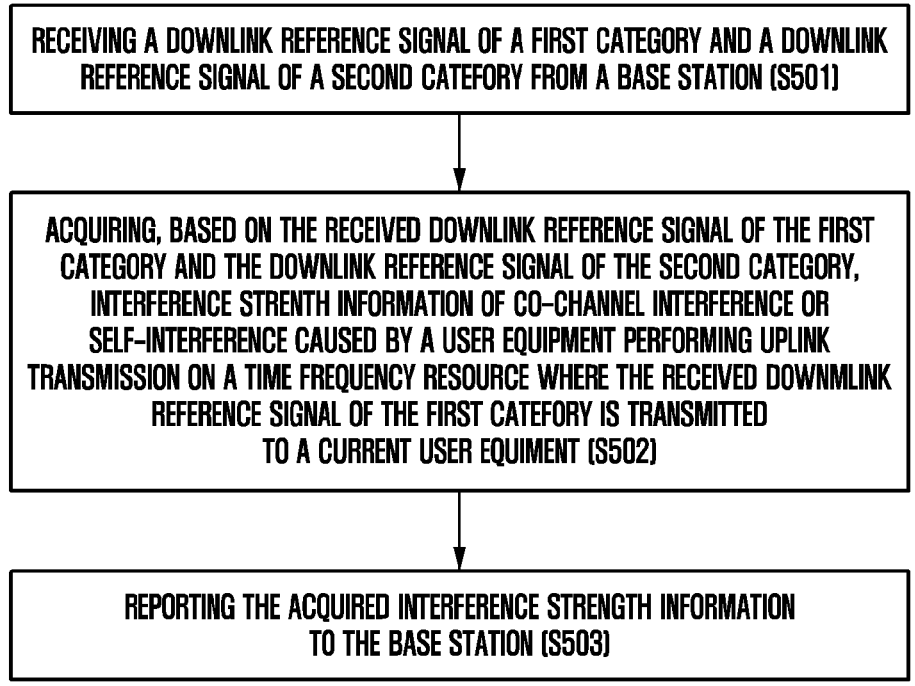

[Fig. 9]
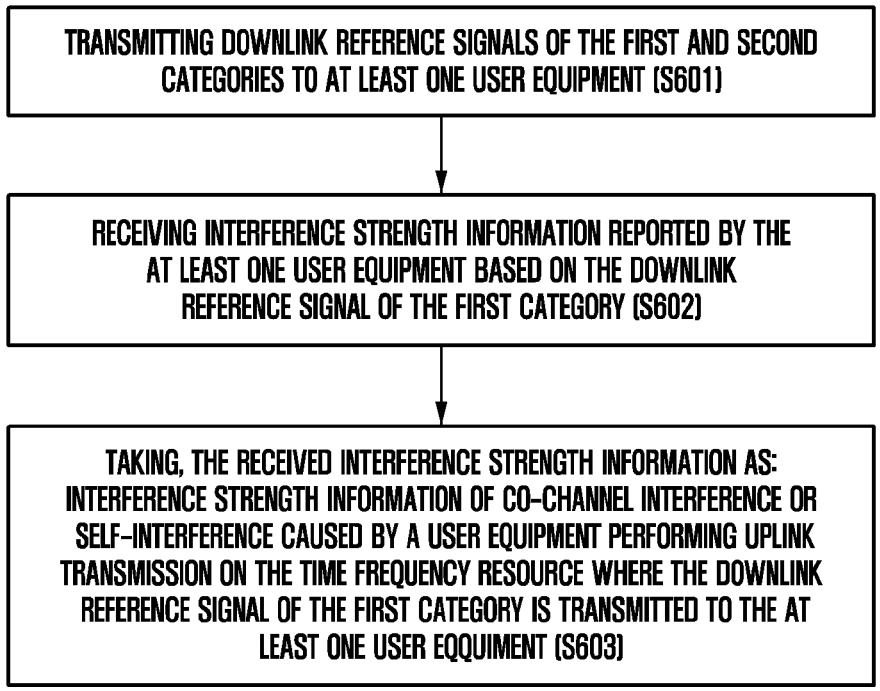
[Fig. 10]
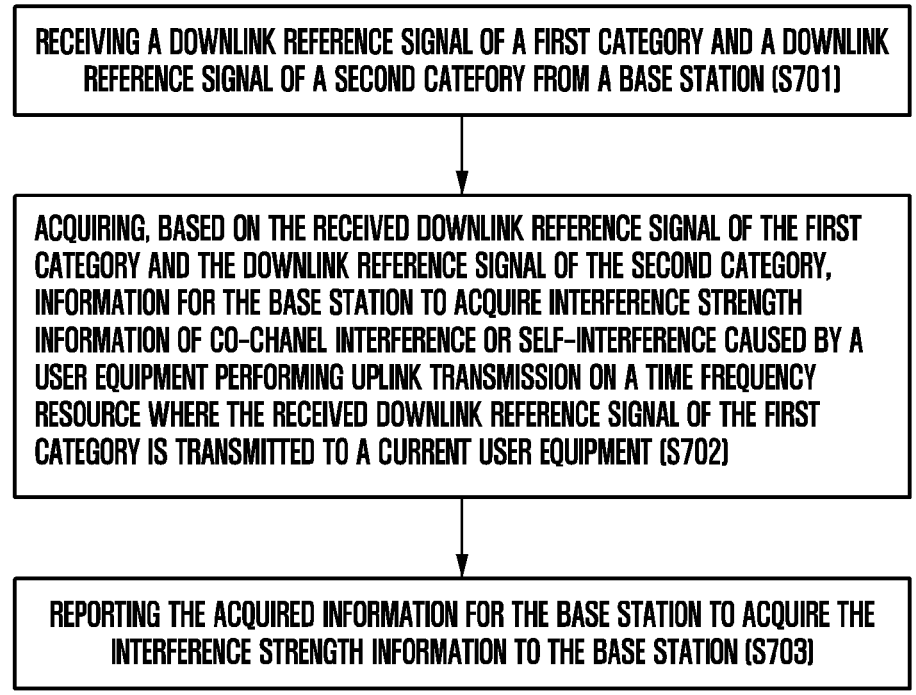

[Fig. 11]
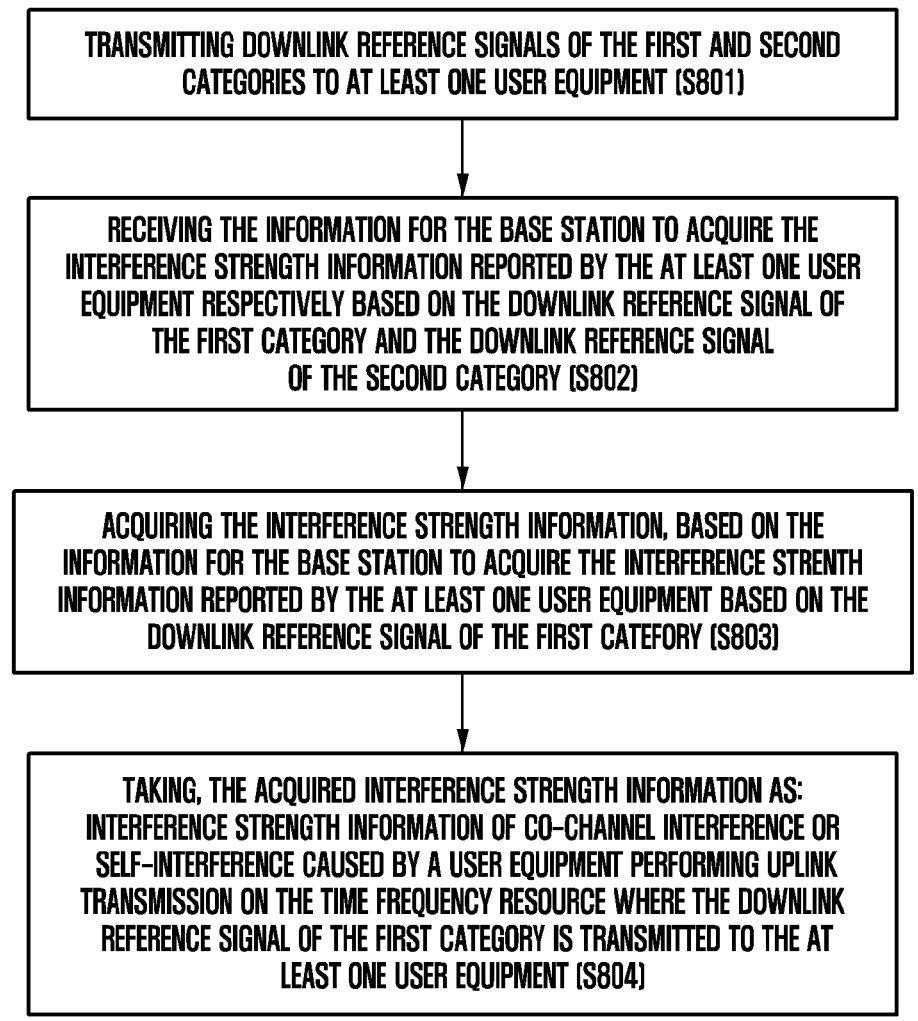
[Fig. 12]
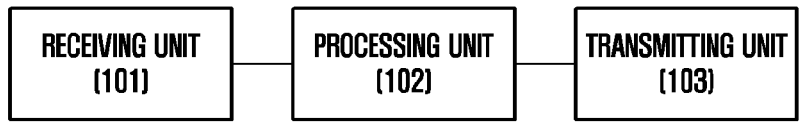
[Fig. 13]

[Fig. 14]
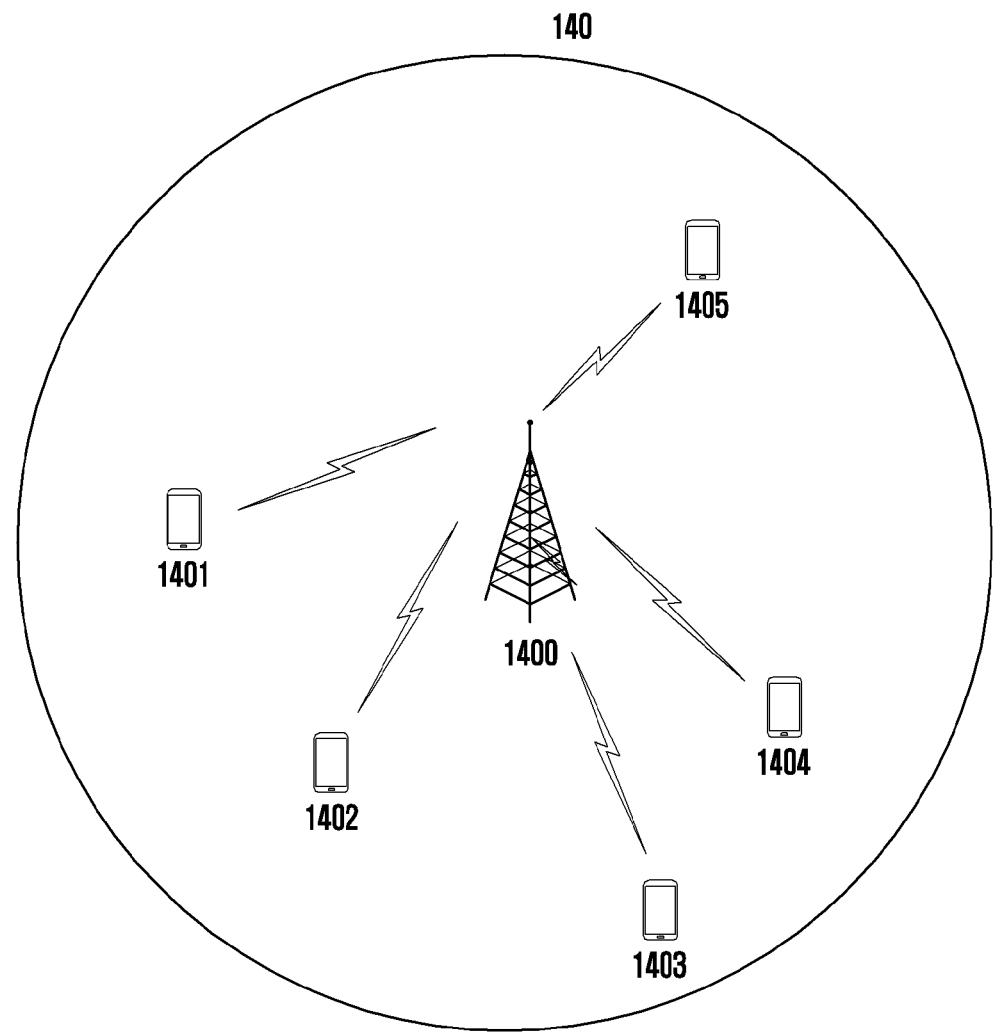

[Fig. 18]
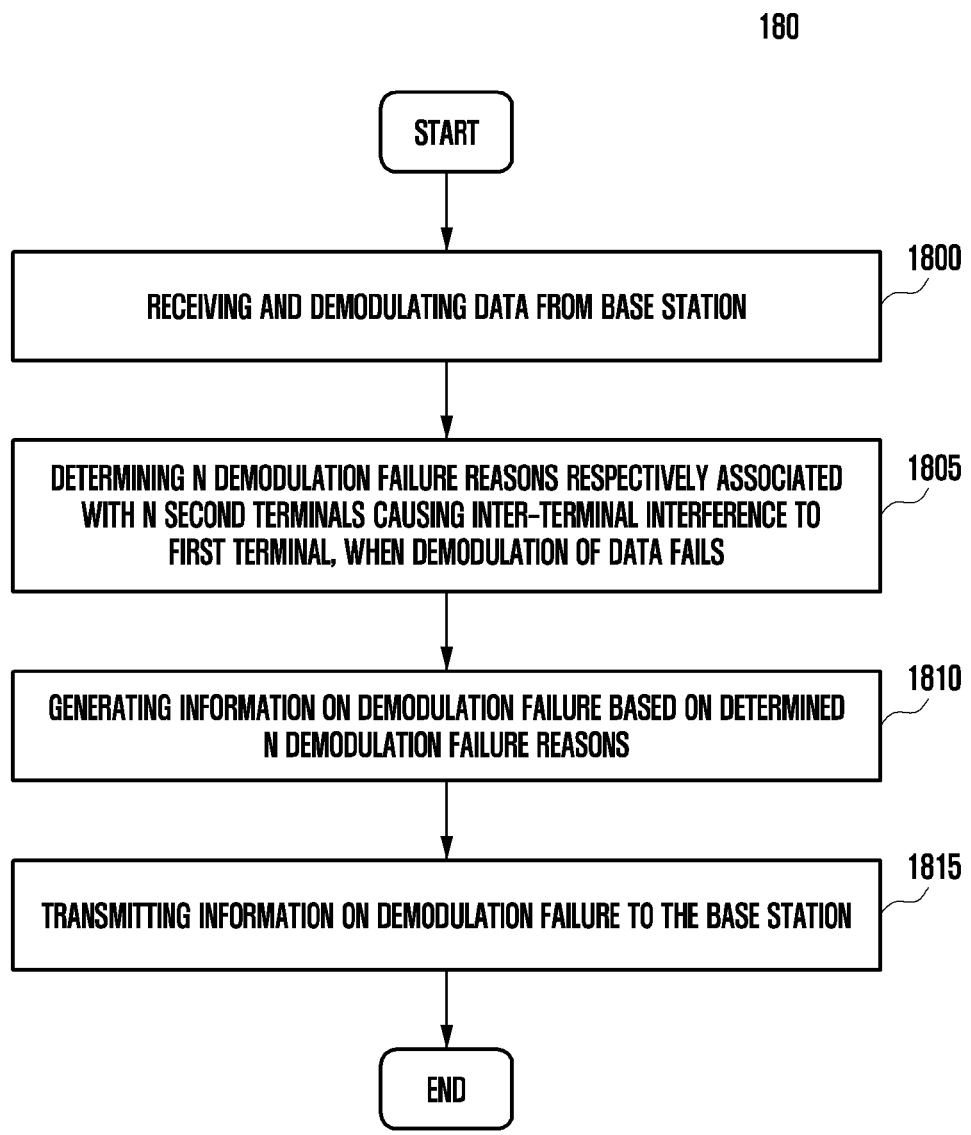

[Fig. 19]
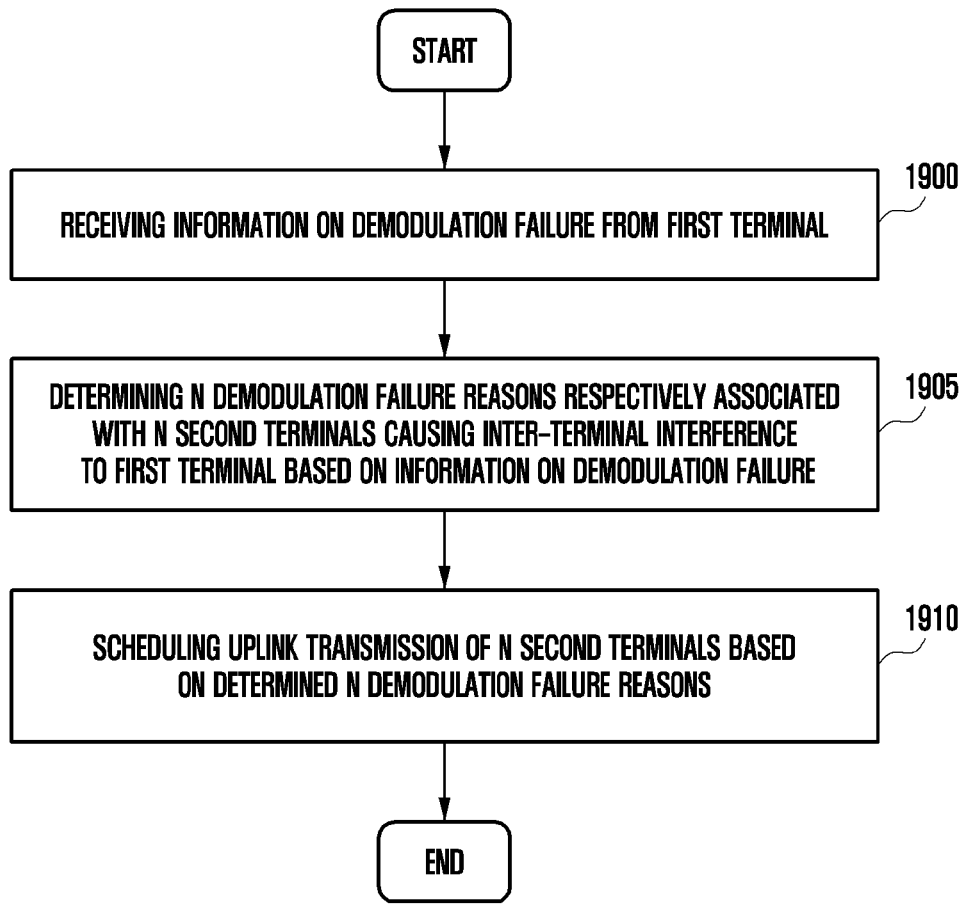
[Fig. 20]
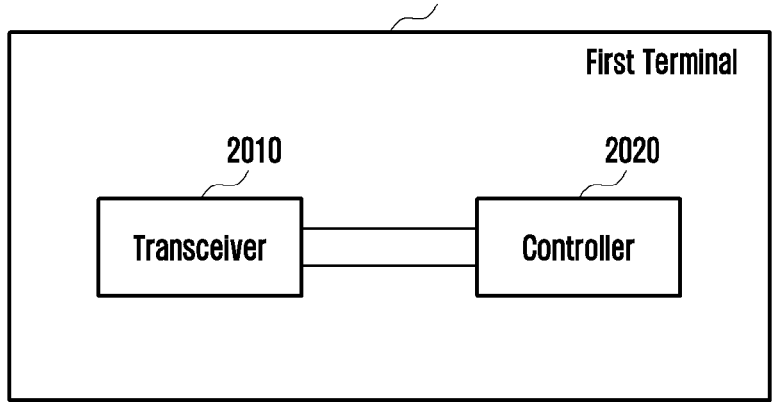

[Fig. 21]
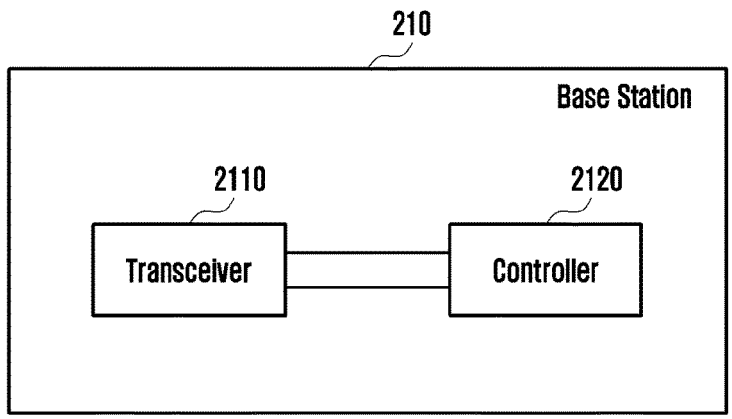
[Fig. 22]
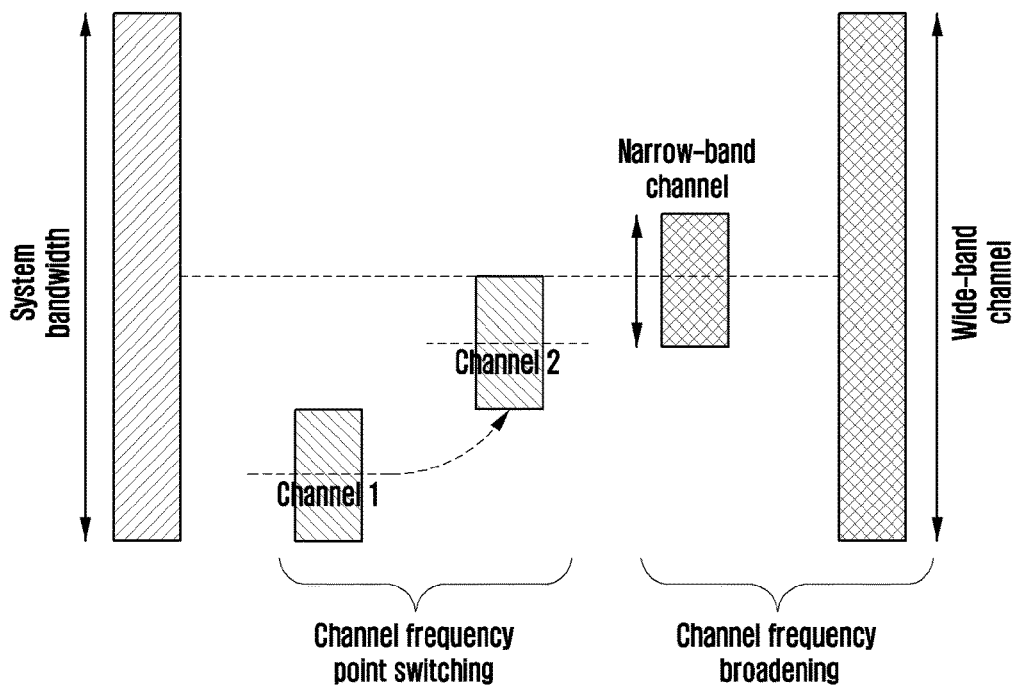
[Fig. 23]
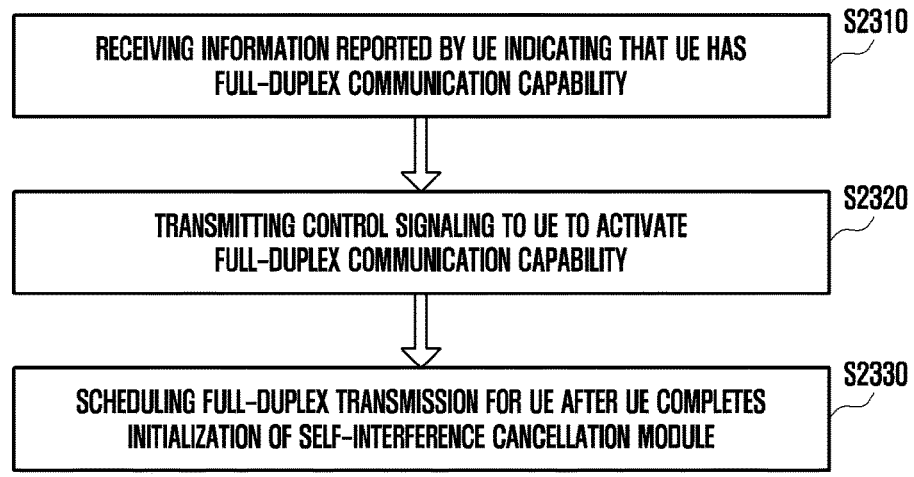

[Fig. 24]
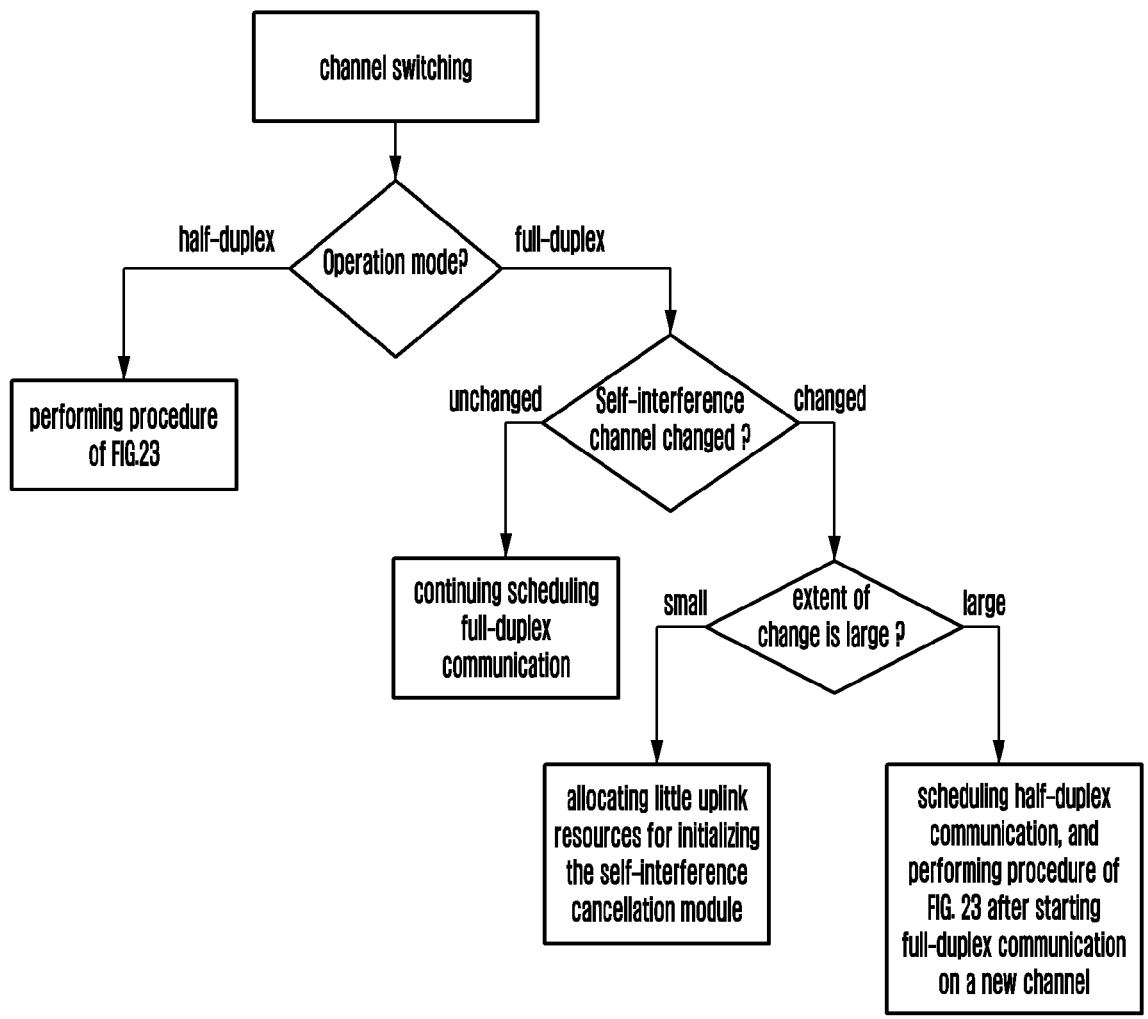

[Fig. 25]
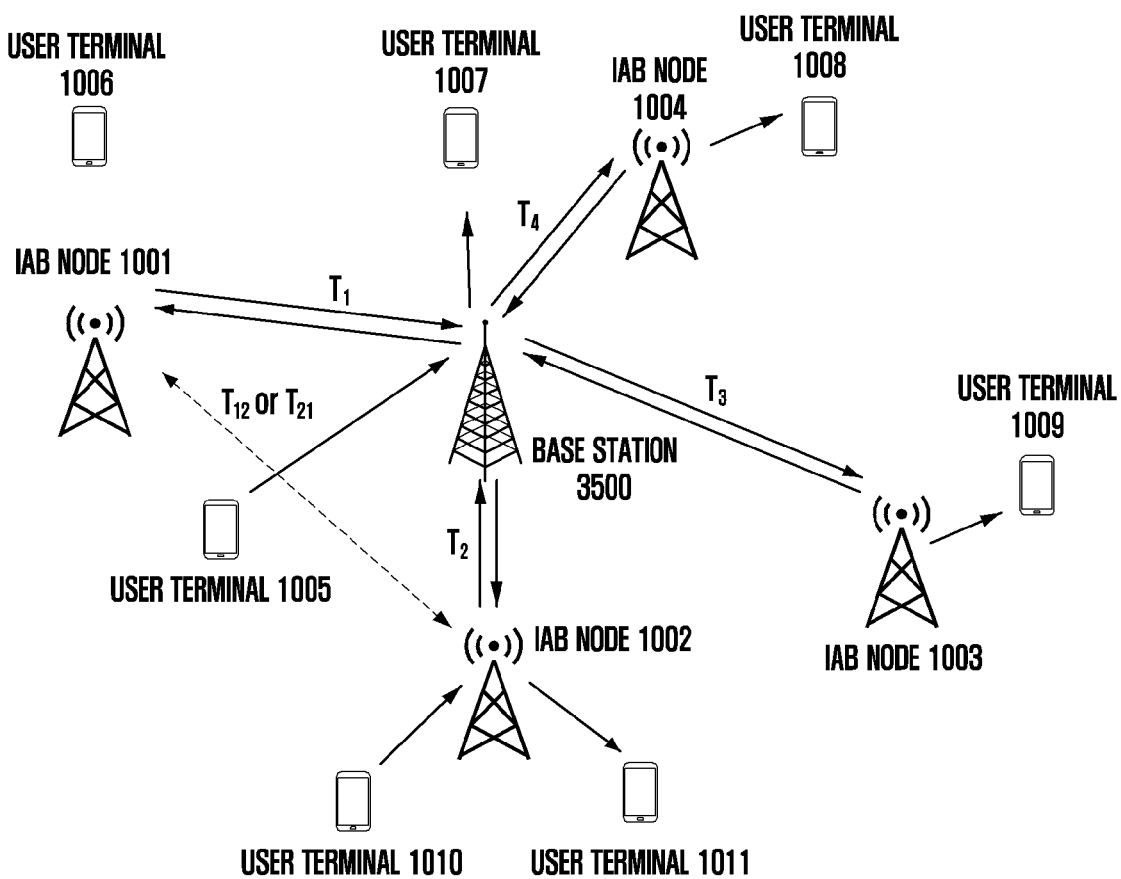

[Fig. 26]
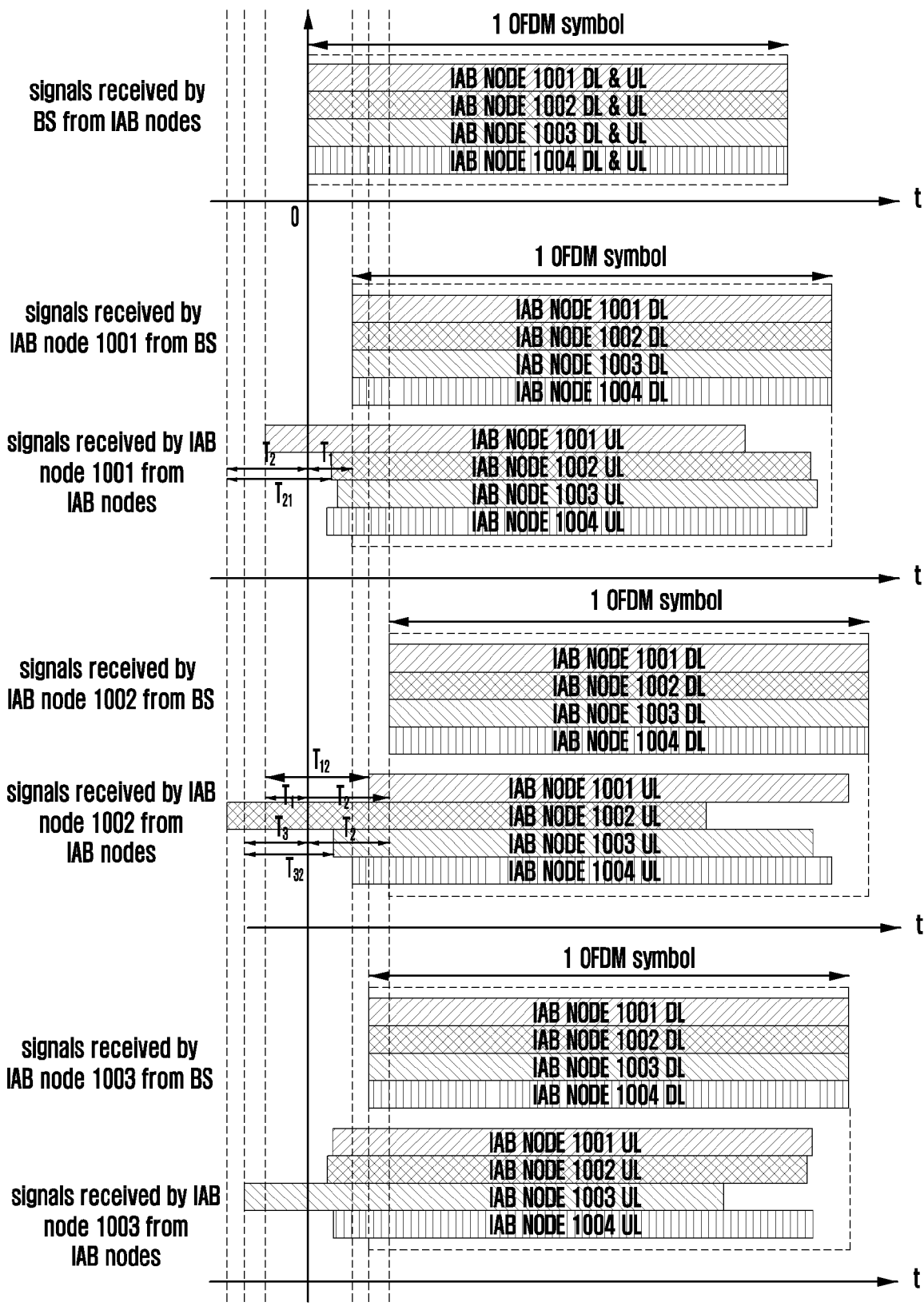

[Fig. 27]
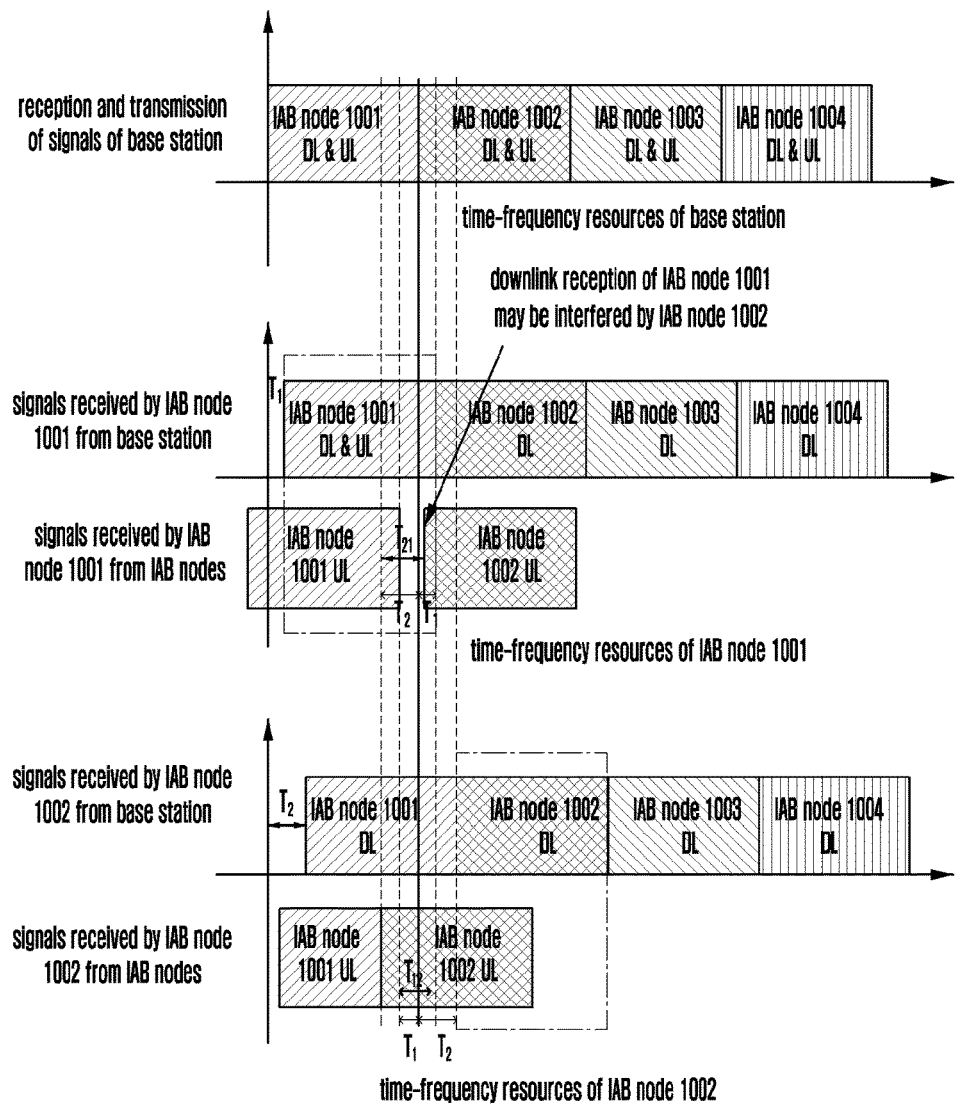
[Fig. 28]
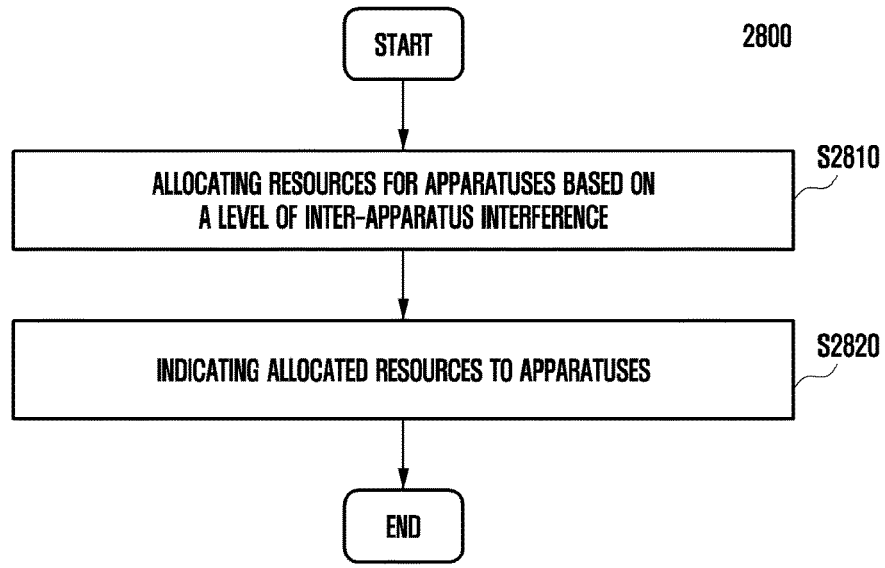

[Fig. 29]
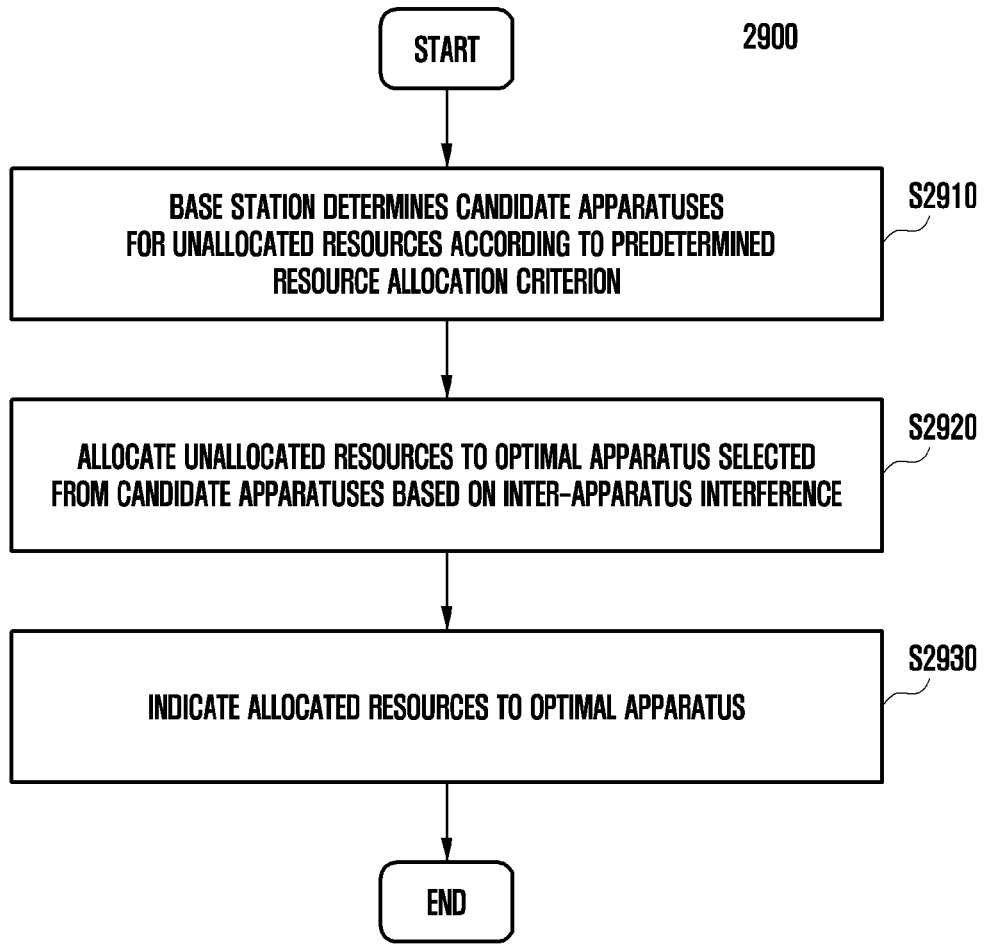
[Fig. 30]
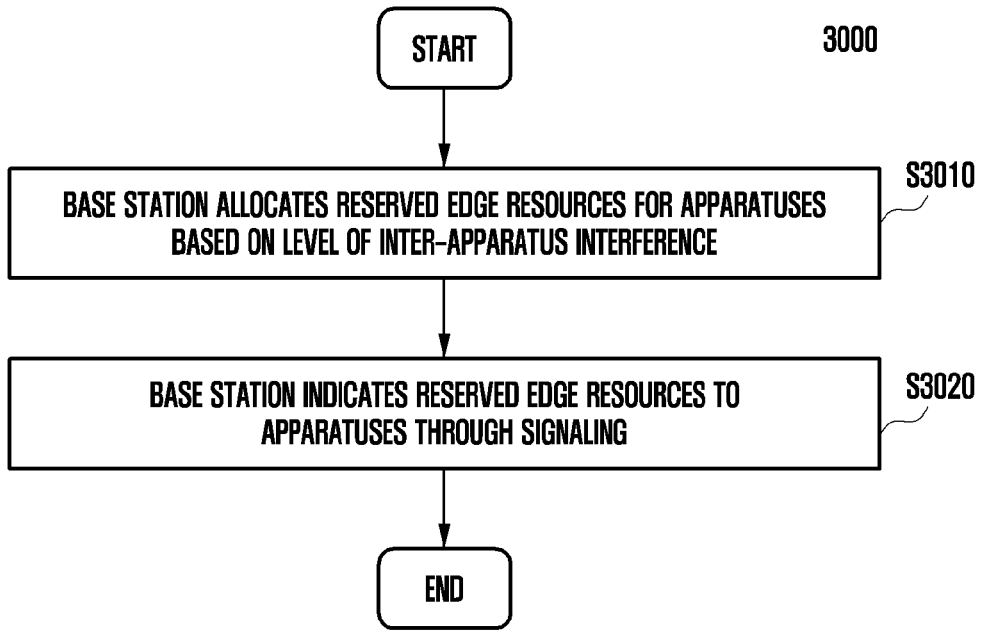

[Fig. 31]
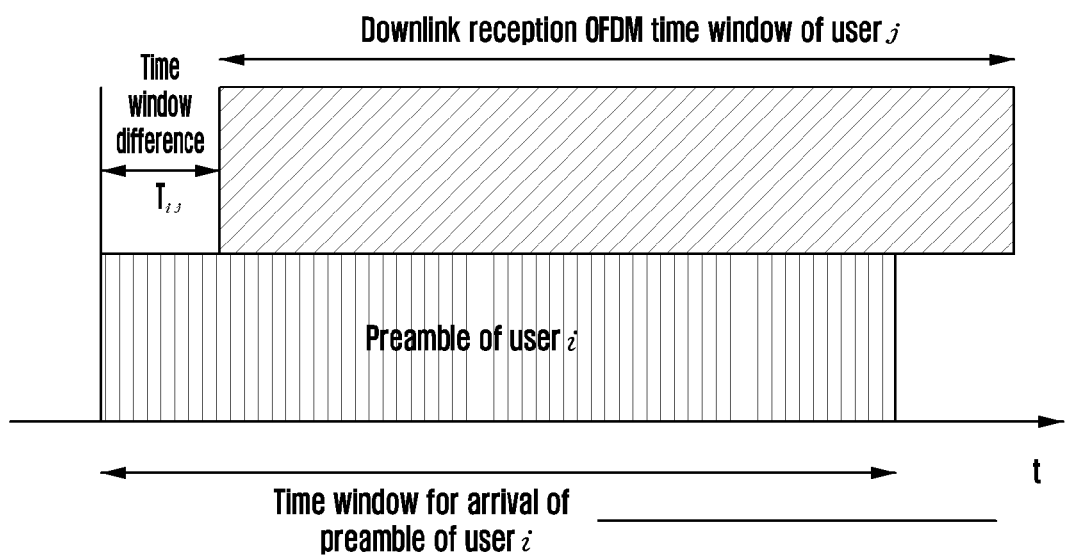

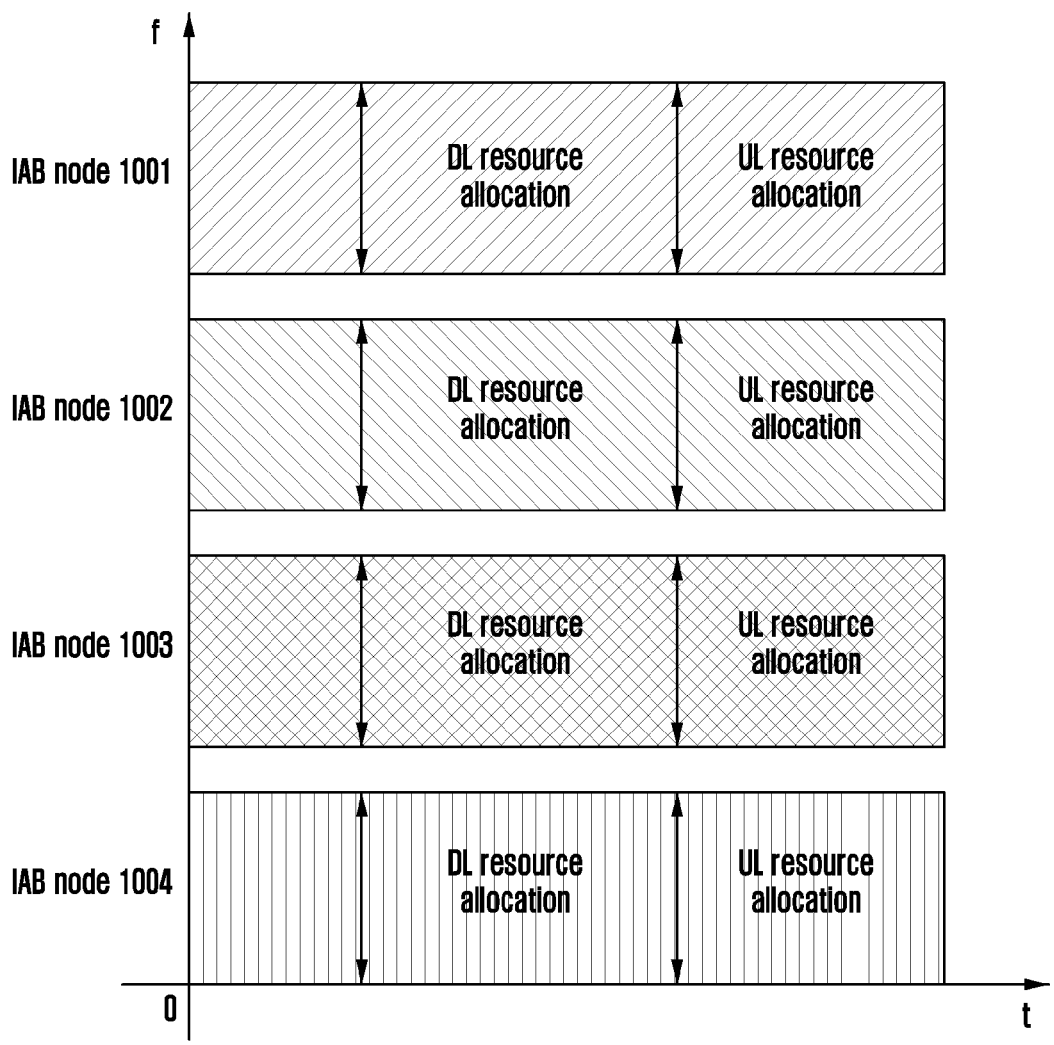
[Fig. 33]

[Fig. 34]
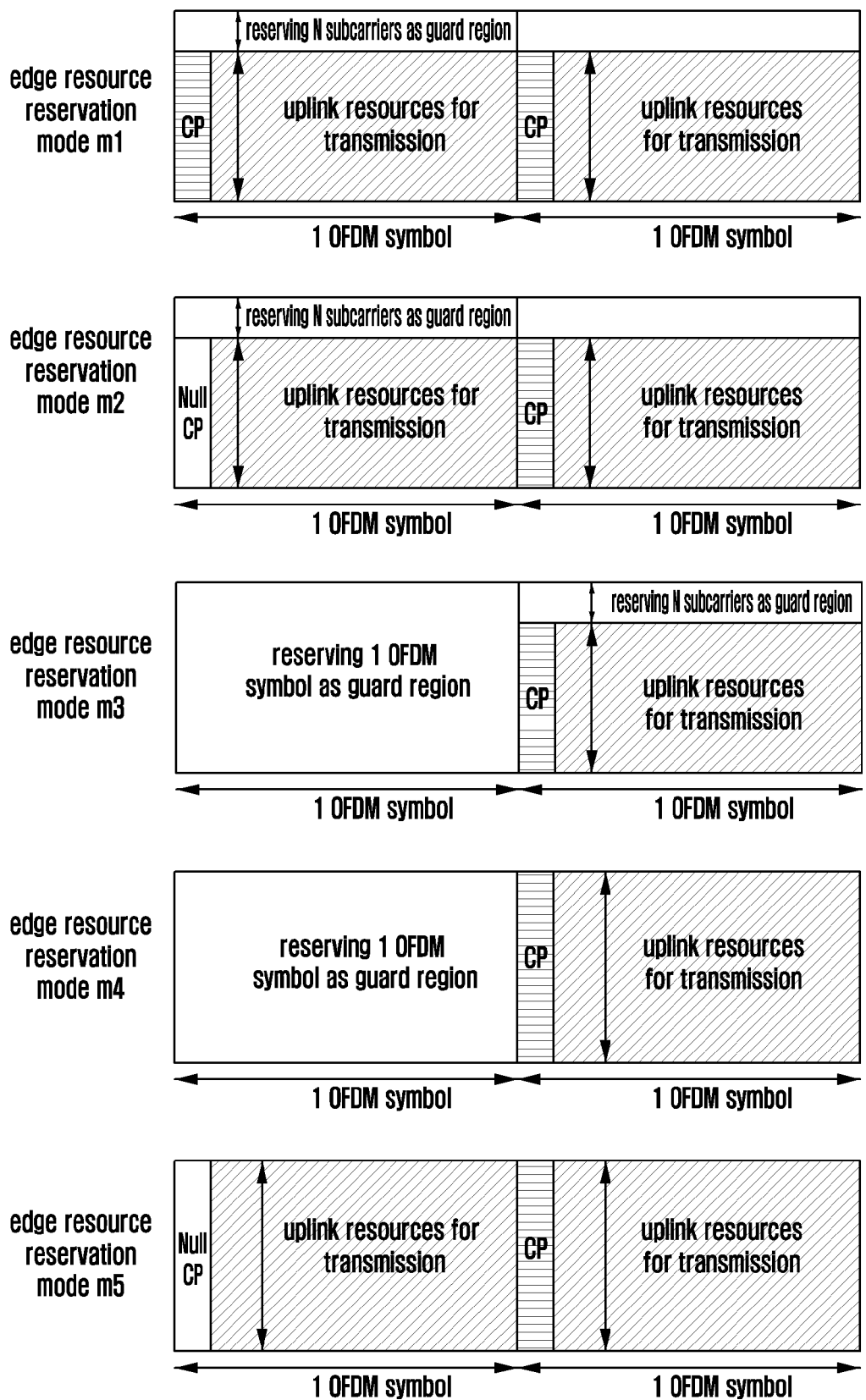

[Fig. 35]
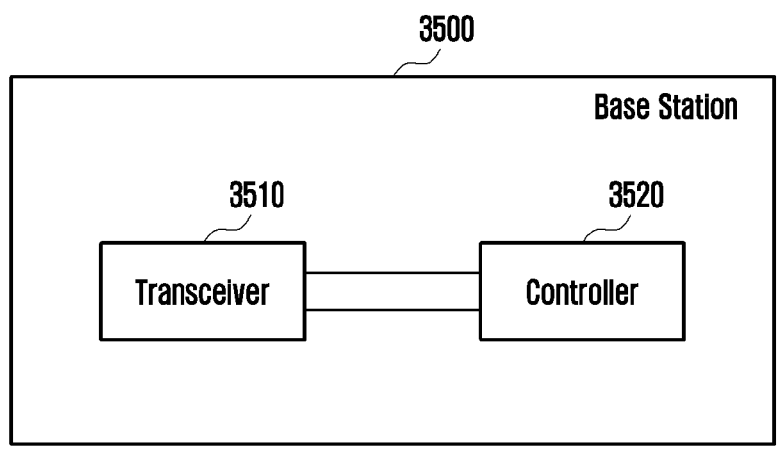
[Fig. 36]
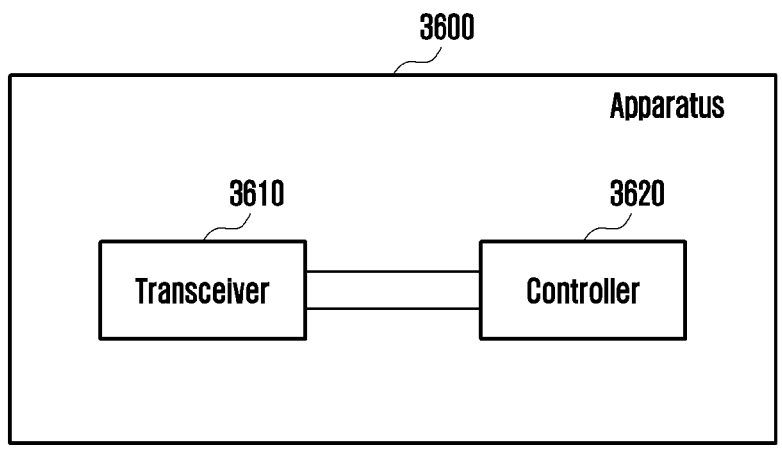

METHOD AND APPARATUS FOR MEASURING INTERFERENCE, FEEDING BACK DEMODULATION RELATED INFORMATION AND SCHEDULING TERMINALS, CHANNEL SWITCHING, AND INTERFERENCE PROCESSING

TECHNICAL FIELD

This application claims the benefit of Chinese Patent Application No. 201910311687.3, filed on Apr. 18, 2019, Chinese Patent Application No. 201910634910.8, filed on Jul. 15, 2019, Chinese Patent Application No. 201910629952.2, filed on Jul. 12, 2019, and Chinese Patent Application No. 201911223439.X, filed on Dec. 3, 2019, in the China National Intellectual Property Administration, the disclosure of which is incorporated herein in its entirety by reference.

The present disclosure generally relates to a technical field of wireless communication, and more particularly, relates to a method of measuring interference for a user equipment (UE) and a device, a method of measuring interference for a base station and a device, a method and an apparatus for feeding back information on demodulation failure and a method and an apparatus for scheduling uplink transmission based on the fed back information on demodulation failure, a method, a base station, a user equipment and a system thereof for channel switching, and a base station, an apparatus that performs interference processing and an operation method thereof in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

With a rapid increase in mobile data services, especially a rapid increase in high-definition video and ultra-high-definition video services, it has higher demands for a transmission rate of wireless communication. In order to satisfy the growing demands of mobile data services, new technologies are needed to further improve throughput of a wireless communication system. A full duplex technology may further improve spectrum efficiency. Different from the traditional half duplex wireless communication system which adopts time domain orthogonal division (time division duplex, TDD) or frequency domain orthogonal division (frequency division duplex, FDD) in an uplink and downlink, a full duplex wireless communication system allows simultaneous transmission of the uplink and downlink of a user equipment (UE) on a same time frequency resource. Thus, the full duplex wireless communication system may achieve, theoretically, a transmission rate twice that of the half duplex wireless communication system.

However, the full duplex technology needs to overcome two main problems in its application: I. self-interference, i.e., interference caused by transmission to reception of a user equipment itself; and II. co-channel interference between UEs in a same cell, i.e., interference caused by an uplink user equipment to a downlink user equipment using the same time frequency resource. Regarding the self-interference, there are some technologies that may achieve better self-interference eliminating performance already, currently. Regarding the co-channel interference between UEs in the cell, the interference caused by the user equipment performing uplink transmission to the user equipment performing downlink reception using the same time frequency resource is mainly reduced by scheduling, currently.

In order to perform effective user equipment scheduling, a base station needs to acquire interference strength information of the co-channel interference between the UEs. The currently adopted manner of acquiring the interference strength information of the co-channel interference between the UEs is: the base station estimates interference strength of the co-channel interference between the UEs by acquiring location information of the UEs, in particular, the farther the UEs are away from each other, the weaker the interference strength of the co-channel interference therebetween is, and the closer the UEs are to each other, the stronger the interference strength of the co-channel interference therebetween is, thus, the base station selects a pair of UEs comparatively far away from each other to respectively schedule uplink and downlink transmission while scheduling the UEs on the same time frequency resource.

The scheduling method based on the location information of the user equipment may reduce the co-channel interference between UEs to some extent. However, since the location information of the user equipment is not estimated accurately enough (e.g., an accuracy of a locating manner based on reference signal time difference (RSTD) is roughly ten more meters, and an accuracy of a locating manner based on a global positioning system (GPS) is roughly several meters), it causes the interference strength of the co-channel interference between UEs estimated based on the location information not to be accurate enough, thereby greatly influencing the scheduling performance. Thus, a method capable of accurately measuring the interference strength of the co-channel interference between UEs is needed.

The rapid growth of mobile data service, especially the rapid growth of high-definition video and ultra-high-definition video services, puts forward higher requirements on transmission rate of wireless communication. In order to meet the growing demand of mobile service, new technologies are needed to further improve the throughput of a wireless communication system. Full-duplex technologies may further improve spectrum utilization ratio in the existing systems. Unlike a traditional half-duplex system, which adopts time domain (time division duplex, TDD) or frequency domain (frequency division duplex, FDD) orthogonal division in uplink and downlink, a full-duplex system allows the uplink and downlink of the terminal to be transmitted simultaneously on the same time-frequency resources. Therefore, the full-duplex system may theoretically reach twice the rate of the half-duplex system.

Application of full-duplex technologies needs to overcome two primary problems: (1) self-interference, i.e. interference to reception of a device from transmission of the device itself; and (2) co-channel interference among terminals in a same cell, i.e. interference to a terminal(s) performing downlink transmission by a terminal(s) performing uplink transmission using the same time-frequency resources as that of the terminal(s) performing downlink transmission. Hybrid automatic repeat request (HARQ) in current Long Term Evolution (LTE) or New Radio (NR) systems utilizes acknowledgements (ACKs)/negative acknowledgements (NACKs) to feedback information. However, ACKs and NACKs cannot inform a base station(s) of reasons for demodulation failure of a terminal(s) performing downlink transmission, which makes it difficult to help the base station(s) to make better retransmission or scheduling decisions.

There is a need to design a new feedback method to help the base station(s) make better retransmission or scheduling decisions.

With a rapid development of mobile communication technology, mobile data services are increasing day by day after the commercialization of the 4th generation (4G) communication system, especially a rapid growth of high-definition video and ultra-high-definition video services, which puts forward higher requirements on a transmission rate of wireless communication.

In order to meet the growing demand of mobile services, new technologies are needed to further improve the throughput of wireless communication systems. Unlike a traditional half-duplex system which adopts time domain orthogonal division (time division duplex, TDD) or frequency domain orthogonal division (frequency division duplex, FDD) for uplink and downlink, a full-duplex system allows users' uplink and downlink to be transmitted simultaneously on the same time-frequency resources. Therefore, the transmission rate of the full-duplex system can theoretically reach twice that of a half-duplex system. Based on the above reasons, full-duplex technology can further improve the utilization rate of frequency spectrum on an existing system.

The application of full-duplex technology needs to overcome two main problems: first, self-interference, i.e., interference caused by a device's transmission to its own reception; and second, co-channel interference between different user equipments (UEs) within a same cell, i.e., interference caused by uplink UEs to downlink UEs using the same time-frequency resources.

For self-interference, there are already some technologies that can achieve good self-interference cancellation performance. For example, a method proposed in the document "Full duplex radios, D. Bharadia, E. McMilin, S. Katti, 2013" may reduce self-interference by more than 110 dB, which basically reduces self-interference below noise. For co-channel interference between different UEs within a cell, a main method currently adopted is to reduce the interference caused by UEs performing uplink transmission to UEs performing downlink reception through scheduling. In order to schedule UEs effectively, a base station (BS) needs to obtain interference power information between different UEs.

A simple way to obtain interference power information between UEs is to estimate power of interference between users by obtaining location information of the users. For example, the power of interference between different UEs that are far away from each other is small, while the power of interference between different UEs that are close to each other is large. Therefore, when scheduling UEs on the same time-frequency resources, the BS may select a pair of UEs that are far away from each other to schedule uplink and downlink transmission respectively. A scheduling method based on location information of UEs can reduce co-channel interference between different UEs to a certain extent, but if the estimation of location information of UEs is inaccurate (for example, a current positioning method based on Reference Signal Time Difference (RSTD) has an accuracy of about a dozen meters, and a positioning method based on GPS has an accuracy of several meters), the corresponding scheduling performance will be greatly affected.

If UEs having a full-duplex communication capability exist in the system, the BS needs to ensure that self-interference cancellation modules of these UEs have been working normally when scheduling full-duplex communication for these UEs. In order to ensure this, we need to design some special signaling.

In addition, if the system bandwidth is relatively wide while the UEs only support transmitting on a narrow bandwidth, in order to balance UEs on each channel, the BS may switch the UEs into different channels, where channel switching herein includes switching of frequency point or changing of bandwidth, as shown in FIG. 22. When a UE having a full-duplex communication capability is switched into another channel, parameter configuration of its self-interference cancellation module may or may not be applicable on the new channel, and therefore, it is necessary to make some constraints on the steps of channel switching for the UE performing full-duplex communication and on a state of the UE on the new channel, to enable the BS to accurately schedule the UE on the switched channel.

The above information is provided as background information only to help understand the present disclosure. No decision or assertion has been made as to whether any of the above can be applied as prior art with respect to the present disclosure.

The rapid growth of mobile data services, especially the rapid growth of high-definition video and ultra-high-definition video services, puts forward higher requirements on transmission rate of wireless communication. In order to meet the growing demand of mobile services, new technologies are needed to further improve the throughput of a wireless communication system. Full duplex technology can further improve the spectrum utilization ratio on an existing system. Unlike a traditional half duplex system which adopts time domain orthogonal division (Time Division Duplex, TDD) or frequency domain orthogonal division (Frequency Division Duplex, FDD) on uplink and downlink, a full duplex system allows the uplink and downlink of apparatuses in the system to be transmitted simultaneously on the same resources (e.g., time-frequency resources). Therefore, the full duplex system can theoretically reach twice the speed of the half duplex system.

Exemplary embodiments of the present disclosure are to provide a method of measuring interference for a user equipment and device and a method of measuring interference for a base station and device which can accurately measure interference strength of co-channel interference between UEs or self-interference of a user equipment.

The present invention designs a feedback method intended to carrying information on whether demodulation is successful or not and reasons for demodulation failure in feedback information for data demodulation, thereby helping the base station(s) to make better decisions during subsequent retransmission or scheduling and to realize better utilization of system resources.

The present application aims to solve at least one of the above technical disadvantages. Through the proposed method, base station, user equipment and system thereof for channel switching, the UE can be effectively scheduled for full-duplex communication, thus the utilization rate of the frequency spectrum is improved.

The present invention designs a corresponding resource allocation scheme for additional interference due to time misalignment between a time when a signal transmitted by a base station is received by an apparatus and a time when a signal transmitted by other apparatuses is received by the apparatus (hereinafter, referred to as additional interference due to inter-apparatus time misalignment or additional interference due to time misalignment) in a full duplex system.

Solution to Problem

According to an exemplary embodiment of the present disclosure, it provides a method of measuring interference for a user equipment (UE), the method including: receiving a downlink reference signal from a base station; based on a received downlink reference signal of a first category, acquiring interference strength information of co-channel interference or self-interference caused by a user equipment, which performs uplink transmission on a time frequency resource where the received downlink reference signal of the first category is transmitted, to a current user equipment, or information for the base station to acquire the interference strength information of the co-channel interference or the self-interference; and reporting, to the base station, the acquired interference strength information or information for the base station to acquire the interference strength information, wherein the downlink reference signal of the first category is: a downlink reference signal transmitted on a time frequency resource with scheduled uplink transmission.

Alternatively, the acquiring of the interference strength information based on the received downlink reference signal of the first category includes: deducting an estimated downlink reference signal part of the first category from the received signal, and determining the interference strength information based on a remaining signal part; or, determining the interference strength information based on a channel measurement quantity obtained based on the received downlink reference signal of the first category; or, acquiring the interference strength information based on the received downlink reference signal of the first category and a received downlink reference signal of a second category, wherein the downlink reference signal of the second category is: a downlink reference signal transmitted on a time frequency resource without scheduled uplink transmission.

Alternatively, the determining of the interference strength information based on the remaining signal part includes: taking average power of a symbol corresponding to the remaining signal part or a quantized value of the average power as the interference strength information, wherein a downlink reference signal part of the first category in the received signal is estimated in a manner of: estimating a downlink channel based on the received downlink reference signal of the first category, and reconstructing the downlink reference signal part of the first category in the received signal based on a parameter of the estimated downlink channel.

Alternatively, the determining of the interference strength information based on the channel measurement quantity obtained based on the received downlink reference signal of the first category includes: taking a ratio of reference signal received power to a signal-to-noise and interference ratio based on the received downlink reference signal of the first category or a quantized value of the ratio as the interference strength information.

Alternatively, the acquiring of the interference strength information based on the received downlink reference signals of the first and second categories includes: taking a difference between average power of a symbol corresponding to the received downlink reference signal of the first category and average power of a symbol corresponding to the received downlink reference signal of the second category or a quantized value of the difference as the interference strength information; or, taking a difference between a channel measurement quantity obtained based on the received downlink reference signal of the second category and a channel measurement quantity obtained based on the received downlink reference signal of the first category or a quantized value of the difference as the interference strength information, wherein the channel measurement quantity is: reference signal received quality or a signal-to-noise and interference ratio.

Alternatively, the information for the base station to acquire the interference strength information includes: a channel measurement quantity obtained based on the received downlink reference signal of the first category; or, a channel measurement quantity obtained based on the received downlink reference signal of the first category and a channel measurement quantity obtained based on the received downlink reference signal of the second category; or, average power of a symbol corresponding to the received downlink reference signal of the first category and average power of a symbol corresponding to the received downlink reference signal of the second category, wherein the channel measurement quantity includes at least one of: reference signal received quality, a signal-to-noise and interference ratio and reference signal received power.

Alternatively, the method of measuring interference further includes: determining whether the received downlink reference signal is a downlink reference signal of the first category or a downlink reference signal of the second category, wherein the downlink reference signal of the second category is: a downlink reference signal transmitted on a time frequency resource without scheduled uplink transmission.

Alternatively, the determining of whether the received downlink reference signal is a downlink reference signal of the first category or a downlink reference signal of the second category includes: determining, based on information received from the base station for indicating a configuration mode of a downlink reference signal, a duration of the configuration mode, and an initial location of the configuration mode, whether the received downlink reference signal is a downlink reference signal of the first category or a downlink reference signal of the second category; or, determining, based on at least one of a frequency domain offset location, a spreading code, a scrambling code, and a reference signal type of the received downlink reference signal, whether the received downlink reference signal is a downlink reference signal of the first category or a downlink reference signal of the second category; or, determining, based on a type of a measurement quantity of the received downlink reference signal that is required to be reported, whether the received downlink reference signal is a downlink reference signal of the first category or a downlink reference signal of the second category, wherein the configuration mode of the downlink reference signal defines an order and number of downlink reference signals of the first and second categories in each period.

Alternatively, the reporting of the acquired interference strength information or information for the base station to acquire the interference strength information to the base station includes: reporting the acquired interference strength information or information for the base station to acquire the interference strength information according to a specific manner, so as to enable the base station to determine the downlink reference signal of the first category corresponding to the received interference strength information or information for the base station to acquire the interference strength information.

Alternatively, the acquiring of the interference strength information or the information for the base station to acquire the interference strength information includes: acquiring, based on a plurality of received downlink reference signals of the first category, the interference strength information or the information for the base station to acquire the interference strength information, wherein UEs performing uplink transmission on time frequency resources where the plurality of downlink reference signals of the first category are transmitted are the same.

According to another exemplary embodiment of the present disclosure, it provides a method of measuring interference for a base station, the method including: transmitting, to at least one user equipment, a downlink reference signal of a first category, wherein the downlink reference signal of the first category is: a downlink reference signal transmitted on a time frequency resource on with scheduled uplink transmission; receiving, from the at least one user equipment, interference strength information reported based on the downlink reference signal of the first category; or, acquiring the interference strength information, based on information for the base station to acquire the interference strength information reported by the at least one user equipment based on the downlink reference signal of the first category; and taking the received or acquired interference strength information as interference strength information of co-channel interference or self-interference caused by a user equipment, which performs uplink transmission on a time frequency resource where the downlink reference signal of the first category is transmitted, to the at least one user equipment.

Alternatively, the method of measuring interference further includes: scheduling, based on the interference strength information of the co-channel interference caused by the user equipment to other UEs and/or the self-interference of itself, uplink and/or downlink transmission of the user equipment on a same time frequency resource.

Alternatively, the method of measuring interference further includes: transmitting, to the at least one user equipment, a downlink reference signal of a second category, wherein the downlink reference signal of the second category is: a downlink reference signal transmitted on a time frequency resource without scheduled uplink transmission, wherein the acquiring of the interference strength information includes: acquiring the interference strength information, based on the information for the base station to acquire the interference strength information reported by the at least one user equipment respectively based on the downlink reference signals of the first and second categories, or, wherein the received interference strength information is obtained by the at least one user equipment based on the downlink reference signals of the first and second categories.

Alternatively, the acquiring of the interference strength information includes: taking, respectively with respect to each user equipment among the at least one user equipment, a difference between a channel measurement quantity reported based on the downlink reference signal of the second category and a channel measurement quantity reported based on the downlink reference signal of the first category by each user equipment, or a quantized value of the difference, as the interference strength information, wherein the channel measurement quantity is: reference signal received quality or a signal-to-noise and interference ratio; or, taking, respectively with respect to each user equipment among the at least one user equipment, a difference between average power of a symbol corresponding to a downlink reference signal reported based on the downlink reference signal of the first category and average power of a symbol corresponding to a downlink reference signal reported based on the downlink reference signal of the second category by each user equipment or a quantized value of the difference, as the interference strength information.

Alternatively, the information for the base station to acquire the interference strength information includes: a channel measurement quantity obtained based on the downlink reference signal of the first category.

Alternatively, the acquiring of the interference strength information includes: taking, respectively with respect to each user equipment among the at least one user equipment, a ratio of reference signal received power to a signal-tonoise and interference ratio reported by each user equipment based on the downlink reference signal of the first category and a quantized value of the ratio as the interference strength information.

Alternatively, the method of measuring interference further includes: identifying the downlink reference signal of the first category corresponding to the received interference strength information or information for the base station to acquire the interference strength information.

Alternatively, the scheduling of uplink and/or downlink transmission of the user equipment on the same time frequency resource includes: scheduling, when determining that uplink transmission of one user equipment is scheduled on a time frequency resource, downlink transmission of at least one user equipment on the time frequency resource, wherein interference strength information of co-channel interference or self-interference caused by the one user equipment to the at least one user equipment satisfies a first preset condition; or, scheduling, when determining that downlink transmission of one user equipment is scheduled on a time frequency resource, uplink transmission of at least one user equipment on the time frequency resource, wherein interference strength information of co-channel interference or self-interference caused by the at least one user equipment to the one user equipment satisfies a second preset condition; or, scheduling uplink and downlink transmission of a pair of UEs or a single user equipment on a same time frequency resource, wherein interference strength information of co-channel interference caused by one of the pair of UEs to the other one or self-interference of the single user equipment satisfies a third preset condition.

Alternatively, the transmitting of the downlink reference signals of the first and second categories to at least one user equipment includes: transmitting, according to a specific configuration mode of a downlink reference signal, the downlink reference signals of the first and second categories to the at least one user equipment, and information for indicating the specific configuration mode, a duration of the specific configuration mode, and an initial location of the specific configuration mode to the at least one user equipment, wherein the configuration mode of the downlink reference signal defines an order and number of downlink reference signals of the first and second categories in each period; and/or, the transmitting of the downlink reference signals of the first and second categories to at least one user equipment includes: transmitting the downlink reference signal of the first category to the at least one user equipment according to a first frequency domain offset location, and the downlink reference signal of the second category to the at least one user equipment according to a second frequency domain offset location; and/or, the transmitting of the downlink reference signals of the first and second categories to at least one user equipment comprises: transmitting the downlink reference signal of the first category to the at least one user equipment using a first spreading code or a first scrambling code, and the downlink reference signal of the second category to the at least one user equipment using a second spreading code or a second scrambling code; and/or, the downlink reference signal of the first category is a downlink reference signal of a first reference signal type, and the downlink reference signal of the second category is a downlink reference signal of a second reference signal type; and/or, notifying, only based on the downlink reference signal of the second category, the at least one user equipment of reporting a channel measurement quantity.

Alternatively, the transmitting of the downlink reference signal of the first category to at least one user equipment includes: transmitting a plurality of downlink reference signals of the first category to the at least one user equipment, wherein UEs performing uplink transmission on time frequency resources where the plurality of downlink reference signals of the first category are transmitted are the same, wherein the acquiring of the interference strength information includes: acquiring the interference strength information, based on the information for the base station to acquire the interference strength information reported by the at least one user equipment based on the plurality of downlink reference signals of the first category, or, wherein the received interference strength information is obtained by the at least one user equipment based on the plurality of downlink reference signals of the first category.

According to another exemplary embodiment of the present disclosure, it provides a user equipment, wherein the user equipment includes: a receiving unit for receiving a downlink reference signal from a base station; a processing unit for acquiring, based on a received downlink reference signal of a first category, interference strength information of co-channel interference or self-interference caused by a user equipment, which performs uplink transmission on a time frequency resource where the received downlink reference signal of the first category is transmitted, to a current user equipment, or information for the base station to acquire the interference strength information of the co-channel interference or the self-interference; and a transmitting unit for reporting, to the base station, the acquired interference strength information or information for the base station to acquire the interference strength information, wherein the downlink reference signal of the first category is: a downlink reference signal transmitted on a time frequency resource with scheduled uplink transmission.

Alternatively, the processing unit deducts an estimated downlink reference signal part of the first category from the received signal, and determines the interference strength information based on a remaining signal part; or, the processing unit determines the interference strength information based on a channel measurement quantity obtained based on the received downlink reference signal of the first category; or, the processing unit acquires the interference strength information based on the received downlink reference signal of the first category and a received downlink reference signal of a second category, wherein the downlink reference signal of the second category is a downlink reference signal transmitted on a time frequency resource without scheduled uplink transmission.

Alternatively, the processing unit takes average power of a symbol corresponding to the remaining signal part or a quantized value of the average power as the interference strength information, wherein the acquiring unit estimates the downlink reference signal part of the first category in the received signal in a manner of: estimating a downlink channel based on the received downlink reference signal of the first category, and reconstructing the downlink reference signal part of the first category in the received signal based on a parameter of the estimated downlink channel.

Alternatively, the processing unit takes a ratio of reference signal received power to a signal-to-noise and interference ratio based on the received downlink reference signal of the first category or a quantized value of the ratio as the interference strength information.

Alternatively, the processing unit takes a difference between average power of a symbol corresponding to the received downlink reference signal of the first category and average power of a symbol corresponding to the received downlink reference signal of the second category or a quantized value of the difference as the interference strength information; or, the processing unit takes a difference between a channel measurement quantity obtained based on the received downlink reference signal of the second category and a channel measurement quantity obtained based on the received downlink reference signal of the first category or a quantized value of the difference as the interference strength information, wherein the channel measurement quantity is: reference signal received quality or a signal-to-noise and interference ratio.

Alternatively, the information for the base station to acquire the interference strength information includes: a channel measurement quantity obtained based on the received downlink reference signal of the first category; or, a channel measurement quantity obtained based on the received downlink reference signal of the first category and a channel measurement quantity obtained based on the received downlink reference signal of the second category; or, average power of a symbol corresponding to the received downlink reference signal of the first category and average power of a symbol corresponding to the received downlink reference signal of the second category, wherein the channel measurement quantity includes at least one of: reference signal received quality, a signal-to-noise and interference ratio and reference signal received power.

Alternatively, the user equipment further includes: a determining unit for determining whether the received downlink reference signal is a downlink reference signal of the first category or a downlink reference signal of the second category, wherein the downlink reference signal of the second category is: a downlink reference signal transmitted on a time frequency resource without scheduled uplink transmission.

Alternatively, the determining unit determines, based on information received from the base station for indicating a configuration mode of a downlink reference signal, a duration of the configuration mode, and an initial location of the configuration mode, whether the received downlink reference signal is a downlink reference signal of the first category or a downlink reference signal of the second category; or, the determining unit determines, based on at least one of a frequency domain offset location, a spreading code, a scrambling code, and a reference signal type of the received downlink reference signal, whether the received downlink reference signal is a downlink reference signal of the first category or a downlink reference signal of the second category; or, the determining unit determines, based on a type of a measurement quantity of the received downlink reference signal that is required to be reported, whether the received downlink reference signal is a downlink reference signal of the first category or a downlink reference signal of the second category, wherein the configuration mode of the downlink reference signal defines an order and number of downlink reference signals of the first and second categories in each period.

Alternatively, the transmitting unit reports the acquired interference strength information or information for the base station to acquire the interference strength information according to a specific manner, so as to enable the base station to determine the downlink reference signal of the first category corresponding to the received interference strength information or information for the base station to acquire the interference strength information.

Alternatively, the processing unit acquires, based on a plurality of received downlink reference signals of the first category, the interference strength information or the information for the base station to acquire the interference strength information, wherein UEs performing uplink transmission on time frequency resources where the plurality of downlink reference signals of the first category are transmitted are the same.

According to another exemplary embodiment of the present disclosure, it provides a base station, wherein the base station includes: a transmitting unit for transmitting, to at least one user equipment, a downlink reference signal of a first category, wherein the downlink reference signal of the first category is: a downlink reference signal transmitted on a time frequency resource with scheduled uplink transmission; a receiving unit for receiving, from the at least one user equipment, interference strength information or information for the base station to acquire the interference strength information reported based on the downlink reference signal of the first category; and a processing unit for acquiring the interference strength information, based on the information for the base station to acquire the interference strength information reported by the at least one user equipment based on the downlink reference signal of the first category, when receiving the information for the base station to acquire the interference strength information, and for taking the received or acquired interference strength information as: interference strength information of co-channel interference or self-interference caused by a user equipment, which performs uplink transmission on a time frequency resource where the downlink reference signal of the first category is transmitted, to the at least one user equipment.

Alternatively, the base station further includes: a scheduling unit for scheduling, based on the interference strength information of the co-channel interference caused by the user equipment to other UEs and/or the self-interference of itself, uplink and/or downlink transmission of the user equipment on the same time frequency resource.

Alternatively, the transmitting unit also transmits, to the at least one user equipment, a downlink reference signal of a second category, wherein the downlink reference signal of the second category is: a downlink reference signal transmitted on a time frequency resource without scheduled uplink transmission, wherein the processing unit acquires, based on the information for the base station to acquire the interference strength information reported by the at least one user equipment respectively based on the downlink reference signals of the first and second categories, the interference strength information, or, wherein the received interference strength information is obtained by the at least one user equipment based on the downlink reference signals of the first and second categories.

Alternatively, the processing unit takes, respectively with respect to each user equipment among the at least one user equipment, a difference between a channel measurement quantity reported based on the downlink reference signal of the second category and a channel measurement quantity reported based on the downlink reference signal of the first category by each user equipment, or a quantized value of the difference, as the interference strength information, wherein the channel measurement quantity is: reference signal received quality or a signal-to-noise and interference ratio; or, the processing unit takes, respectively with respect to each user equipment among the at least one user equipment, a difference between average power of a symbol corresponding to a downlink reference signal reported based on the downlink reference signal of the first category and average power of a symbol corresponding to a downlink reference signal reported based on the downlink reference signal of the second category by each user equipment or a quantized value of the difference, as the interference strength information.

Alternatively, the information for the base station to acquire the interference strength information includes: a channel measurement quantity obtained based on the downlink reference signal of the first category.

Alternatively, the processing unit takes, respectively with respect to each user equipment among the at least one user equipment, a ratio of reference signal received power to a signal-to-noise and interference ratio reported by each user equipment based on the downlink reference signal of the first category and a quantized value of the ratio as the interference strength information.

Alternatively, the base station further includes: an identifying unit for identifying the downlink reference signal of the first category corresponding to the received interference strength information or information for the base station to acquire the interference strength information.

Alternatively, the scheduling unit schedules, when determining that uplink transmission of one user equipment is scheduled on a time frequency resource, downlink transmission of at least one user equipment on the time frequency resource, wherein interference strength information of co-channel interference or self-interference caused by the one user equipment to the at least one user equipment satisfies a first preset condition; or, schedules, when determining that downlink transmission of one user equipment is scheduled on a time frequency resource, uplink transmission of at least one user equipment on the time frequency resource, wherein interference strength information of co-channel interference or self-interference caused by the at least one user equipment to the one user equipment satisfies a second preset condition; or, schedules uplink and downlink transmission of a pair of UEs or a single user equipment on a same time frequency resource, wherein interference strength information of co-channel interference caused by one of the pair of UEs to the other one or self-interference of the single user equipment satisfies a third preset condition.

Alternatively, the transmitting unit transmits, according to a specific configuration mode of a downlink reference signal, the downlink reference signals of the first and second categories to the at least one user equipment, and information for indicating the specific configuration mode, a duration of the specific configuration mode, and an initial location of the specific configuration mode to the at least one user equipment, wherein the configuration mode of the downlink reference signal defines an order and number of downlink reference signals of the first and second categories in each period; and/or, the transmitting unit transmits the downlink reference signal of the first category to the at least one user equipment according to a first frequency domain offset location, and the downlink reference signal of the second category to the at least one user equipment according to a second frequency domain offset location; and/or, the transmitting unit transmits the downlink reference signal of the first category to the at least one user equipment using a first spreading code or a first scrambling code, and the downlink reference signal of the second category to the at least one user equipment using a second spreading code or a second scrambling code; and/or, the downlink reference signal of the first category is a downlink reference signal of a first reference signal type, and the downlink reference signal of the second category is a downlink reference signal of a second reference signal type; and/or, the transmitting unit notifies, only based on the downlink reference signal of the second category, the at least one user equipment of reporting the channel measurement quantity.

Alternatively, the transmitting unit transmits, to the at least one user equipment, a plurality of downlink reference signals of the first category, wherein UEs performing uplink transmission on time frequency resources where the plurality of downlink reference signals of the first category are transmitted are the same, wherein the processing unit acquires, based on the information for the base station to acquire the interference strength information reported by the at least one user equipment based on the plurality of downlink reference signals of the first category, the interference strength information, or wherein the received interference strength information is obtained by the at least one user equipment based on the plurality of downlink reference signals of the first category.

According to another exemplary embodiment of the present disclosure, it provides a computer readable storage medium storing a computer program, wherein the above method of measuring interference for a user equipment is implemented when the computer program is executed by a processor.

According to another exemplary embodiment of the present disclosure, it provides a computer readable storage medium storing a computer program, wherein the above method of measuring interference for a base station is implemented when the computer program is executed by a processor.

According to another exemplary embodiment of the present disclosure, it provides a user equipment, wherein the user equipment includes: a processor; and a storage storing a computer program, wherein the above method of measuring interference for a user equipment is implemented when the computer program is executed by a processor.

According to another exemplary embodiment of the present disclosure, it provides a base station, wherein the base station includes: a processor; and a storage storing a computer program, wherein the above method of measuring interference for a base station is implemented when the computer program is executed by a processor.

According to an aspect of the present disclosure, a method for transmitting information on demodulation failure to a base station by a first terminal in a wireless communication system is provided, the method comprising: receiving and demodulating data from the base station; determining N demodulation failure reasons respectively associated with N second terminals causing inter-terminal interference to the first terminal, when demodulation of the data fails; generating information on demodulation failure based on the determined N demodulation failure reasons; and transmitting the information on demodulation failure to the base station, and wherein N is an integer greater than 0.

Wherein, the inter-terminal interference is interference to the first terminal caused by the second terminals when the second terminals perform uplink transmission using the same communication resources as the communication resources used by the first terminal when performing downlink reception.

Wherein, each demodulation failure reason includes one of a first reason and a second reason.

Wherein, the determining the N demodulation failure reasons respectively associated with the N second terminals includes: performing the following steps for each of the N second terminals: determining power of inter-terminal interference to the first terminal caused by a corresponding second terminal; determining that a demodulation failure reason associated with the corresponding second terminal is a first reason when the power of the inter-terminal interference is greater than or equal to a predetermined threshold; and determining that the demodulation failure reason associated with the corresponding second terminal is a second reason when the power of the inter-terminal interference is less than the predetermined threshold.

Wherein, the determining the power of inter-terminal interference to the first terminal caused by the corresponding second terminal includes: determining the power of inter-terminal interference to the first terminal caused by the corresponding second terminal by utilizing communication resources used by an uplink reference signal of the corresponding second terminal and a downlink reference signal of the first terminal.

Wherein, the method further includes: in case where the uplink reference signal of the corresponding second terminal and the downlink reference signal of the first terminal are differentiated through different time resources or different frequency resources, performing the following steps: determining received power PD of the downlink reference signal of the first terminal; determining average power Pnoise of noise by a difference between average power of communication resources used by the downlink reference signal of the first terminal and PD; and determining a difference between average power of communication resources used by the uplink reference signal of the corresponding second terminal and Pnoise as the power of inter-terminal interference to the first terminal caused by the corresponding second terminal.

Wherein, the method further includes: in case where the uplink reference signal of the corresponding second terminal and the downlink reference signal of the first terminal are differentiated through different code resources, performing the following steps: determining received power PD of the downlink reference signal of the first terminal; determining a difference between average power of communication resources used by the downlink reference signal of the first terminal as well as communication resources used by the uplink reference signal of the corresponding second terminal and PD as the power of inter-terminal interference to the first terminal caused by the corresponding second terminal.

Wherein, the determining the power of inter-terminal interference to the first terminal caused by the corresponding second terminal includes: determining the power of inter-terminal interference to the first terminal caused by the corresponding second terminal by utilizing the uplink reference signal of the corresponding second terminal.

Wherein, received power PU of the uplink reference signal of the corresponding second terminal is determined as the power of inter-terminal interference to the first terminal caused by the corresponding second terminal.

Wherein, the determining the N demodulation failure reasons respectively associated with the N second terminals includes: determining a signal-to-noise ratio SNR of the first terminal, and a signal-to-interference-plus-noise ratio SINRprev of the first terminal that is reported most recently and determined based on inter-terminal interferences with the first terminal caused by all of previous second terminals; and performing the following steps for each of the N second terminals: determining a signal-to-interference-plus-noise ratio SINRw of the first terminal based on inter-terminal interference to the first terminal caused by the corresponding second terminal; determining that a demodulation failure reason associated with the corresponding second terminal is a first reason when SINRprev−SNR<a first threshold and SNR−SINRw>a second threshold; and determining that the demodulation failure reason associated with the corresponding second terminal is a second reason when SINRprev−SNR>the first threshold and SNR−SINRw<the second threshold.

Wherein, the method further includes: determining the SNR by a ratio of the received power PD of the downlink reference signal of the first terminal to the average power Pnoise of noise; and wherein the SINRw is determined by a ratio of the PD to a sum of Pnoise and the power of inter-terminal interference to the first terminal caused by the corresponding second terminal; and wherein the SINRprev is determined by a ratio of a previously measured PD to a sum of a previously measured Pnoise and the power of inter-terminal interference to the first terminal caused by all of previous second terminals respectively.

Wherein, the generating information on demodulation failure includes: generating M-bit indication information for the N second terminals as the information on demodulation failure, and wherein M is an integer greater than 0; and determining the M bits as a first value when it is determined that a demodulation failure reason associated with at least one of the N second terminals is a first reason; and determining the M bits as a second value when it is determined that demodulation failure reasons associated with all of the N second terminals are all the second reasons.

Wherein, the generating information on demodulation failure includes: performing the following steps for each of the N second terminals: generating M-bit indication information having a first value when it is determined that a demodulation failure reason associated with a corresponding second terminal is a first reason, wherein M is an integer greater than 0; and generating M-bit indication information having a second value when it is determined that the demodulation failure reason associated with the corresponding second terminal is a second reason; and generating the information on demodulation failure in one of the following ways: combining the M-bit indication information having the first value; or combining the M-bit indication information having the first value and the M-bit indication information having the second value.

Wherein, the first value is a first predetermined bit sequence; and the second value is a second predetermined bit sequence different from the first predetermined bit sequence.

Wherein, the first value indicates power of inter-terminal interference to the first terminal caused by the corresponding second terminal; and the second value indicates power of inter-terminal interference to the first terminal caused by the corresponding second terminal.

Wherein, the generating information on demodulation failure includes: determining at least one of a scrambling code sequence and a spreading code sequence used in feeding back a negative acknowledgment (NACK) based on the N demodulation failure reasons; and performing corresponding at least one of a scrambling operation and a spreading operation on the NACK using the determined at least one of the scrambling code sequence and the spreading code sequence.

Wherein, the method further includes: for each of the N second terminals, indicating a demodulation failure reason with 1 bit, thereby determining a code sequence containing bits each corresponding to each of the N second terminals; and determining the at least one of the scrambling code sequence and the spreading code sequence used in feeding back the NACK based on the code sequence.

According to another aspect of the present disclosure, a method for processing information on demodulation failure received from a first terminal by a base station in a wireless communication system is provided, the method includes: receiving the information on demodulation failure from the first terminal; determining N demodulation failure reasons respectively associated with N second terminals causing inter-terminal interference to the first terminal based on the information on demodulation failure; scheduling uplink transmission of the N second terminals based on the determined N demodulation failure reasons, and wherein N is an integer greater than 0.

Wherein, the inter-terminal interference is interference to the first terminal caused by the second terminals when the second terminals perform uplink transmission using the same communication resources as the communication resources used by the first terminal when performing downlink reception.

Wherein, each demodulation failure reason includes one of a first reason and a second reason.

Wherein, the determining the N demodulation failure reasons respectively associated with the N second terminals includes: extracting M-bit indication information for the N second terminals from the information on demodulation failure, wherein M is an integer greater than 0; and determining that at least one of the N demodulation failure reasons is a first reason when the M-bit indication information is a first value; and determining that the N demodulation failure reasons are all the second reasons when the M-bit indication information is a second value.

Wherein, the determining the N demodulation failure reasons respectively associated with the N second terminals includes: extracting N pieces of M-bit indication information for the N second terminals respectively from the information on demodulation failure, wherein M is an integer greater than 0; and performing the following steps for each of the N second terminals: determining that a demodulation failure reason associated with a corresponding second terminal is a first reason when the M-bit indication information for the corresponding second terminal is a first value; and determining that the demodulation failure reason associated with the corresponding second terminal is a second reason when the M-bit indication information for the corresponding second terminal is a second value.

Wherein, the first value is a first predetermined bit sequence; and the second value is a second predetermined bit sequence different from the first predetermined bit sequence.

Wherein, the first value indicates power of inter-terminal interference to the first terminal caused by the corresponding second terminal and the power is greater than or equal to a predetermined threshold; and the second value indicates power of inter-terminal interference to the first terminal caused by the corresponding second terminal and the power is less than the predetermined threshold.

Wherein, the determining the N demodulation failure reasons respectively associated with the N second terminals includes: extracting K pieces of M-bit indication information for K second terminals of the N second terminals respectively from the information on demodulation failure, wherein M is an integer greater than 0 and K is an integer greater than 0 and less than N; and performing the following steps for each of the N second terminals: determining that a demodulation failure reason associated with the corresponding second terminal is a first reason, when the extracted K pieces of M-bit indication information contains M-bit indication information for the corresponding second terminal; and determining that the demodulation failure reason associated with the corresponding second terminal is a second reason, when the extracted K pieces of M-bit indication information does not contain M-bit indication information for the corresponding second terminal.

Wherein the determining the N demodulation failure reasons respectively associated with the N second terminals includes: determining at least one of a scrambling code sequence and a spreading code sequence used when the first terminal feeds back a negative acknowledgment (NACK), based on the information on demodulation failure; and determining the N demodulation failure reasons respectively associated with the N second terminals based on the determined at least one of the scrambling code sequence and the spreading code sequence.

The method further includes: determining a code sequence based on the information on demodulation failure, wherein the code sequence includes 1 bit for each of the N second terminals, and the 1 bit indicates a demodulation failure reason; and determining the N demodulation failure reasons respectively associated with the N second terminals based on the code sequence.

Wherein, the scheduling uplink transmission of the N second terminals based on the determined N demodulation failure reasons includes: not scheduling uplink transmission of the N second terminals, when it is determined that at least one of the N demodulation failure reasons is a first reason; and continuing scheduling uplink transmission of the N second terminals, when it is determined that the N demodulation failure reasons are all the second reasons.

Wherein, the scheduling uplink transmission of the N second terminals based on the determined N demodulation failure reasons includes: updating at least one of an inter-terminal interference pairing table and an inter-terminal interference power table of the base station based on the determined N demodulation failure reasons; and scheduling uplink transmission of the N second terminals based on the updated at least one of the inter-terminal interference pairing table and the inter-terminal interference power table of the base station.

Wherein, the updating at least one of the inter-terminal interference pairing table and the inter-terminal interference power table of the base station based on the determined result includes: performing the following steps for each of the N second terminals: updating at least one of the inter-terminal interference pairing table and the inter-terminal interference power table of the base station, when it is determined that a demodulation failure reason associated with a corresponding second terminal is a first reason; and not updating the inter-terminal interference pairing table and the inter-terminal interference power table of the base station when it is determined that the demodulation failure reason associated with the corresponding second terminal is a second reason.

According to yet another aspect of the present disclosure, a first terminal that transmits information on demodulation failure to a base station in a wireless communication system is provided, the first terminal includes: a transceiver configured to receive and demodulate data from a base station; and a controller configured to: determine N demodulation failure reasons respectively associated with N second terminals causing inter-terminal interference to the first terminal, when demodulation of the data fails; generate the information on demodulation failure based on the determined N demodulation failure reasons; and control the transceiver to transmit the information on demodulation failure to the base station, and wherein N is an integer greater than 0.

Wherein, the inter-terminal interference is interference to the first terminal caused by the second terminals when the second terminals perform uplink transmission using the same communication resources as the communication resources used by the first terminal when performing downlink reception.

Wherein, each demodulation failure reason includes one of a first reason and a second reason.

According to yet another aspect of the present disclosure, a base station that processes information on demodulation failure received from a first terminal in a wireless communication system is provided, the base station comprising: a transceiver configured to receive the information on demodulation failure from the first terminal; and a controller configured to: determine N demodulation failure reasons respectively associated with N second terminals causing inter-terminal interference to the first terminal, based on the information on demodulation failure; schedule uplink transmission of the N second terminals based on the determined N demodulation failure reasons, and wherein N is an integer greater than 0.

Wherein, the inter-terminal interference is interference to the first terminal caused by the second terminals when the second terminals perform uplink transmission using the same communication resources as the communication resources used by the first terminal when performing downlink reception.

Wherein, each demodulation failure reason includes one of a first reason and a second reason.

According to an aspect of the present application, a method for activating full-duplex communication of a user equipment (UE) by a base station (BS) in a communication system is provided, which includes: receiving, from the UE, information indicating that the UE has a full-duplex communication capability; transmitting, to the UE, control signaling notifying the UE to activate the full-duplex communication capability; and scheduling full-duplex transmission for the UE after the UE completes initialization of a self-interference cancellation module; wherein, the BS further configures a full-duplex mode timer and notifies the UE of configuration of the full-duplex mode timer.

According to another aspect of the present application, the BS allocates uplink resources for the UE for performing initialization of the self-interference cancellation module.

According to another aspect of the present application, the BS schedules half-duplex transmission for the UE within a period of time T for transmitting the control signaling, wherein T depends on time required by the UE to perform the initialization of the self-interference cancellation module.

According to another aspect of the present application, the BS schedules full-duplex transmission for the UE after the period of time T during which the BS transmits the control signaling and before the full-duplex mode timer expires.

According to another aspect of the present application, the BS allocates uplink resources to the UE for updating coefficients of the self-interference cancellation module of the UE.

According to another aspect of the present application, the BS switches a channel for the UE while maintaining full-duplex communication of the UE.

According to another aspect of the present application, the BS allocates a number of uplink resources to the UE for performing the initialization of the self-interference cancellation module while switching the channel for the UE.

According to another aspect of the present application, the BS schedules half-duplex transmission for the UE after switching a channel for the UE, and reactivates the full-duplex communication capability of the UE and schedules full-duplex transmission for the UE.

According to another aspect of the present application, the BS notifies the UE to use the same full-duplex timer as that before the switching or to start a new full-duplex timer.

According to another aspect of the present application, a distance between two frequency points for the UE before and after the channel switching is less than a first frequency point threshold and the UE has a same channel bandwidth before and after the channel switching, or the UE has a same frequency point before and after the channel switching and a difference between two channel bandwidths for the UE before and after the channel switching is less than a first bandwidth threshold.

According to another aspect of the present application, a distance between two frequency points for the UE before and after the channel switching is greater than a first frequency point threshold but less than a second frequency point threshold and the UE has a same channel bandwidth before and after the channel switching, or the UE has a same frequency point before and after the channel switching and a difference between two channel bandwidths for the UE before and after the channel switching is greater than a first bandwidth threshold but less than a second bandwidth threshold.

According to another aspect of the present application, a distance between two frequency points for the UE before and after the channel switching is greater than a second frequency point threshold and the UE has a same channel bandwidth before and after the channel switching, or the UE has a same frequency point before and after the channel switching and a difference between two channel bandwidths for the UE before and after the channel switching is greater than a second bandwidth threshold.

According to another aspect of the present application, wherein the UE initializes the self-interference cancellation module using uplink resources previously allocated by the BS.

According to another aspect of the present application, the BS receives, from the UE, information on power of interference between UEs and power of residual self-interference of the UE measured by the UE, and updates a user pairing table and a user interference power information table based on the information; and the BS schedules transmission for users based on the user pairing table or the user interference power information table.

According to another aspect of the present application, wherein the BS quantizes the power of interference between UEs and the power of residual self-interference of the UE with corresponding levels in the user interference power information table.

According to another aspect of the present application, the BS performs channel switching for the UE, and determines whether to update the user pairing table and the user interference power information table based on a difference between channels before and after switching.

According to another aspect of the present application, a method for activating full-duplex communication at a user equipment (UE) in a communication system is provided, which includes: transmitting, to a base station (BS), information indicating that the UE has a full-duplex communication capability; receiving, from the BS, control signaling notifying the UE to activate the full-duplex communication capability; and receiving a scheduling of the BS for full-duplex transmission after completing initialization of a self-interference cancellation module; wherein the UE further receives a notification about configuration of a full-duplex mode timer from the BS.

According to another aspect of the present application, a method for communicating at a user equipment (UE) in a communication system is provided, which includes: transmitting, to a base station (BS), information indicating that the UE has a full-duplex communication capability; transmitting, to the BS, measured interference power information; and receiving a scheduling of the BS based on the interference power information for communicating.

According to another aspect of the present application, a base station (BS) in a communication system is provided, wherein the BS is adapted to perform methods as previously described.

According to another aspect of the present application, a communication system is provided, which includes a base station (BS) as previously described.

According to an aspect of the present disclosure, a method performed by a base station in a wireless communication system is provided, which includes: allocating resources for a plurality of apparatuses communicating with the base station based on a level of inter-apparatus interference among the plurality of apparatuses; and indicating the allocated resources to the plurality of apparatuses.

Optionally, the method further includes: allocating unallocated resources to an optimal apparatus selected based on the level of inter-apparatus interference from at least one candidate apparatus determined for the unallocated resources according to a predetermined resource allocation criterion.

Optionally, the method further includes: selecting, as the optimal apparatus, a candidate apparatus causing inter-apparatus interference of a level lower than a predetermined level to each of one or more resource-adjacent apparatuses to which adjacent resources of the unallocated resources are allocated and most satisfying the predetermined resource allocation criterion.

Optionally, the level of the inter-apparatus interference caused to each of the one or more resource-adjacent apparatuses depends on: power of co-channel interference caused by a corresponding candidate apparatus to a corresponding resource-adjacent apparatus under the assumption that the corresponding candidate apparatus and the corresponding resource-adjacent apparatus use the same resources for uplink transmission and downlink reception respectively.

Optionally, the level of the inter-apparatus interference caused to each of the one or more resource-adjacent apparatuses depends on: a difference obtained by subtracting a distance between the corresponding candidate apparatus and the corresponding resource-adjacent apparatus from a sum of a distance between the corresponding candidate apparatus and the base station and a distance between the corresponding resource-adjacent apparatus and the base station.

Optionally, the level of the inter-apparatus interference caused to each of the one or more resource-adjacent apparatuses depends on: an absolute value of a difference between a downlink reception time window of the corresponding resource-adjacent apparatus and a time when a signal from the corresponding candidate apparatus reaches the corresponding resource-adjacent apparatus.

Optionally, the signal from the corresponding candidate apparatus is a preamble.

Optionally, the method further includes: allocating reserved edge resources for the plurality of apparatuses as guard regions based on the level of the inter-apparatus interference.

Optionally, the method further includes: indicating reserved edge resources to each apparatus respectively through signaling for each apparatus.

Optionally, the method further includes: indicating the allocated reserved edge resources to all apparatuses within an apparatus group through apparatus group-specific signaling.

Optionally, the method further includes: allocating different reserved edge resources for the plurality of apparatuses, and, wherein, the allocated different reserved edge resources enable inter-apparatus interference caused by any apparatus to an apparatus to which adjacent resources are allocated to be smaller than a predetermined threshold.

Optionally, the method further includes: allocating same reserved edge resources for the plurality of apparatuses, and, wherein, the allocated same reserved edge resources enable inter-apparatus interference caused by any apparatus to any other apparatus to be smaller than a predetermined threshold.

Optionally, the resources allocated for the plurality of apparatuses are one of resources orthogonal in the frequency domain and resources orthogonal in the time domain.

Optionally, the reserved edge resources include at least one of null subcarriers, null OFDM symbols and null cyclic prefixes.

According to another aspect of the present disclosure, a base station in a wireless communication system is provided, which includes: a transceiver, configured to transmit and receive signals; and a controller, configured to allocate resources for a plurality of apparatuses communicating with the base station based on a level of inter-apparatus interference among the plurality of apparatuses, and to control the transceiver to indicate the allocated resources to the plurality of apparatuses.

Optionally, the controller is further configured to: allocate unallocated resources to an optimal apparatus selected based on the level of the inter-apparatus interference from at least one candidate apparatus determined for the unallocated resources according to a predetermined resource allocation criterion.

Optionally, the controller is further configured to: select, as the optimal apparatus, a candidate apparatus causing inter-apparatus interference of a level lower than a predetermined level to each of one or more resource-adjacent apparatuses to which adjacent resources of the unallocated resources are allocated and most satisfying the predetermined resource allocation criterion.

Optionally, the level of the inter-apparatus interference caused to each of the one or more resource-adjacent apparatuses depends on: power of co-channel interference caused by a corresponding candidate apparatus to a corresponding resource-adjacent apparatus under the assumption that the corresponding candidate apparatus and the corresponding resource-adjacent apparatus use the same resources for uplink transmission and downlink reception respectively.

Optionally, the level of the inter-apparatus interference caused to each of the one or more resource-adjacent apparatuses depends on: a difference obtained by subtracting a distance between the corresponding candidate apparatus and the corresponding resource-adjacent apparatus from a sum of a distance between the corresponding candidate apparatus and the base station and a distance between the corresponding resource-adjacent apparatus and the base station.

Optionally, the level of the inter-apparatus interference caused to each of the one or more resource-adjacent apparatuses depends on: an absolute value of a difference between a downlink reception time window of the corresponding resource-adjacent apparatus and a time when a signal from the corresponding candidate apparatus reaches the corresponding resource-adjacent apparatus.

Optionally, the signal from the corresponding candidate apparatus is a preamble.

Optionally, the controller is further configured to: allocate reserved edge resources for the plurality of apparatuses as guard regions based on the level of the inter-apparatus interference.

Optionally, the controller is further configured to: control the transceiver to indicate reserved edge resources to each apparatus respectively through signaling for each apparatus.

Optionally, the controller is further configured to: control the transceiver to indicate the allocated reserved edge resources to all apparatuses within an apparatus group through apparatus group-specific signaling.

Optionally, the controller is further configured to: allocate different reserved edge resources for the plurality of apparatuses, and, wherein, the allocated different reserved edge resources enable inter-apparatus interference caused by any apparatus to an apparatus to which adjacent resources are allocated to be smaller than a predetermined threshold.

Optionally, the controller is further configured to: allocate same reserved edge resources for the plurality of apparatuses, and, wherein, the allocated same reserved edge resources enable inter-apparatus interference caused by any apparatus to any other apparatus to be smaller than a predetermined threshold.

Optionally, resources allocated for the plurality of apparatuses are one of resources orthogonal in the frequency domain and resources orthogonal in the time domain.

Optionally, the reserved edge resources include at least one of null subcarriers, null OFDM symbols and null cyclic prefixes.

According to yet another aspect of the present disclosure, a method performed by an apparatus in a wireless communication system is provided, which includes:
    acquiring, from a base station, resources allocated for the apparatus by the base station based on a level of inter-apparatus interference between the apparatus and a plurality of other apparatuses communicating with the base station; and communicating based on the allocated resources.

Optionally, the method further includes: transmitting a location of the apparatus to the base station so that the base station determines the level of the inter-apparatus interference between the apparatus and the plurality of other apparatuses based on the location of the apparatus.

Optionally, the location of the apparatus is used by the base station to determine power of co-channel interference caused by the apparatus to one of the plurality of other apparatuses under the assumption that the apparatus and the one of the plurality of other apparatuses use the same resources for uplink transmission and downlink reception respectively.

Optionally, the location of the apparatus is used by the base station to determine a difference obtained by subtracting a distance between the apparatus and the one of the plurality of other apparatuses from a sum of a distance between the apparatus and the base station and a distance between the one of the plurality of other apparatuses and the base station, and to further determine whether the difference is smaller than or equal to a predetermined threshold.

Optionally, the method further includes: transmitting, to the base station, an absolute value of a difference between a downlink reception time window of the apparatus and a time when a signal from the plurality of other apparatuses reaches the apparatus, so that the base station determines the level of the inter-apparatus interference between the apparatus and the plurality of other apparatuses based on the absolute value.

Optionally, the signal from the plurality of other apparatuses is a preamble.

Optionally, the method further includes: in case that a preamble identifier (ID) received from the base station is not for the apparatus, receiving, by the apparatus, a preamble corresponding to the preamble ID from another apparatus which the preamble ID is for, and determining an absolute value of a difference between the downlink reception time window of the apparatus and a time when the preamble reaches the apparatus.

Optionally, the method further includes: acquiring, from the base station, reserved edge resources allocated by the base station for the apparatus as a guard region.

Optionally, the method further includes: acquiring the reserved edge resources from the base station through signaling for the apparatus.

Optionally, the method further includes: acquiring the reserved edge resources from the base station through apparatus group-specific signaling.

Optionally, resources allocated for the apparatus are one of resources orthogonal in the frequency domain and resources orthogonal in the time domain.

Optionally, the reserved edge resources include at least one of null subcarriers, null OFDM symbols and null cyclic prefixes.

Optionally, the apparatus includes one of a user terminal, an integrated access and backhaul (IAB) node, and a mobile terminal (MT) module of the TAB node.

Optionally, the method further includes: determining resources for communication based on the allocated resources.

Optionally, the method further includes: determining resources for communication based on resources scheduled by the base station and the reserved edge resources.

Optionally, the method further includes: determining downlink resources scheduled by the base station as resources for downlink reception, and determining resources remaining after subtracting the reserved edge resources from uplink resources scheduled by the base station as resources for uplink transmission.

Optionally, the method further includes: determining resources remaining after subtracting the reserved edge resources from downlink resources scheduled by the base station as resources for downlink reception, and determining resources remaining after subtracting the reserved edge resources from uplink resources scheduled by the base station as resources for uplink transmission.

Optionally, the method further includes: determining resources for communication based on the allocated resources and frame structure information.

Optionally, the method further includes: determining, as resources for downlink reception, resources remaining after subtracting resources corresponding to a guard interval from downlink resources in the allocated resources, and determining, as resources for uplink transmission, resources remaining after subtracting resources corresponding to the guard interval from uplink resources in the allocated resources.

Optionally, the method further includes: determining resources for communication based on the resources scheduled by the base station, the reserved edge resources, and the frame structure information.

Optionally, the method further includes: determining, as resources for downlink reception, resources remaining after subtracting resources corresponding to the guard interval from downlink resources scheduled by the base station, and determining, as resources for uplink transmission, resources remaining after subtracting both the reserved edge resources and resources corresponding to the guard interval from uplink resources scheduled by the base station.

Optionally, the method further includes: determining, as resources for downlink reception, resources remaining after subtracting both the reserved edge resources and resources corresponding to the guard interval from downlink resources scheduled by the base station, and determining, as resources for uplink transmission, resources remaining after subtracting both the reserved edge resources and resources corresponding to the guard interval from uplink resources scheduled by the base station.

Optionally, the method further includes: communicating based on the determined resources for communication.

According to still another aspect of the present disclosure, an apparatus in a wireless communication system is provided, which includes: a transceiver, configured to transmit a signal and receive a signal; a controller, configured to acquire, from signaling from a base station, resources allocated for the apparatus based on a level of inter-apparatus interference between the apparatus and a plurality of apparatuses communicating with the base station by the base station, and to control the transceiver to communicate based on the allocated resources.

Optionally, the controller is further configured to: control the transceiver to transmit a location of the apparatus to the base station, so that the base station determines the level of the inter-apparatus interference between the apparatus and the plurality of apparatuses communicating with the base station based on the location of the apparatus.

Optionally, the location of the apparatus is used by the base station to determine power of co-channel interference caused by the apparatus to one of the plurality of apparatuses communicating with the base station under the assumption that the apparatus and the one of the plurality of apparatuses communicating with the base station use the same resources for communication.

Optionally, the location of the apparatus is used by the base station to determine a difference obtained by subtracting a distance between the apparatus and the one of the plurality of apparatuses from a sum of a distance between the apparatus and the base station and a distance between the one of the plurality of apparatuses and the base station, and to further determine whether the difference is smaller than or equal to a predetermined threshold.

Optionally, the controller is further configured to control the transceiver to transmit, to the base station, an absolute value of a difference between a downlink reception time window of the apparatus and a time when a signal from another apparatus reaches the apparatus, so that the base station determines the level of the inter-apparatus interference between the apparatus and the other apparatus based on the absolute value.

Optionally, the signal from the other apparatus is a preamble.

Optionally, the controller is further configured to: in case that a preamble identifier (ID) received from the base station is not for the apparatus, receive a preamble corresponding to the preamble ID from another apparatus which the preamble ID is for, and determine an absolute value of a difference between the downlink reception time window of the apparatus and a time when the preamble reaches the apparatus.

Optionally, the controller is further configured to: acquire, from the base station, reserved edge resources allocated by the base station for the apparatus as a guard region.

Optionally, the controller is further configured to: acquire the reserved edge resources from the base station through signaling for the apparatus.

Optionally, the controller is further configured to acquire the reserved edge resources from the base station through apparatus group-specific signaling.

Optionally, resources allocated for the apparatus are one of resources orthogonal in the frequency domain and resources orthogonal in the time domain.

Optionally, the reserved edge resources include at least one of null subcarriers, null OFDM symbols and null cyclic prefixes.

Optionally, the apparatus includes one of a user terminal, an integrated access and backhaul (IAB) node, and a mobile terminal (MT) module of the TAB node.

Optionally, the controller is further configured to: determine resources for communication based on the allocated resources.

Optionally, the controller is further configured to: determine resources for communication based on resources scheduled by the base station and the reserved edge resources.

Optionally, the controller is further configured to: determine downlink resources scheduled by the base station as resources for downlink reception, and determine resources remaining after subtracting the reserved edge resources from uplink resources scheduled by the base station as resources for uplink transmission.

Optionally, the controller is further configured to: determine resources remaining after subtracting the reserved edge resources from downlink resources scheduled by the base station as resources for downlink reception, and determine resources remaining after subtracting the reserved edge resources from uplink resources scheduled by the base station as resources for uplink transmission.

Optionally, the controller is further configured to: determine resources for communication based on the allocated resources and frame structure information.

Optionally, the controller is further configured to: determine, as resources for downlink reception, resources remaining after subtracting resources corresponding to a guard interval from downlink resources in the allocated resources, and determine, as resources for uplink transmission, resources remaining after subtracting resources corresponding to the guard interval from uplink resources in the allocated resources.

Optionally, the controller is further configured to: determine resources for communication based on the resources scheduled by the base station, the reserved edge resources, and the frame structure information.

Optionally, the controller is further configured to: determine, as resources for downlink reception, resources remaining after subtracting resources corresponding to the guard interval from downlink resources scheduled by the base station, and determine, as resources for uplink transmission, resources remaining after subtracting both the reserved edge resources and resources corresponding to the guard interval from uplink resources scheduled by the base station.

Optionally, the controller is further configured to: determine, as resources for downlink reception, resources remaining after subtracting both the reserved edge resources and resources corresponding to the guard interval from downlink resources scheduled by the base station, and determine, as resources for uplink transmission, resources remaining after subtracting both the reserved edge resources and resources corresponding to the guard interval from uplink resources scheduled by the base station.

Optionally, the controller is further configured to: control the transceiver to communicate based on the determined resources for communication.

According to an aspect of the present disclosure, a method performed by an apparatus in a wireless communication system is provided, which includes: acquiring reserved edge resources allocated for the apparatus by a base station from the base station; and communicating based on the reserved edge resources.

Optionally, the reserved edge resources are used as a guard region by the apparatus.

Optionally, the method further includes: acquiring the reserved edge resources from the base station through signaling for the apparatus.

Optionally, the method further includes: acquiring the reserved edge resource from the base station through apparatus group-specific signaling for an apparatus group in which the apparatus is located.

Optionally, wherein the reserved edge resources enable inter-apparatus interference caused by the apparatus to an apparatus to which adjacent resources are allocated to be smaller than a predetermined threshold.

Optionally, wherein the reserved edge resources enable inter-apparatus interference caused by the apparatus to any other apparatus to be smaller than a predetermined threshold.

Optionally, wherein the reserved edge resources include at least one of null subcarriers, null OFDM symbols and null cyclic prefixes.

Optionally, the method further includes: determining downlink resources scheduled by the base station as resources for downlink reception, and determining resources remaining after subtracting the reserved edge resources from uplink resources scheduled by the base station as resources for uplink transmission.

Optionally, the method further includes: determining resources remaining after subtracting the reserved edge resources from downlink resources scheduled by the base station as resources for downlink reception, and determining resources remaining after subtracting the reserved edge resources from uplink resources scheduled by the base station as resources for uplink transmission.

Optionally, the method further includes: determining resources for communication based on the reserved edge resources and frame structure information received from the base station, and communicating based on the determined resources.

Optionally, wherein the apparatus includes one of a user terminal, an integrated access and backhaul (TAB) node, and a mobile terminal (MT) module of the TAB node.

Advantageous Effects of Invention

The method of measuring interference for a user equipment and device and the method of measuring interference for a base station and device according to the exemplary embodiments of the present disclosure can acquire interference strength information of co-channel interference between UEs in a cell or self-interference of a user equipment, thereby facilitating more accurate scheduling of the user equipment by the base station based on the interference strength information so as to make interference caused by uplink transmission to downlink transmission on the same time frequency resource comparatively small and improve a transmission rate and throughput of a wireless communication system.

Other aspects and/or advantages in a general concept of the present disclosure will be partially illustrated in the following description, and the rest will be clarified through further description or may be learned through implementation of the general concept of the present disclosure.

According to the present invention, information indicating a demodulation failure reason is carried in information feeding back a demodulation result, so that the base station can make better decisions during subsequent retransmission or scheduling and realize better utilization of communication resources.

By adopting resource allocation methods in the present disclosure, additional interference due to time misalignment between the time when a signal transmitted by a base station is received by an apparatus and the time when a signal transmitted by other apparatuses is received by the apparatus can be effectively reduced, thereby improving throughput of the whole system.

BRIEF DESCRIPTION OF DRAWINGS

Through the following descriptions made in conjunction with the figures schematically illustrating the embodiments, the above and other purposes and features of the exemplary embodiments of the present disclosure will become more clear, among the figures:

FIG. 1 illustrates a flowchart illustrating a method of measuring interference for a user equipment according to an exemplary embodiment of the present disclosure;

FIG. 2 illustrates a flowchart illustrating a method of measuring interference for a base station according to an exemplary embodiment of the present disclosure;

FIG. 3 illustrates a flowchart illustrating the method of measuring interference for a user equipment according to Embodiment 1 of the present disclosure;

FIG. 5 illustrates a flowchart illustrating the method of measuring interference for a base station according to Embodiment 1 of the present disclosure;

FIG. 6 illustrates a flowchart illustrating the method of measuring interference for a user equipment according to Embodiment 2 of the present disclosure;

FIG. 9 illustrates a flowchart illustrating the method of measuring interference for a base station according to Embodiment 2 of the present disclosure;

FIG. 10 illustrates a flowchart illustrating the method of measuring interference for a user equipment according to Embodiment 3 of the present disclosure;

FIG. 11 illustrates a flowchart illustrating the method of measuring interference for a base station according to Embodiment 3 of the present disclosure;

FIG. 12 illustrates a structure diagram of a user equipment according to an exemplary embodiment of the present disclosure; and FIG. 13 illustrates a structure diagram of a base station according to an exemplary embodiment of the present disclosure.

FIG. 14 is a schematic diagram illustrating a wireless communication system according to an embodiment of the present disclosure.

FIG. 18 illustrates a method 180 for transmitting information on demodulation failure to a base station by a first terminal in a wireless communication system.

FIG. 19 illustrates a method 190 for processing information on demodulation failure received from a first terminal and performing scheduling by a base station in a wireless communication system.

FIG. 20 is a schematic diagram illustrating a structure of a first terminal 200.

FIG. 21 is a schematic diagram illustrating a structure of a second terminal 210.

FIG. 22 is a diagram illustrating changes of a frequency point and bandwidth when a base station (BS) performs channel switching for a user equipment (UE) according to an embodiment of the present disclosure;

FIG. 23 is a diagram illustrating a method of scheduling full-duplex communication for a UE by a base station according to an embodiment of the present disclosure; and FIG. 24 is a diagram illustrating a method of scheduling full-duplex communication for a UE by a base station according to another embodiment of the present disclosure.

FIG. 25 is a diagram showing a full duplex system according to the present disclosure.

FIG. 26 shows a situation of resource allocation and signal reception when orthogonal frequency divided resources are allocated for apparatuses.

FIG. 27 shows a situation of resource allocation and signal reception when orthogonal time divided resources are allocated for apparatuses.

FIG. 28 is a diagram showing a method of allocating resources by a base station for apparatuses communicating with the base station according to the present disclosure.

FIG. 29 is a diagram showing a method of allocating resources by a base station for apparatuses communicating with the base station according to the present disclosure.

FIG. 30 is a diagram showing a method of allocating resources by a base station for apparatuses communicating with the base station according to the present disclosure.

FIG. 31 shows a time difference between a downlink reception time window of apparatus j and an arrival time of a preamble transmitted by apparatus i according to the present disclosure.

FIG. 33 shows a situation of resource allocation when orthogonal frequency divided resources are allocated for apparatuses according to the present disclosure.

FIG. 34 shows modes for reserving edge resources according to the present disclosure.

FIG. 35 is a block diagram showing a structure of a base station according to the present disclosure.

FIG. 36 is a block diagram showing a structure of an apparatus according to the present disclosure.

Throughout the drawings and detailed description, unless otherwise specified, like reference numerals will be understood to refer to like elements, features and structures.

MODE FOR THE INVENTION

Figure 4:
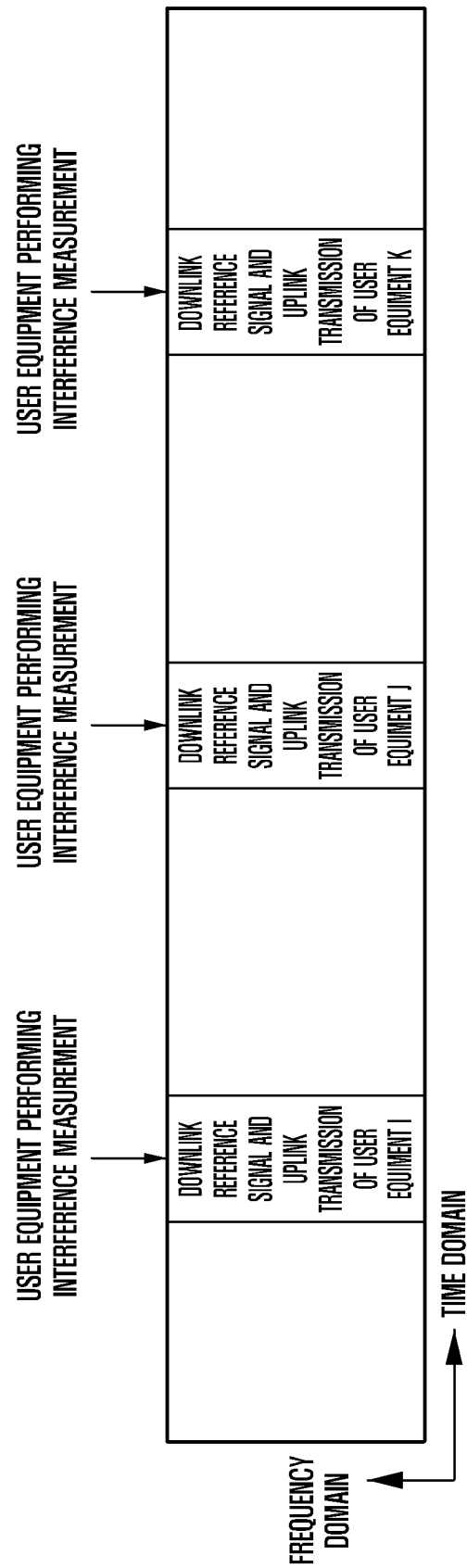
FIG. 4 illustrates an example of performing co-channel interference measurement based on a downlink reference signal of a first category according to an exemplary embodiment of the present disclosure.

Now the exemplary embodiments of the present disclosure will be specifically referred to, and the examples of the embodiment are illustrated in the figures in which the same reference numerals always refer to the same parts. Hereinafter, the embodiments will be explained with reference to the figures so as to facilitate explanation on the present disclosure.

FIG. 1 illustrates a flowchart illustrating a method of measuring interference for a user equipment (UE) according to an exemplary embodiment of the present disclosure. As an example, the user equipment may be a user equipment that supports full duplex communication or half duplex communication.

Referring to FIG. 1, at step S101, a downlink reference signal is received from a base station.

As an example, a downlink reference signal of a first category may be received from the base station. Here, the downlink reference signal of the first category is: a downlink reference signal transmitted on a time frequency resource with scheduled uplink transmission; in other words, on the time frequency resource where the downlink reference signal of the first category is transmitted, the base station schedules uplink transmission of one or more UEs.

As another example, the downlink reference signal of the first category and a downlink reference signal of a second category may be respectively received from the base station. Here, the downlink reference signal of the second category is: a downlink reference signal transmitted on a time frequency resource without scheduled uplink transmission; in other words, on the time frequency resource where the downlink reference signal of the second category is transmitted, the base station does not schedule uplink transmission of any user equipment.

At step S102, based on the received downlink reference signal of the first category, interference strength information of co-channel interference or self-interference caused by a user equipment, which performs uplink transmission on the time frequency resource where the received downlink reference signal of the first category is transmitted, to a current user equipment (i.e., the user equipment performing the method of measuring interference), or information for the base station to acquire the interference strength information of the co-channel interference or the self-interference is acquired.

As an example, the interference strength information may indicate a magnitude of interference strength of the corresponding co-channel interference or self-interference. As an example, the interference strength information may be a specific numerical value, and may also be a quantized value of a numerical value. For example, when the interference strength information is a specific numerical value, the greater the interference strength information is, the greater the interference strength of the corresponding co-channel interference or self-interference is.

It should be understood that the user equipment performing uplink transmission on a time frequency resource where the received downlink reference signal is transmitted may be the current user equipment itself, and may also be other UEs. If the user equipment performing uplink transmission on the time frequency resource where the received downlink reference signal is transmitted is a plurality of UEs, interference strength information of co-channel interference or self-interference caused by each of the plurality of UEs to the current user equipment, or information for the base station to acquire the interference strength information of the co-channel interference or the self-interference caused by the each user equipment to the current user equipment may be acquired.

As an example, an estimated downlink reference signal part of the first category may be deducted from the received signal, and the interference strength information may be determined based on a remaining signal part. For example, average power of a symbol corresponding to the remaining signal part or a quantized value of the average power may be taken as the interference strength information. For example, the downlink reference signal part of the first category in the received signal may be estimated in a manner of: estimating a downlink channel based on the received downlink reference signal of the first category, and reconstructing the downlink reference signal part of the first category in the received signal based on a parameter of the estimated downlink channel. It should be understood that the interference strength information may also be determined based on the remaining signal part using other proper manners.

As another example, the interference strength information may be determined based on a channel measurement quantity obtained based on the received downlink reference signal of the first category. As an example, the channel measurement quantity may include at least one of: reference signal receiving power (RSRP), reference signal received quality (RSRQ) and a signal-to-noise and interference ratio (SINR). For example, a ratio of reference signal received power to a signal-to-noise and interference ratio based on the received downlink reference signal of the first category or a quantized value of the ratio may be taken as the interference strength information. It should be understood that the interference strength information may be determined based on the channel measurement quantity obtained based on the received downlink reference signal of the first category using other proper manners.

As another example, the interference strength information may be acquired based on the received downlink reference signals of the first and second categories. For example, a difference between average power of a symbol corresponding to the received downlink reference signal of the first category and average power of a symbol corresponding to the received downlink reference signal of the second category or a quantized value of the difference may be taken as the interference strength information. For example, a difference between reference signal received quality of the received downlink reference signal of the second category and reference signal received quality of the received downlink reference signal of the first category or a quantized value of the difference may be taken as the interference strength information. For example, a difference between a signal-to-noise and interference ratio of the received downlink reference signal of the second category and a signal-to-noise and interference ratio of the received downlink reference signal of the first category or a quantized value of the difference may be taken as the interference strength information. It should be understood that the interference strength information may be acquired based on the received downlink reference signals of the first and second categories using other proper manners.

As an example, the information for the base station to acquire the interference strength information may include: a channel measurement quantity obtained based on the received downlink reference signal of the first category. For example, the channel measurement quantity may include: reference signal received power or a signal-to-noise and interference ratio.

As another example, the information for the base station to acquire the interference strength information may include: a channel measurement quantity obtained based on the received downlink reference signal of the first category and a channel measurement quantity obtained based on the received downlink reference signal of the second category. For example, the channel measurement quantity may include: reference signal received quality and/or a signal-to-noise and interference ratio.

As another example, the information for the base station to acquire the interference strength information may include: average power of a symbol corresponding to the received downlink reference signal of the first category and average power of a symbol corresponding to the received downlink reference signal of the second category.

In addition, as an example, the interference strength information or the information for the base station to acquire the interference strength information may be acquired based on a plurality of received downlink reference signals of the first category, wherein UEs performing uplink transmission on the time frequency resources where the plurality of downlink reference signals of the first category are transmitted are the same. Thus, operations such as averaging may be performed on the interference strength information or the information for the base station to acquire the interference strength information obtained respectively based on each of the plurality of downlink reference signals of the first category, and an operation result may be reported to the base station so as to improve accuracy in interference measurement.

As an example, the method of measuring interference for a user equipment according to an exemplary embodiment of the present disclosure may further include: determining whether the received downlink reference signal is a downlink reference signal of the first category or a downlink reference signal of the second category.

As an example, based on information received from the base station for indicating a configuration mode of a downlink reference signal, a duration of the configuration mode, and an initial location of the configuration mode, whether the received downlink reference signal is a downlink reference signal of the first category or a downlink reference signal of the second category may be determined, wherein the configuration mode of the downlink reference signal defines an order and number of downlink reference signals of the first and second categories in each period.

As another example, based on a transmitting manner of the received downlink reference signal, whether the received downlink reference signal is a downlink reference signal of the first category or a downlink reference signal of the second category may be determined. In particular, the transmitting manners of the downlink reference signals of the first and second categories are different, thus, a category of the downlink reference signal may be determined based on the transmitting manner of the downlink reference signal. For example, based on at least one of a frequency domain offset location, a spreading code and a scrambling code of the received downlink reference signal, whether the received downlink reference signal is a downlink reference signal of the first category or a downlink reference signal of the second category may be determined.

As another example, based on a reference signal type of the received downlink reference signal, whether the received downlink reference signal is a downlink reference signal of the first category or a downlink reference signal of the second category may be determined. In particular, the specific reference signal types of the downlink reference signals of the first and second categories are different, thus, a category of the downlink reference signal may be determined based on the specific reference signal type of the downlink reference signal. For example, the reference signal type may include at least one of: a synchronization signal block (SSB), and a channel state information-reference signal (CSI-RS, which may further include none zero power CSI-RS (NZP-CSI-RS) and zero power CSI-RS (ZP-CSI-RS)).

As another example, based on a type of a measurement quantity of the received downlink reference signal that is required to be reported, whether the received downlink reference signal is a downlink reference signal of the first category or a downlink reference signal of the second category may be determined. For example, with respect to the downlink reference signal of the second category, the base station generally requires reporting the channel measurement quantity, and with respect to the downlink reference signal of the first category, the base station generally requires reporting the interference strength information.

In addition, as an example, before receiving the downlink reference signal from the base station, whether the downlink reference signal to be received is a downlink reference signal of the first category or a downlink reference signal of the second category may be determined through the above or other proper manners.

At step S103, the acquired interference strength information or information for the base station to acquire the interference strength information of the co-channel interference or self-interference is reported to the base station. That is, a user equipment may acquire the corresponding interference strength information and report the same to the base station, and may also report the information for the base station to acquire the interference strength information to the base station, and the corresponding interference strength information is acquired by the base station.

As an example, the acquired interference strength information or information for the base station to acquire the interference strength information obtained based on the received downlink reference signal of the first category may be reported to the base station according to a certain manner, so as to enable the base station to determine the downlink reference signal of the first category corresponding to the received interference strength information or information for the base station to acquire the interference strength information. For example, the acquired interference strength information or information for the base station to acquire the interference strength information may be reported to the base station at a time associated with the time frequency resource where the received downlink reference signal of the first category is transmitted according to a specified manner. For example, the acquired interference strength information or information for the base station to acquire the interference strength information may be reported to the base station with identification information of the received reference signal of the first category.

In addition, as an example, when the information for the base station to acquire the interference strength information obtained based on the downlink reference signal of the second category is reported to the base station, the information may be reported to the base station according to the above specific manner, so as to enable the base station to determine the downlink reference signal of the second category corresponding to the received information for the base station to acquire the interference strength information.

In addition, it should be understood that the user equipment may further acquire a channel measurement quantity required to be reported by the base station based on the downlink reference signal of the first category and/or the downlink reference signal of the second category, and report the acquired channel measurement quantity to the base station so as to notify the base station of a channel measuring result. Also, when the information for the base station to acquire the interference strength information is the channel measurement quantity required to be reported based on the received downlink reference signal of the first category and/or the received downlink reference signal of the second category, the same information may not be reported repeatedly. The base station may not only obtain the channel measuring result based on the reported information, but also acquire the interference strength information based on the reported information.

FIG. 2 illustrates a flowchart illustrating a method of measuring interference for a base station according to an exemplary embodiment of the present disclosure.

Referring to FIG. 2, at step S201, a downlink reference signal of a first category is transmitted to at least one user equipment.

At step S202, interference strength information reported based on the downlink reference signal of the first category is received from the at least one user equipment, or, the interference strength information is acquired, based on information for the base station to acquire the interference strength information reported by the at least one user equipment based on the downlink reference signal of the first category.

As an example, the information for the base station to acquire the interference strength information may include: a channel measurement quantity obtained based on the downlink reference signal of the first category. As an example, respectively with respect to each user equipment among the at least one user equipment, a ratio of reference signal received power to a signal-to-noise and interference ratio reported by the each user equipment based on the downlink reference signal of the first category and a quantized value of the ratio may be taken as the interference strength information.

As an example, the method of measuring interference for a base station according to an exemplary embodiment of the present disclosure may further include: transmitting, to the at least one user equipment, a downlink reference signal of a second category.

As an example, the interference strength information may be acquired, based on the information for the base station to acquire the interference strength information reported by the at least one user equipment respectively based on the downlink reference signal of the first category and the downlink reference signal of the second category.

As an example, the information for the base station to acquire the interference strength information may include: a channel measurement quantity obtained based on the downlink reference signal of the first category and a channel measurement quantity obtained based on the downlink reference signal of the second category. As an example, respectively with respect to each user equipment among the at least one user equipment, a difference between the channel measurement quantity reported based on the downlink reference signal of the second category and the channel measurement quantity reported based on the downlink reference signal of the first category by the each user equipment or a quantized value of the difference may be taken as the interference strength information. For example, the channel measurement quantity may be reference signal received quality or a signal-to-noise and interference ratio.

As another example, the information for the base station to acquire the interference strength information may include: average power of a symbol corresponding to a downlink reference signal obtained based on the downlink reference signal of the first category, and average power of a symbol corresponding to a downlink reference signal obtained based on the downlink reference signal of the second category. As an example, respectively with respect to each user equipment among the at least one user equipment, a difference between the average power of the symbol corresponding to the downlink reference signal reported based on the downlink reference signal of the first category and the average power of the symbol corresponding to the downlink reference signal reported based on the downlink reference signal of the second category by the each user equipment or a quantized value of the difference may be taken as the interference strength information.

As an example, the received interference strength information may be obtained by the at least one user equipment based on the downlink reference signals of the first and second categories.

As an example, the method of measuring interference for a base station according to an exemplary embodiment of the present disclosure may also include: identifying the downlink reference signal of the first category corresponding to the received interference strength information or information for the base station to acquire the interference strength information. For example, the downlink reference signal of the first category corresponding to the received interference strength information or information for the base station to acquire the interference strength information may be determined according to a reporting time when the at least one user equipment reports the interference strength information or the information for the base station to acquire the interference strength information. For example, the corresponding downlink reference signal may be identified based on identification information of the downlink reference signal received together with the received interference strength information or information for the base station to acquire the interference strength information.

In addition, as an example, the downlink reference signals of the first and second categories may be transmitted to the at least one user equipment according to a specific configuration mode of a downlink reference signal, and information for indicating the specific configuration mode, a duration of the specific configuration mode, and an initial location of the specific configuration mode may be transmitted to the at least one user equipment, wherein the configuration mode of the downlink reference signal defines an order and number of downlink reference signals of the first and second categories in each period.

As an example, the downlink reference signal of the first category may be transmitted to the at least one user equipment according to a first transmitting manner, and the downlink reference signal of the second category may be transmitted to the at least one user equipment according to a second transmitting manner. For example, the downlink reference signal of the first category may be transmitted to the at least one user equipment according to a first frequency domain offset location, and the downlink reference signal of the second category may be transmitted to the at least one user equipment according to a second frequency domain offset location. For example, the downlink reference signal of the first category may be transmitted to the at least one user equipment using a first spreading code or a first scrambling code, and the downlink reference signal of the second category may be transmitted to the at least one user equipment using a second spreading code or a second scrambling code.

As an example, the downlink reference signal of the first category may be a downlink reference signal of a first reference signal type, and the downlink reference signal of the second category may be a downlink reference signal of a second reference signal type.

As an example, only based on the downlink reference signal of the second category, the at least one user equipment may be notified of reporting the channel measurement quantity.

As an example, a plurality of downlink reference signals of the first category may be transmitted to the at least one user equipment, wherein UEs performing uplink transmission on the time frequency resources where the plurality of downlink reference signals of the first category are transmitted are the same. On this basis, as an example, the interference strength information may be acquired, based on the information for the base station to acquire the interference strength information reported by the at least one user equipment based on the plurality of downlink reference signals of the first category. On this basis, as an example, the received interference strength information is obtained by the at least one user equipment based on the plurality of downlink reference signals of the first category.

At step S203, the received or acquired interference strength information is taken as: interference strength information of co-channel interference or self-interference caused by a user equipment, which performs uplink transmission on a time frequency resource where the downlink reference signal of the first category is transmitted, to the at least one user equipment. In particular, respectively with respect to each user equipment among the at least one user equipment, the interference strength information received from the each user equipment or the interference strength information acquired based on the information received from the each user equipment for the base station to acquire the interference strength information is taken as the interference strength information of the co-channel interference or the self-interference caused by the user equipment performing uplink transmission on the time frequency resource where the downlink reference signal of the first category corresponding to the interference strength information is transmitted, to the each user equipment.

As an example, the method of measuring interference for a base station according to an exemplary embodiment of the present disclosure may also include: identifying a user equipment pair in which conditions of co-channel interference are different from each other, and taking interference strength information of co-channel interference caused by one user equipment in the identified user equipment pair to the other user equipment as interference strength information of co-channel interference caused by the other user equipment to the one user equipment, wherein a condition of the co-channel interference caused by one user equipment in the user equipment pair, in which the conditions of co-channel interference are different from each other, to the other user equipment is similar to that of the co-channel interference caused by the other user equipment to the one user equipment.

As an example, the method of measuring interference for a base station according to an exemplary embodiment of the present disclosure may also include: scheduling, based on the interference strength information of the co-channel interference caused by other UEs to the user equipment and/or the self-interference of itself, uplink and/or downlink transmission of the user equipment on a same time frequency resource.

As an example, when determining that uplink transmission of one user equipment is scheduled on a time frequency resource, downlink transmission of at least one user equipment on the time frequency resource may be scheduled, wherein interference strength information of co-channel interference or self-interference caused by the one user equipment to the at least one user equipment satisfies a first preset condition.

As an example, when determining that downlink transmission of one user equipment is scheduled on a time frequency resource, uplink transmission of at least one user equipment on the time frequency resource may be scheduled, wherein interference strength information of co-channel interference or self-interference caused by the at least one user equipment to the one user equipment satisfies a second preset condition.

As an example, uplink and downlink transmission of a pair of UEs or a single user equipment on a same time frequency resource may be scheduled, wherein interference strength information of co-channel interference caused by one of the pair of UEs to the other one or self-interference of the single user equipment satisfies a third preset condition.

According to the exemplary embodiments of the present disclosure, the base station can perform more accurate scheduling on UEs in a cell based on the acquired interference strength information of the co-channel interference between the UEs or the self-interference of the user equipment, so as to schedule the UEs which have little co-channel interference to each other or have little self-interference to perform uplink and downlink transmission on the same time frequency resource, thereby reducing the co-channel interference caused by the user equipment performing uplink transmission to the user equipment performing downlink reception on the same time frequency resource and improving a transmission rate and throughput of a wireless communication system.

Hereafter, the method of measuring interference according to the exemplary embodiments of the present disclosure is specifically described in conjunction with Embodiments 1-3.

Embodiment 1

FIG. 3 illustrates a flowchart illustrating the method of measuring interference for a user equipment according to Embodiment 1 of the present disclosure.

Referring to FIG. 3, at step S301, a downlink reference signal of a first category is received from a base station.

The base station can configure some downlink reference signals for channel measurement or interference (co-channel interference and/or self-interference) measurement, and these downlink reference signals may be a synchronization signal block (SSB), a channel state information-reference signal (CSI-RS, which may further include none zero power CSI-RS (NZP-CSI-RS) and zero power CSI-RS (ZP-CSI-RS)), or reference signals of other types. A time frequency resource location of the downlink reference signal may be notified to the user equipment by the base station through control information, and the base station may transmit the downlink reference signal periodically, or semi-persistently, or in an event-triggered manner.

The downlink reference signal of the first category is a downlink reference signal transmitted on a time frequency resource location on which the base station simultaneously schedule uplink transmission of one or more UEs, so that all UEs (including the user equipment performing uplink transmission, wherein the user equipment performing uplink transmission supports full duplex communication) or a part of UEs in the cell may measure interference strength information of the co-channel interference or the self-interference caused by the user equipment performing uplink transmission to them using the downlink reference signal of the first category.

At step S302, based on the received downlink reference signal of the first category, the interference strength information of the co-channel interference or the self-interference caused by the user equipment, which performs uplink transmission on the time frequency resource where the received downlink reference signal of the first category is transmitted, to a current user equipment is acquired.

As an example, a downlink channel may be estimated based on the received downlink reference signal of the first category, and a downlink reference signal part of the first category in the received signal may be reconstructed based on a parameter of the estimated downlink channel. Then, the reconstructed downlink reference signal part of the first category is deducted from the received signal, and the interference strength information is determined based on a remaining signal part.

As an example, average power of a symbol corresponding to the remaining signal part or a quantized value of the average power may be taken as the interference strength information. It needs to be explained that the interference strength information calculated through this manner actually reflects the interference strength of the co-channel interference between the UEs or the self-interference of the user equipment in the cell, the interference between the cells and the noise. Regarding a small cell, since there is a short distance between the UEs, the co-channel interference between the UEs or the self-interference of the user equipment in the cell is a main factor, and the interference strength information obtained by calculating in this manner may better reflect the interference strength of the co-channel interference between the UEs or the self-interference of the user equipment in the cell.

In addition, as another example, the interference strength information may be determined based on the channel measurement quantity obtained based on the received downlink reference signal of the first category. For example, a ratio of reference signal received power to a signal-to-noise and interference ratio based on the received downlink reference signal of the first category or a quantized value of the ratio may be taken as the interference strength information.

As an example, the interference strength information may be a numerical value obtained by calculating (or an absolute value of a numerical value obtained by calculating), and may also be a quantized value obtained by performing quantization on a numerical value (or, an absolute value) obtained by calculating, for example, the interference strength of the co-channel interference may be quantized into 256 levels, i.e., $I_0, I_1, \ldots, I_{255}$, thereby obtaining a quantized value corresponding to the numerical value obtained by calculating, for example, the corresponding quantized value may be represented with information of 8 bits.

At step S303, the acquired interference strength information is reported to the base station.

As an example, a measurement quantity that needs to be reported by the user equipment based on the downlink reference signal (for example, interference strength information that needs to be reported based on the downlink reference signal of the first category) and a reporting manner may be configured by the base station. As an example, the reporting manner of the measurement quantity may be periodic reporting, for example, reporting through a physical uplink control channel (PUCCH), and may also be aperiodic reporting, for example, reporting through a physical uplink shared channel (PUSCH).

If the measurement quantity reported by the user equipment is interference strength information, the base station needs to know that the interference strength information refers to the interference strength of the interference caused by which user equipment to the user equipment reporting the interference strength information, that is, the base station needs to know an identification (ID) of the user equipment causing interference (co-channel interference or self-interference) corresponding to the interference strength information. Thus, as an example, the user equipment may report the acquired interference strength information to the base station according to a specific manner, so as to enable the base station to determine a user equipment causing the interference corresponding to the received interference strength information.

Considering that the base station knows the user equipment scheduled to perform uplink transmission on the time frequency resource where the downlink reference signal of the first category is transmitted, then the base station only needs to know the downlink reference signal of the first category corresponding to the reported interference strength information in order to determine the ID of the user equipment causing the interference corresponding to the reported interference strength information. As an example, the acquired interference strength information may be reported to the base station according to a specific manner, so as to enable the base station to determine the downlink reference signal of the first category corresponding to the received interference strength information.

As an example, the specific manner may be associating a time when the user equipment reports the interference strength information with the time frequency resource location of the corresponding downlink reference signal of the first category. In particular, the acquired interference strength information may be reported to the base station at the time associated with the time frequency resource where the received downlink reference signal of the first category is transmitted according to a specified manner. For example, a downlink reference signal at a time t corresponds to a measurement quantity reported at a time t+kT, wherein T represents a timeslot length, and k is an integer greater than zero.

As an example, the specific manner may be reporting the identification information of the downlink reference signal corresponding to the interference strength information together with the interference strength information. In particular, the acquired interference strength information and the identification information of the reference signal of the first category corresponding thereto may be reported to the base station together. For example, the identification information of the reference signal of the first category may be: a time frequency resource location or a spreading code codeword of the reference signal of the first category.

FIG. 4 illustrates an example of performing co-channel interference measurement based on a downlink reference signal of a first category according to an exemplary embodiment of the present disclosure. The user equipment may receive downlink reference signals of the first category for measuring the co-channel interference caused by different UEs to it. Every time the user equipment receives a downlink reference signal of the first category, the interference strength information of the co-channel interference caused by the user equipment, which performs uplink transmission on the time frequency resource where the received downlink reference signal of the first category is transmitted, to it or the self-interference may be acquired, and be reported to the base station.

In addition, in order to improve accuracy in measuring interference strength information, as an example, a plurality of downlink reference signals of the first category may be received from the base station, and UEs scheduled to perform uplink transmission on the time frequency resources where the plurality of downlink reference signals of the first category are transmitted are the same. In other words, the base station may schedule the uplink transmission of the same user equipment on the time frequency resource where the plurality of downlink reference signals of the first category are transmitted, for example, three downlink reference signals on three continuous time frequency resource locations may be transmitted, and the uplink transmission of the same user equipment may be scheduled on the three time frequency resource locations. The user equipment may average the interference strength information obtained based on each downlink reference signal while measuring the interference strength information of the co-channel interference or the self-interference caused by the uplink transmitting user equipment to it, and report the average value to the base station.

FIG. 5 illustrates a flowchart illustrating the method of measuring interference for a base station according to Embodiment 1 of the present disclosure.

Referring to FIG. 5, at step S401, the downlink reference signal of the first category is transmitted to at least one user equipment.

At step S402, the interference strength information reported based on the downlink reference signal of the first category is received from the at least one user equipment.

At step S403, the received interference strength information is taken as: interference strength information of co-channel interference or self-interference caused by a user equipment, which performs uplink transmission on the time frequency resource where the downlink reference signal of the first category is transmitted, to the at least one user equipment.

As an example, the base station may acquire interference strength information of co-channel interference or self-interference caused by respective UEs to each user equipment by performing the method of measuring interference for a base station according to Embodiment 1 of the present disclosure.

As an example, the acquired interference strength information may be maintained as an interference strength table. For example, the interference strength information on co-channel interference or self-interference between N UEs may be saved and updated according to a manner of Table 1, wherein a row in Table 1 corresponds to a user equipment causing interference (co-channel interference or self-interference), that is, a user equipment causing interference corresponding to the same row in Table 1 is the same, a column in Table 1 corresponds to an interfered user equipment, that is, a interfered user equipment corresponding to the same column in Table 1 is the same, a value at (i, j) of the table represents an interference strength level of co-channel interference caused by a user equipment i to a user equipment j, a value at (i, i) of the table represents an interference strength level caused by self-interference of the user equipment i, and when the value is "–", it represents no interference strength measuring result.

TABLE 1

Interference Strength Table

| User Equipment Causing Interference | Interfered User Equipment | | | |
|---|---|---|---|---|
| | 1 | 2 | ... | N |
| 1 | $I_0$ | $I_{85}$ | ... | $I_{30}$ |
| 2 | $I_{40}$ | — | ... | $I_{10}$ |
| ... | | | | |
| N | $I_{30}$ | $I_{10}$ | ... | $I_0$ |

As an example, the base station may update the interference strength table in real time based on the interference strength information reported by the user equipment. For example, referring to FIG. 4, the user equipment may measure the interference strength information based on the received downlink reference signal of the first category. When the user equipment i is scheduled to perform uplink data transmission on the time frequency resource where a first downlink reference signal of the first category is transmitted, then all UEs in a cell may measure, based on the first downlink reference signal of the first category, the interference strength information of the co-channel interference or the self-interference caused by the user equipment i to them and report to the base station. Correspondingly, the base station updates an $i^{th}$ row of data in Table 1. With respect to other downlink reference signals of the first category, the corresponding interference strength information may be obtained according to the above manner and Table 1 may be updated.

As an example, the method of measuring interference for a base station according to Embodiment 1 of the present disclosure may also include: identifying an user equipment pair in which conditions of co-channel interference are different from each other, and taking interference strength information of co-channel interference caused by one user equipment in the identified user equipment pair to the other user equipment as interference strength information of co-channel interference caused by the other user equipment to the one user equipment, wherein a condition of the co-channel interference caused by one user equipment in the user equipment pair, in which the conditions of co-channel interference are different from each other, to the other user equipment is similar to that of the co-channel interference caused by the other user equipment to the one user equipment. In particular, if the conditions of the co-channel interference between the UEs i and j are different from each other, that is, a condition of the co-channel interference caused by the user equipment i to the user equipment j is similar to that of the co-channel interference caused by the user equipment j to the user equipment i, if the base station updates the $i^{th}$ row of date in Table 1 based on the received interference strength information, an $i^{th}$ column of data in Table 1 may also be updated correspondingly.

As an example, when two UEs have the same number of antennas, the two UEs may be determined as UEs in which conditions of co-channel interference are different from each other.

As an example, the method of measuring interference for a base station according to Embodiment 1 of the present disclosure may also include: scheduling, based on the interference strength information of the co-channel interference caused by the user equipment to other UEs and/or the self-interference of itself, uplink and/or downlink transmission of the user equipment on a same time frequency resource.

It should be understood that when uplink transmission and downlink transmission are scheduled simultaneously on the same time frequency resource, they may belong to different UEs, and may also belong to the same user equipment that supports full duplex communication.

As an example, when determining that uplink transmission of one user equipment is scheduled on a time frequency resource, downlink transmission of at least one user equipment on the time frequency resource may be scheduled, wherein interference strength information of co-channel interference or self-interference caused by the one user equipment to the at least one user equipment satisfies a first preset condition.

For example, when uplink transmission of a certain user equipment has been scheduled on the scheduled time frequency resource based on a certain scheduling criterion (e.g., a criterion of proportional fairness, etc.), a user equipment suffering less co-channel interference or self-interference from the uplink user equipment (i.e., a user equipment suffering the co-channel interference or the self-interference with less interference strength information from the uplink user equipment) may be selected when scheduling a user equipment performing downlink transmission on the time frequency resource, for example, a user equipment suffering the least co-channel interference and self-interference from the uplink user equipment (i.e., a user equipment suffering the co-channel interference and self-interference with the least interference strength information from the uplink user equipment) may be selected, or a certain user equipment suffering co-channel interference or self-interference from the uplink user equipment less than a preset threshold (i.e., a certain one of UEs suffering the co-channel interference or the self-interference with interference strength information from the uplink user equipment less than the preset threshold) may be selected.

As an example, when determining that downlink transmission of one user equipment is scheduled on a time frequency resource, uplink transmission of at least one user equipment on the time frequency resource may be scheduled, wherein interference strength information of co-channel interference or self-interference caused by the at least one user equipment to the one user equipment satisfies a preset condition.

For example, when downlink transmission of a certain user equipment has been scheduled on the scheduled time frequency resource based on a certain scheduling criterion (e.g., a criterion of proportional fairness, etc.), a user equipment causing less co-channel interference or self-interference to the downlink user equipment may be selected when scheduling the user equipment performing uplink transmission on the time frequency resource, for example, a user equipment causing the least co-channel interference and self-interference to the downlink user equipment may be selected, or a certain user equipment causing co-channel interference or self-interference to the downlink user equipment less than a preset threshold may be selected.

As an example, uplink and downlink transmission of a pair of UEs or a single user equipment on a same time frequency resource may be selected, wherein interference strength information of co-channel interference caused by one of the pair of UEs to the other one or self-interference of the single user equipment satisfies a third preset condition.

In particular, if transmission in one direction is not preferentially scheduled on a time frequency resource, a pair of UEs having less co-channel interference may be simultaneously selected to respectively schedule uplink and downlink transmission or uplink and downlink transmission of a single user equipment may be selected, based on a certain scheduling criterion. For example, the interference strength table may be traversed to select a pair of UEs having less co-channel interference to respectively schedule uplink and downlink transmission, or select a single user equipment having less self-interference to schedule uplink and downlink transmission.

In addition, as an example, the method of measuring interference according to the exemplary embodiments of the present disclosure may be used in conjunction with an interference estimating method based on location information, for example, the interference strength table may be initialized based on location information of a user equipment, and is updated in the subsequent transmitting process based on an interference measuring result obtained according to the method of measuring interference in the exemplary embodiments of the present disclosure.

Embodiment 2

FIG. 6 illustrates a flowchart illustrating the method of measuring interference for a user equipment according to Embodiment 2 of the present disclosure.

Referring to FIG. 6, at step S501, a downlink reference signal of a first category and a downlink reference signal of a second category are received from a base station.

At step S502, interference strength information of co-channel interference or self-interference caused by a user equipment, which performs uplink transmission on a time frequency resource where the received downlink reference signal of the first category is transmitted, to a current user equipment is acquired, based on the received downlink reference signal of the first category and the downlink reference signal of the second category.

In other words, the base station schedules uplink transmission of a user equipment on a time frequency resource where a part of downlink reference signals is transmitted, and does not schedule the uplink transmission of the user equipment on a time frequency resource where other downlink reference signals are transmitted, so as to enable a user equipment in a cell to calculate interference strength information of co-channel interference or self-interference caused by a user equipment scheduled to perform the uplink transmission to it, based on the downlink reference signals of the two categories, thereby being capable of measuring interference strength of the co-channel interference between the UEs or the self-interference of the UEs in the cell more accurately.

As an example, a difference Pw−Po between average power Pw of a symbol corresponding to the received downlink reference signal of the first category and average power Po of a symbol corresponding to the received downlink reference signal of the second category or a quantized value of the difference may be taken as the interference strength information.

As another example, a difference between a channel measurement quantity obtained based on the received downlink reference signal of the second category and a channel measurement quantity obtained based on the received downlink reference signal of the first category or a quantized value of the difference may be taken as the interference strength information. For example, the channel measurement quantity may be reference signal received quality or a signal-to-noise and interference ratio.

Since a user equipment can not only receive a downlink reference signal of the first category, but also receive a downlink reference signal of the second category, apart from notifying the user equipment of a time frequency resource location where the downlink reference signal is transmitted, the base station also needs to notify the user equipment of whether scheduled uplink transmission exists on the time frequency resource location where the downlink reference signal is transmitted. In other words, the user equipment needs to determine whether the received downlink reference signal is a downlink reference signal of the first category or a downlink reference signal of the second category.

As an example, based on information received from the base station for indicating a configuration mode of a downlink reference signal, a duration of the configuration mode, and an initial location of the configuration mode, whether the received downlink reference signal is a downlink reference signal of the first category or a downlink reference signal of the second category may be determined, wherein the configuration mode of the downlink reference signal defines an order and number of downlink reference signals of the first and second categories in each period.

Figure 7:
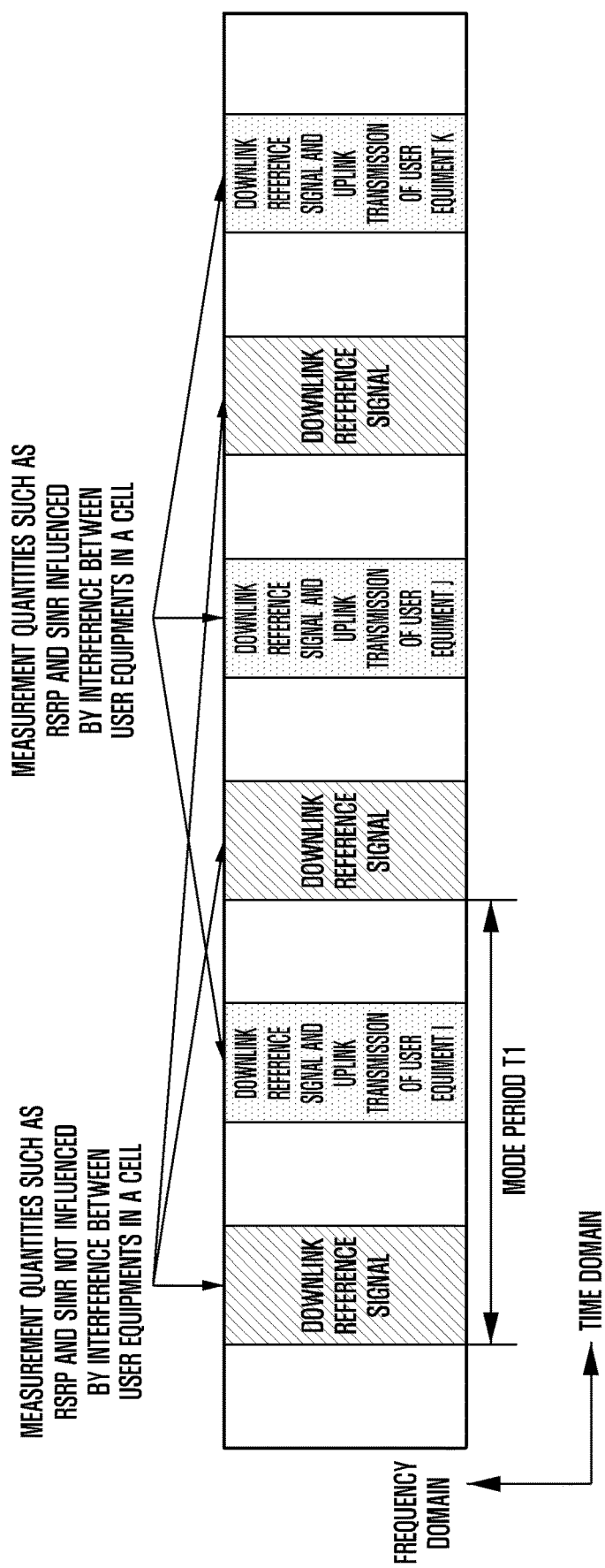
FIGS. 7 and 8 illustrate examples of a configuration mode of a downlink reference signal according to exemplary embodiments of the present disclosure.
Figure 8:
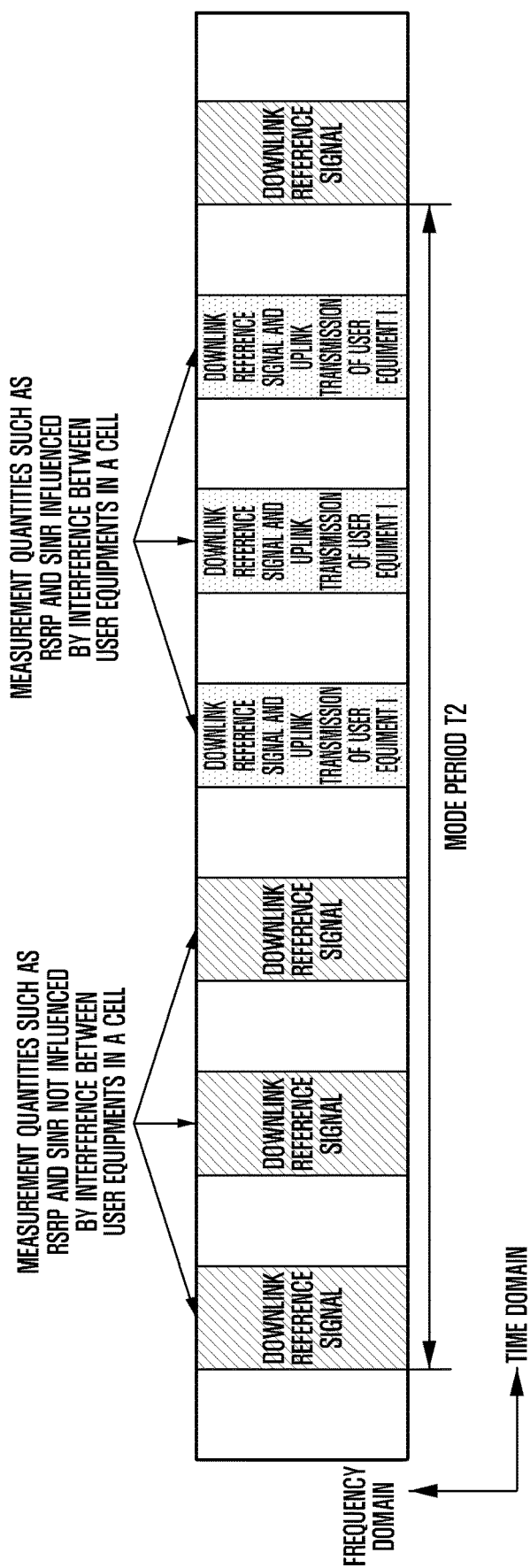

FIGS. 7 and 8 illustrate examples of a configuration mode of a downlink reference signal according to exemplary embodiments of the present disclosure. In a configuration mode of a downlink reference signal illustrated in FIG. 7, at a location at an interval of one downlink reference signal of the second category, uplink transmission of one different user equipment is scheduled on a time frequency resource location of a downlink reference signal, and this kind of configuration mode is repeated with a period T1, that is, in each period, a downlink reference signal of the second category is transmitted first, and then a downlink reference signal of the first category is transmitted. Meanwhile, uplink UEs scheduled on the time frequency resources where the downlink reference signals of the first category are transmitted may be different in different periods. In the configuration mode of a downlink reference signal illustrated in FIG. 8, at locations at an interval of three downlink reference signals of the second category, uplink transmission of a same user equipment is scheduled on time frequency resource locations of three continuous downlink reference signals, and this kind of mode is repeated with a period T2, that is, in each period, three downlink reference signals of the second category are transmitted first, and then three downlink reference signals of the first category are transmitted. Meanwhile, an uplink user equipment scheduled on the time frequency resources where the downlink reference signals of the first category are transmitted may be identical in a same period, and uplink UEs scheduled on the time frequency resources where the downlink reference signals of the first category are transmitted may be different in different periods. In a configuration mode of a downlink reference signal as illustrated in FIG. 7 or FIG. 8, the downlink reference signal may be performed repeatedly in a certain configuration mode, corresponding, each configuration mode may be numbered, and the base station only needs to notify the user equipment of a number of the configuration mode of a downlink reference signal, a duration of the configuration mode and an initial location of the configuration mode.

As another example, whether the received downlink reference signal is a downlink reference signal of the first category or a downlink reference signal of the second category may be determined based on a transmitting manner of the received downlink reference signal.

For example, whether there is uplink transmission of a user equipment on the time frequency resource where the downlink reference signal is transmitted may be distinguished using an offset of location of the downlink reference signal on the time frequency resource or a different spreading code or scrambling code, for example, that uplink transmission of a user equipment is not scheduled on the time frequency resource where the downlink reference signal is transmitted may be specified when a CSI-RS is at some offset locations of a frequency domain, and uplink transmission of a user equipment is scheduled on the time frequency resource where the downlink reference signal is transmitted when a CSI-RS is at some other offset locations; or, uplink transmission of a user equipment is not scheduled at a downlink reference signal spread by some spreading codes, and uplink transmission of a user equipment is scheduled at a downlink reference signal spread by some other spreading codes. Correspondingly, the user equipment may determine, based on an offset location (an offset) of the received downlink reference signal on the frequency domain or the spreading code, whether the received downlink reference signal is a downlink reference signal of the first category or a downlink reference signal of the second category.

As another example, whether the received downlink reference signal is a downlink reference signal of the first category or a downlink reference signal of the second category may be determined based on a reference signal type of the received downlink reference signal.

For example, the base station may not schedule uplink transmission of a user equipment on a time frequency resource where an SSB is transmitted, and schedule uplink transmission of a user equipment on the time frequency resource where the CRI-RS is transmitted; or, not schedule uplink transmission of a user equipment on a time frequency resource where an NZP-CSI-RS is transmitted, and schedule uplink transmission of a user equipment on a time frequency resource where a ZP-CSI-RS is transmitted. Correspondingly, when the downlink reference signal received by the user equipment is the SSB, that the received downlink reference signal is a downlink reference signal of the second category may be determined; when the received downlink reference signal is the CSI-RS, that the received downlink reference signal is a downlink reference signal of the first category may be determined; when the received downlink reference signal is the NZP-CSI-RS, that the received downlink reference signal is a downlink reference signal of the second category may be determined; when the received downlink reference signal is the ZP-CSI-RS, that the received downlink reference signal is a downlink reference signal of the first category may be determined.

As another example, whether the received downlink reference signal is a downlink reference signal of the first category or a downlink reference signal of the second category may be determined based on a type of a measurement quantity of the received downlink reference signal that is required to be reported.

The user equipment needs to distinctively handle conditions of whether there is uplink transmission at the downlink reference signal for channel measurement, when calculating a channel measurement quantity (for example, RSRP, RSRQ and SINR). For example, when a cell is selected based on an RSRP, generally co-channel interference between UEs in the cell is not considered, thus, some channel measurement quantities (for example, the RSRP) needs to be obtained based on the downlink reference signal when no uplink transmission is performed. A measurement quantity (RSRP, RSRQ, SINR, interference strength information I, etc.) that needs to be reported by the user equipment, a resource used in the reporting, a reporting time, and the like may be all configured by the base station.

In addition, as an example, in order to improve accuracy in interference strength measurement, the base station may not schedule uplink transmission of a user equipment at time frequency resources where a plurality of continuous downlink reference signals are transmitted, and/or may schedule uplink transmission of the same user equipment at time frequency resources where a plurality of continuous downlink reference signals are transmitted, so that the user equipment may calculate the measurement quantity more accurately using these continuous downlink reference signals. For example, referring to FIG. 8, the base station firstly configures three downlink reference signal resources, and does not schedule uplink transmission on these resources, and the user equipment may calculate the channel measurement quantity (for example, an average value of the channel measurement quantity obtained respectively based on each downlink reference signal) using these three downlink reference signal resources; at locations of subsequent three downlink reference signal resources, the base station may schedule uplink transmission of a user equipment i, then the user equipment may calculate a measurement quantity including co-channel interference caused by the user equipment i in the cell using these three downlink reference signal resources. Correspondingly, interference strength information of the co-channel interference or the self-interference caused by the user equipment i to the current user equipment may be obtained by subtracting the average power of the received symbols respectively obtained through calculating based on the two parts of downlink reference signals.

It should be understood that, apart from being used to acquire interference strength information, the downlink reference signal of the second category may also be used by the user equipment to perform channel measurement, and the user equipment reports a channel measurement result to the base station. For example, the measured channel measurement quantity may include at least one of channel measurement quantities including reference signal received power, reference signal received quality, a signal-to-noise and interference ratio, and the like.

At step S503, the acquired interference strength information is reported to the base station.

FIG. 9 illustrates a flowchart illustrating the method of measuring interference for a base station according to Embodiment 2 of the present disclosure.

Referring to FIG. 9, at step S601, the downlink reference signals of the first and second categories are transmitted to at least one user equipment.

At step S602, interference strength information reported by the at least one user equipment based on the downlink reference signal of the first category is received, wherein the interference strength information is obtained by the at least one user equipment based on the downlink reference signals of the first and second categories.

At step S603, the received interference strength information is taken as: interference strength information of co-channel interference or self-interference caused by a user equipment, which performs uplink transmission on the time frequency resource where the downlink reference signal of the first category is transmitted, to the at least one user equipment.

As an example, the method of measuring interference for a base station according to Embodiment 2 of the present disclosure may also include: scheduling, based on the interference strength information of the co-channel interference caused by the user equipment to other UEs and/or the self-interference of itself, uplink and/or downlink transmission of the user equipment on a same time frequency resource.

Embodiment 3

FIG. 10 illustrates a flowchart illustrating the method of measuring interference for a user equipment according to Embodiment 3 of the present disclosure.

Referring to FIG. 10, at step S701, a downlink reference signal of a first category and a downlink reference signal of a second category are received from a base station.

At step S702, information for the base station to acquire interference strength information of co-channel interference or self-interference caused by a user equipment, which performs uplink transmission on a time frequency resource where the received downlink reference signal of the first category is transmitted, to a current user equipment is acquired, based on the received downlink reference signal of the first category and downlink reference signal of the second category.

As an example, the information for the base station to acquire the interference strength information may include: a channel measurement quantity obtained based on the received downlink reference signal of the first category and a channel measurement quantity obtained based on the received downlink reference signal of the second category. For example, the channel measurement quantity may include at least one of: reference signal received quality and a signal-to-noise and interference ratio.

As an example, the base station may only notify the user equipment of a time frequency resource location of the downlink reference signal, but not notify whether there exists uplink transmission on these time frequency resource locations. In this case, the user equipment does not distinguish, when calculating a measurement quantity, whether there exists the uplink transmission on the time frequency resource location where the downlink reference signal is transmitted, that is, the user equipment does not distinguish the downlink reference signals of the first and second categories, but only needs to calculate and report the measurement quantity required by the base station. In order to be capable of calculating interference strength of co-channel interference between UEs, the base station only needs to configure the measurement quantity reported by the user equipment according to a configuration condition of downlink reference signals.

As another example, whether the received downlink reference signal is a downlink reference signal of the first category or a downlink reference signal of the second category may be notified to the user equipment through a proper manner. Correspondingly, the user equipment may determine whether the received downlink reference signal is a downlink reference signal of the first category or a downlink reference signal of the second category. In this case, the user equipment needs to distinguish two kinds of downlink reference signals while calculating and reporting the measurement quantity, for example, while calculating and reporting an SINR (RSRQ), the user equipment respectively calculates and reports an $SINR_1$ ($RSRQ_1$) when there is no uplink transmission and an $SINR_2$ ($RSRQ_2$) when there is uplink transmission. For example, referring to FIG. 8, the user equipment may calculate the $SINR_2$ ($RSRQ_2$), based on the downlink reference signal of the first category in a period, and report to the base station, and calculate the $SINR_1$ ($RSRQ_1$), based on the downlink reference signal of the second category in the period, and report to the base station.

In addition, as an example, the information for the base station to acquire the interference strength information may be acquired only based on the received downlink reference signal of the first category, for example, the information for the base station to acquire the interference strength information may be the RSRP and the SINR.

At step S703, the acquired information for the base station to acquire the interference strength information is reported to the base station.

FIG. 11 illustrates a flowchart illustrating the method of measuring interference for a base station according to Embodiment 3 of the present disclosure.

Referring to FIG. 11, at step S801, the downlink reference signals of the first and second categories are transmitted to at least one user equipment.

At step S802, the information for the base station to acquire the interference strength information reported by the at least one user equipment respectively based on the downlink reference signal of the first category and the downlink reference signal of the second category is received.

As an example, the information for the base station to acquire the interference strength information may be a channel measurement quantity reported based on the downlink reference signal.

At step S803, the interference strength information is acquired, based on the information for the base station to acquire the interference strength information reported by the at least one user equipment based on the downlink reference signal of the first category.

As an example, respectively with respect to each user equipment among the at least one user equipment, a difference between a channel measurement quantity reported based on the downlink reference signal of the second category and a channel measurement quantity reported based on the downlink reference signal of the first category by the each user equipment, or a quantized value of the difference may be taken, as the interference strength information, wherein the channel measurement quantity is: reference signal received quality or a signal-to-noise and interference ratio.

That is, the base station may calculate, based on the channel measurement quantity reported by the user equipment, the interference strength information of the co-channel interference between UEs in a cell, for example, if the measurement quantities reported by the user equipment are $SINR_1$ and $SINR_2$, then the interference strength information of the co-channel interference between the UEs may be calculated as $I=SINR_1-SINR_2$ based on the SINR; similarly, if the measurement quantities reported by the user equipment are $RSRQ_1$ and $RSRQ_2$, then the interference strength information of the co-channel interference between the UEs may also be calculated as $I=RSRQ_1-SRQ_2$ based on the RSRQ.

As another example, the base station may require the user equipment to simultaneously report RSRP and SINR based on the downlink reference signal of the first category, and approximately present interference strength of the co-channel interference between the UEs based on the RSRP/SINR reported by the user equipment.

As an example, a measurement quantity (e.g., at least one of RSRP, RSRQ and SINR) that needs to be reported by the user equipment, a resource used in the reporting, a reporting time, and the like are all configured by the base station. The base station may calculate, according to the channel measurement quantities reported by the user equipment and corresponding relations between these channel measurement quantities and downlink reference signals, the interference strength of the co-channel interference or the self-interference between the UEs. In order to determine the corresponding relations between the channel measurement quantities and the downlink reference signals, for example, that a time of transmitting the downlink reference signal is associated with a corresponding time of reporting the channel measurement quantity may be specified according to a preset manner, for example, the user equipment may report a time frequency resource location or a spreading code of the downlink reference signal corresponding to the measurement quantity while reporting the channel measurement quantity. Since the base station knows whether there exists scheduled uplink transmission at the downlink reference signal location and an identification (ID) of a user performing the uplink transmission, then the base station may calculate the interference strength of the co-channel interference or the self-interference between the UEs based on the reported channel measurement quantity. It needs to be explained that if the reported channel measurement quantity is a quantized level, correspondingly, the interference strength of the co-channel interference or the self-interference between the UEs calculated based on the channel measurement quantity may also be quantized interference strength.

At step S804, the acquired interference strength information is taken as: interference strength information of co-channel interference or self-interference caused by a user equipment, which performs uplink transmission on the time frequency resource where the downlink reference signal of the first category is transmitted, to the at least one user equipment.

As an example, the method of measuring interference for a base station according to Embodiment 3 of the present disclosure may also include: scheduling, based on the interference strength information of the co-channel interference caused by a user equipment to other UEs and/or the self-interference of itself, uplink and/or downlink transmission of the user equipment on the same time frequency resource.

FIG. 12 illustrates a structure diagram of a user equipment according to an exemplary embodiment of the present disclosure.

As illustrated in FIG. 12, the user equipment according to an exemplary embodiment of the present disclosure includes: a receiving unit 101, a processing unit 102 and a transmitting unit 103.

The receiving unit 101 is used for receiving a downlink reference signal from a base station.

The processing unit 102 is used for acquiring, based on a received downlink reference signal of a first category, interference strength information of co-channel interference or the self-interference caused by a user equipment, which performs uplink transmission on a time frequency resource where the received downlink reference signal of the first category is transmitted, to a current user equipment, or information for the base station to acquire the interference strength information of the co-channel interference. The downlink reference signal of the first category is: a downlink reference signal transmitted on a time frequency resource with scheduled uplink transmission.

As an example, the processing unit 102 may deduct an estimated downlink reference signal part of the first category from the received signal, and determine the interference strength information based on a remaining signal part.

As an example, the processing unit 102 may take average power of a symbol corresponding to the remaining signal part or a quantized value of the average power as the interference strength information.

As an example, the processing unit 102 may estimate the downlink reference signal part of the first category in the received signal in a manner of: estimating a downlink channel based on the received downlink reference signal of the first category, and reconstructing the downlink reference signal part of the first category in the received signal based on a parameter of the estimated downlink channel.

As another example, the processing unit 102 may determine the interference strength information based on a channel measurement quantity obtained based on the received downlink reference signal of the first category.

As an example, the processing unit 102 may take a ratio of reference signal received power to a signal-to-noise and interference ratio based on the received downlink reference signal of the first category or a quantized value of the ratio as the interference strength information.

As another example, the processing unit 102 may acquire the interference strength information based on the received downlink reference signal of the first category and a received downlink reference signal of a second category, wherein the downlink reference signal of the second category is: a downlink reference signal transmitted on a time frequency resource without scheduled uplink transmission.

As an example, the processing unit 102 may take a difference between average power of a symbol corresponding to the received downlink reference signal of the first category and average power of a symbol corresponding to the received downlink reference signal of the second category or a quantized value of the difference as the interference strength information; or, the processing unit 102 may take a difference between a channel measurement quantity obtained based on the received downlink reference signal of the second category and a channel measurement quantity obtained based on the received downlink reference signal of the first category or a quantized value of the difference as the interference strength information, wherein the channel measurement quantity is: reference signal received quality or a signal-to-noise and interference ratio.

As an example, the information for the base station to acquire the interference strength information may include: a channel measurement quantity obtained based on the received downlink reference signal of the first category.

As another example, the information for the base station to acquire the interference strength information may include: a channel measurement quantity obtained based on the received downlink reference signal of the first category and a channel measurement quantity obtained based on the received downlink reference signal of the second category, wherein the channel measurement quantity includes at least one of: reference signal received quality, a signal-to-noise and interference ratio and reference signal received power.

As another example, the information for the base station to acquire the interference strength information may include: average power of a symbol corresponding to the received downlink reference signal of the first category and average power of a symbol corresponding to the received downlink reference signal of the second category.

As an example, the processing unit 102 may acquire, based on a plurality of received downlink reference signals of the first category, the interference strength information or the information for the base station to acquire the interference strength information, wherein UEs performing uplink transmission on time frequency resources where the plurality of downlink reference signals of the first category are transmitted are the same.

As an example, the user equipment according to the exemplary embodiment of the present disclosure may also include: a determining unit (not shown), the determining unit for determining whether the received downlink reference signal is a downlink reference signal of the first category or a downlink reference signal of the second category.

As an example, the determining unit may determine, based on information received from the base station for indicating a configuration mode of a downlink reference signal, a duration of the configuration mode, and an initial location of the configuration mode, whether the received downlink reference signal is a downlink reference signal of the first category or a downlink reference signal of the second category, wherein the configuration mode of the downlink reference signal defines an order and number of downlink reference signals of the first and second categories in each period.

As an example, the determining unit may determine, based on at least one of a frequency domain offset location, a spreading code, a scrambling code, and a reference signal type of the received downlink reference signal, whether the received downlink reference signal is a downlink reference signal of the first category or a downlink reference signal of the second category.

As another example, the determining unit may determine, based on a type of a measurement quantity of the received downlink reference signal that is required to be reported, whether the received downlink reference signal is a downlink reference signal of the first category or a downlink reference signal of the second category.

The transmitting unit 103 is used for reporting the acquired interference strength information or information for the base station to acquire the interference strength information to the base station.

As an example, the transmitting unit 103 may report the acquired interference strength information or information for the base station to acquire the interference strength information according to a specific manner, so as to enable the base station to determine the downlink reference signal of the first category corresponding to the received interference strength information or information for the base station to acquire the interference strength information.

FIG. 13 illustrates a structure diagram of a base station according to an exemplary embodiment of the present disclosure.

As illustrated in FIG. 13, the base station according to an exemplary embodiment of the present disclosure includes: a transmitting unit 201, a receiving unit 202 and a processing unit 203.

The transmitting unit 201 is used for transmitting, to at least one user equipment, a downlink reference signal of a first category, wherein the downlink reference signal of the first category is: a downlink reference signal transmitted on a time frequency resource with scheduled uplink transmission.

The receiving unit 202 is used for receiving, from the at least one user equipment, interference strength information or information for the base station to acquire the interference strength information reported based on the downlink reference signal of the first category.

The processing unit 203 is used for acquiring the interference strength information, based on the information for the base station to acquire the interference strength information reported by the at least one user equipment based on the downlink reference signal of the first category, when receiving the information for the base station to acquire the interference strength information, and used for taking the received or acquired interference strength information as: interference strength information of co-channel interference or self-interference caused by a user equipment, which performs uplink transmission on the time frequency resource where the downlink reference signal of the first category is transmitted, to the at least one user equipment.

As an example, the transmitting unit 201 may also transmit, to the at least one user equipment, a downlink reference signal of a second category, wherein the downlink reference signal of the first category is: a downlink reference signal transmitted on a time frequency resource without scheduled uplink transmission. Further, as an example, the processing unit 203 may acquire the interference strength information, based on the information for the base station to acquire the interference strength information reported by the at least one user equipment respectively based on the downlink reference signals of the first and second categories, or, the received interference strength information is obtained by the at least one user equipment based on the downlink reference signals of the first and second categories.

As an example, the processing unit 203 may take, respectively with respect to each user equipment among the at least one user equipment, a difference between a channel measurement quantity reported based on the downlink reference signal of the second category and a channel measurement quantity reported based on the downlink reference signal of the first category by each user equipment, or a quantized value of the difference, as the interference strength information, wherein the channel measurement quantity is: reference signal received quality or a signal-to-noise and interference ratio.

As another example, the processing unit 203 may take, respectively with respect to each user equipment among the at least one user equipment, a difference between average power of a symbol corresponding to a downlink reference signal reported based on the downlink reference signal of the first category and average power of a symbol corresponding to a downlink reference signal reported based on the downlink reference signal of the second category by each user equipment or a quantized value of the difference, as the interference strength information.

As an example, the information for the base station to acquire the interference strength information may include: a channel measurement quantity obtained based on the downlink reference signal of the first category.

As an example, the processing unit 203 may take, respectively with respect to each user equipment among the at least one user equipment, a ratio of reference signal received power to a signal-to-noise and interference ratio reported by each user equipment based on the downlink reference signal of the first category and a quantized value of the ratio as the interference strength information.

As an example, the transmitting unit 201 may transmit, according to a specific configuration mode of a downlink reference signal, the downlink reference signals of the first and second categories to the at least one user equipment, and information for indicating the specific configuration mode, a duration of the specific configuration mode, and an initial location of the specific configuration mode to the at least one user equipment, wherein the configuration mode of the downlink reference signal defines an order and number of downlink reference signals of the first and second categories in each period.

As an example, the transmitting unit 201 may transmit the downlink reference signal of the first category to the at least one user equipment according to a first frequency domain offset location, and the downlink reference signal of the second category to the at least one user equipment according to a second frequency domain offset location.

As an example, the transmitting unit 201 may transmit the downlink reference signal of the first category to the at least one user equipment using a first spreading code or a first scrambling code, and the downlink reference signal of the second category to the at least one user equipment using a second spreading code or a second scrambling code.

As an example, the downlink reference signal of the first category may be a downlink reference signal of a first reference signal type, and the downlink reference signal of the second category may be a downlink reference signal of a second reference signal type.

As an example, the transmitting unit 201 may notify, only based on the downlink reference signal of the second category, the at least one user equipment of reporting the channel measurement quantity.

As an example, the transmitting unit 201 may transmit, to the at least one user equipment, a plurality of downlink reference signals of the first category, wherein UEs performing uplink transmission on time frequency resources where the plurality of downlink reference signals of the first category are transmitted are the same, wherein the processing unit 203 may acquire, based on the information for the base station to acquire the interference strength information reported by the at least one user equipment based on the plurality of downlink reference signals of the first category, the interference strength information, or the received interference strength information is obtained by the at least one user equipment based on the plurality of downlink reference signals of the first category.

As an example, the base station according to the exemplary embodiment of the present disclosure may also include: an identifying unit (not shown), the identifying unit for identifying the downlink reference signal of the first category corresponding to the received interference strength information or information for the base station to acquire the interference strength information.

As an example, the base station according to the exemplary embodiment of the present disclosure may also include: a scheduling unit (not shown), the scheduling unit for scheduling, based on the interference strength information of the co-channel interference caused by the user equipment to other UEs and/or the self-interference of itself, uplink and/or downlink transmission of the user equipment on the same time frequency resource.

As an example, the scheduling unit may schedule, when determining that uplink transmission of one user equipment is scheduled on a time frequency resource, downlink transmission of at least one user equipment on the time frequency resource, wherein interference strength information of co-channel interference or self-interference caused by the one user equipment to the at least one user equipment satisfies a first preset condition.

As another example, the scheduling unit may schedule, when determining that downlink transmission of one user equipment is scheduled on a time frequency resource, uplink transmission of at least one user equipment on the time frequency resource, wherein interference strength information of co-channel interference or self-interference caused by the at least one user equipment to the one user equipment satisfies a second preset condition.

As another example, the scheduling unit may schedule uplink and downlink transmission of a pair of UEs or a single user equipment on a same time frequency resource, wherein interference strength information of co-channel interference caused by one of the pair of UEs to the other one or self-interference of the single user equipment satisfies a third preset condition.

It should be understood that the user equipment and the base station according to the exemplary embodiments of the present disclosure may perform the method of measuring interference with reference to FIGS. 1-11, which will not be explained here in order to avoid repetition.

It should be understood that respective units in the user equipment according to the exemplary embodiments of the present disclosure may be implemented as hardware components and/or software components. According to the processing executed by the respective defined units, those skilled in the art may, for example, use a field-programmable gate array (FPGA) or an application-specific integrated circuit (ASIC) to implement respective units.

It should be understood that respective units in the base station according to the exemplary embodiments of the present disclosure may be implemented as hardware components and/or software components. According to the processing executed by the respective defined units, those skilled in the art may, for example, use a field-programmable gate array (FPGA) or an application-specific integrated circuit (ASIC) to implement respective units.

An exemplary embodiment of the present disclosure provides a computer readable storage medium storing a computer program, wherein the method of measuring interference for a user equipment as described in the above exemplary embodiments is implemented when the computer program is executed by a processor. The computer-readable storing medium is a storage apparatus that may store any data of data read out by a computer system. Examples of a computer-readable storing medium include: a read-only memory, a random-access memory, a CD-ROM, a magnetic tape, a floppy disk, an optical data storage apparatus and a carrier (such as data transmission via Internet through a wired or wireless transmission path).

The user equipment according to an exemplary embodiment of the present disclosure includes: a processor (not shown) and a storage (not shown) storing a computer program, wherein the method of measuring interference for a user equipment as described in the above exemplary embodiments is implemented when the computer program is executed by the processor.

An exemplary embodiment of the present disclosure provides a computer readable storage medium storing a computer program, wherein the method of measuring interference for a base station as described in the above exemplary embodiments is implemented when the computer program is executed by a processor. The computer-readable storing medium is a storage apparatus that may store any data of data read out by a computer system. Examples of a computer-readable storing medium include: a read-only memory, a random-access memory, a CD-ROM, a magnetic tape, a floppy disk, an optical data storage apparatus and a carrier (such as data transmission via Internet through a wired or wireless transmission path).

The base station according to an exemplary embodiment of the present disclosure includes: a processor (not shown) and a storage (not shown) storing a computer program, wherein the method of measuring interference for a base station as described in the above exemplary embodiments is implemented when the computer program is executed by the processor.

Although some exemplary embodiments of the present disclosure have been presented and described, those skilled in the art should understand that the amendments can be made to these embodiments without departing from the principles and spirit of the present disclosure of which the scope is defined by the claims and their equivalents.

Application of full-duplex technologies needs to overcome two primary problems: (1) self-interference, i.e. interference to reception of a device from transmission of the device itself; and (2) co-channel interference among terminals in a same cell, i.e. interference to a terminal(s) performing downlink transmission by a terminal(s) performing uplink transmission using the same time-frequency resources as that of the terminal(s) performing downlink transmission. With respect to self-interference, there are already some technologies that may achieve good performance of self-interference cancellation. For example, methods in the document "Full duplex radios, D. Bharadia, E. McMilin, S. Katti, 2013" may reduce self-interference by more than 110 dB, approximately reducing self-interference to a level below noise. With respect to co-channel interference among terminals within a cell, currently the main method is to reduce interference to terminals performing downlink reception by terminals performing uplink transmission through scheduling. In order to perform effective scheduling of terminals, a base station needs to acquire power of inter-terminal interference. A simple way is to estimate the power of inter-terminal interference by acquiring location information of the terminals, where the power of inter-terminal interference between terminals remote from each other is low and the power of inter-terminal interference between terminals with near each other is high, so that the base station selects a pair of terminals with remote from each other to schedule uplink and downlink transmissions respectively when scheduling on the same time-frequency resources. A scheduling method based on terminal location information may reduce co-channel interference between terminals to a certain extent, but if estimation of terminal location information is inaccurate (for example, the current positioning accuracy based on reference signal time difference (RSTD) is about a dozen meters, and the accuracy based on GPS is several meters), corresponding scheduling performance will be greatly affected. In order to achieve more accurate terminal scheduling, it is necessary to measure the power of inter-terminal interference and report a result of the measurement to the base station, which maintains an inter-terminal interference power table and performs terminal scheduling based on the table.

Scheduling based on terminal location has low overhead but has a problem of inaccurate scheduling, while scheduling based on the inter-terminal interference power table may be more accurate but needs higher overhead. The two methods can be used in combination in an actual system. For example, when a terminal has just accessed the system or has moved its position and power of inter-terminal interference between the terminal and other terminals have not been measured, the base station may perform scheduling based on terminal location information; while in a transmission process, terminals measure and report power of inter-terminal interference between each other, and the base station updates the inter-terminal interference power table and performs scheduling based on the updated inter-terminal interference power table.

It should be noted that both the scheduling method based on terminal location information and the scheduling method based on the measured power of inter-terminal interference have a problem of inaccurate terminal scheduling due to inaccurate or outdated information. In this case, data demodulation failure may occur in terminals performing downlink reception due to excessive interference caused by terminals performing uplink transmission. Therefore, unlike in a half-duplex system, in a full-duplex system, downlink data demodulation failure may be due to excessive interference to terminals performing downlink reception by terminals performing uplink transmission, in addition to degradation of downlink channel quality. If the base station can obtain the reasons of terminal demodulation failure, it may better determine the scheduling of uplink transmission during retransmission. However, the acknowledgment (ACK)/negative acknowledgment (NACK) feedback information adopted by hybrid automatic repeat request (HARQ) in current Long Term Evolution (LTE) or New Radio (NR) systems cannot explain the reason of demodulation failure. Therefore, it is necessary to design a new feedback method to help base stations make better retransmission or scheduling decisions.

FIG. 14 is a schematic diagram illustrating a wireless communication system according to an embodiment of the present disclosure.

All the methods described below may be applied to the wireless communication system 140 as illustrated in FIG. 14. FIG. 14 includes a base station 1400 and a plurality of terminals 1401, 1402, 1403, 1404, and 1405. Although only 5 terminals are illustrated, there may be more terminals.

When the system 140 adopts full-duplex technologies, each terminal suffers from both self-interference, i.e., interference to downlink reception of the terminal by uplink transmission of the terminal itself, and co-channel interference to the terminal caused by other terminals with the same cell as it (hereinafter referred to as "inter-terminal interference"), i.e., interference to the terminal caused by other terminals which perform uplink transmission using the same communication resources (e.g., time-frequency resources) as the communication resources used by the terminal when performing downlink reception.

For example, terminal 1401 suffers from both self-interference and inter-terminal interference to it caused by terminals 1402, 1403, 1404 and 1405. Hereinafter, for convenience of description, a terminal suffers from inter-terminal interference caused by other terminals is referred to as a "first terminal", such as terminal 1401, and a terminal causing inter-terminal interference to the first terminal is referred to as a "second terminal", such as terminals 1402, 1403, 1404, and 1405. In the following description herein, it is assumed that there are N second terminals for the first terminal in question, where N is an integer greater than 0.

Figure 15:
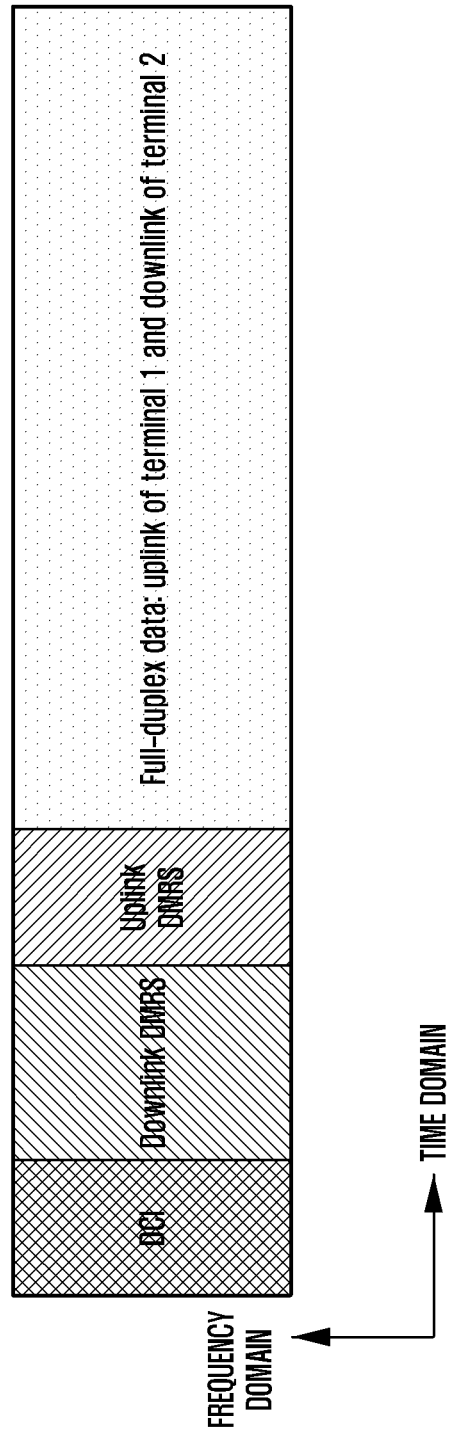
FIG. 15 illustrates resource configuration of a slot of a full-duplex system when uplink and downlink DMRSs are differentiated through different time resources.
Figure 16:
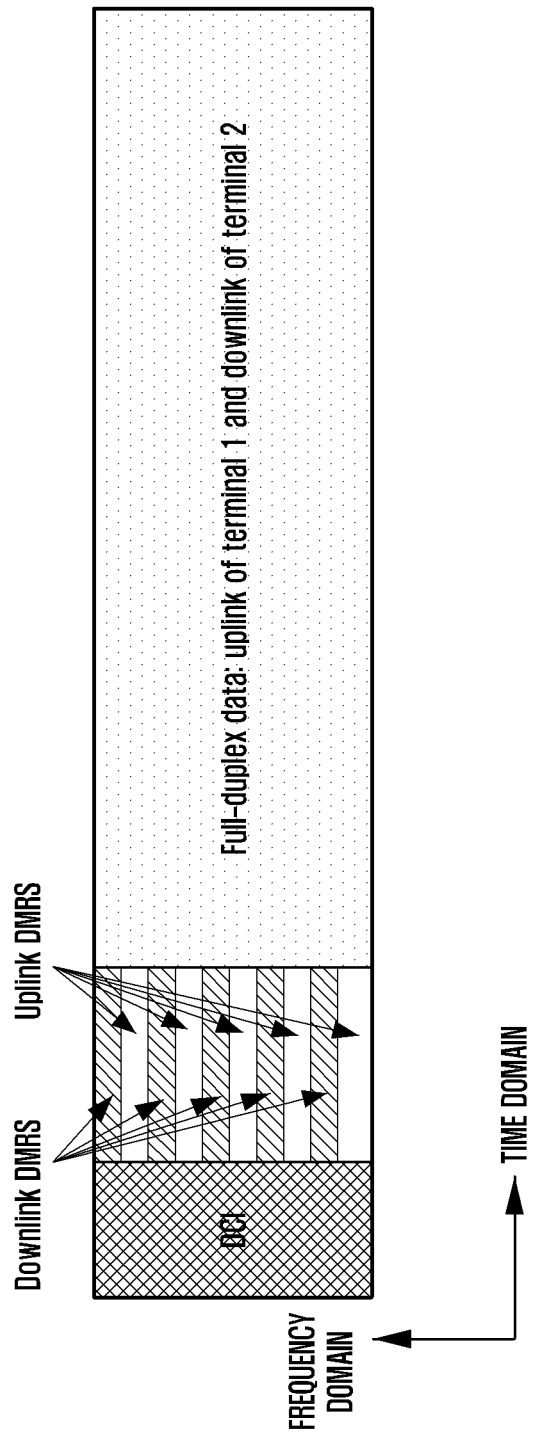
FIG. 16 illustrates resource configuration of a slot of a full-duplex system when uplink and downlink DMRSs are differentiated through different frequency resources.
Figure 17:
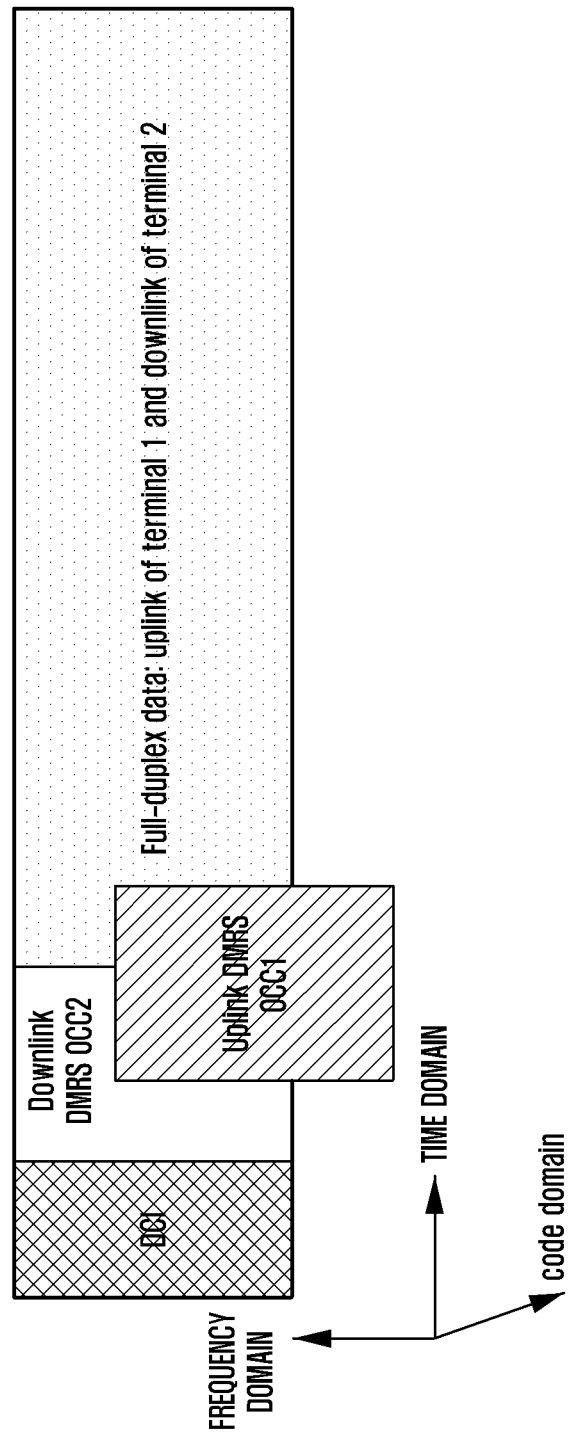
FIG. 17 illustrates resource configuration of a slot of a full-duplex system when uplink and downlink DMRSs are differentiated through different code resources.

The present disclosure adopts a frame structure for full-duplex, as illustrated in FIGS. 15-17. FIG. 15 illustrates resource configuration of a slot of a full-duplex system when uplink and downlink DMRSs are differentiated through different time resources. FIG. 16 illustrates resource configuration of a slot of a full-duplex system when uplink and downlink DMRSs are differentiated through different frequency resources. FIG. 17 illustrates resource configuration of a slot of a full-duplex system when uplink and downlink DMRSs are differentiated through different code resources. FIGS. 15-17 respectively illustrate the cases where uplink DMRSs and downlink DMRSs are differentiated through different time, frequency and code resources.

A typical slot for full-duplex is configured to transmit downlink control information on the first several OFDM symbols and demodulation reference signals (DMRSs) on the following several OFDM symbols, the DMRSs including a downlink DMRS for downlink data demodulation and an uplink DMRS for uplink data demodulation. And, full-duplex data is transmitted on the last several OFDM symbols. Based on the illustrated frame structure, the base station 210 estimates the uplink channel using the uplink DMRS when demodulating uplink data, and the first terminal 200 estimates the downlink channel using the downlink DMRS when demodulating downlink data.

It should be noted that methods disclosed by the present invention do not completely depend on the frame structures as illustrated in FIGS. 15-17.

In addition, it should be noted that the first terminal 200 may replace the DMRSs with other known reference signals or uplink and downlink control information.

Uplink data received by the base station 210 on full-duplex symbols may be affected by residual self-interference. Generally, base stations have strong self-interference cancellation capability, and the residual self-interference may not have much effect on uplink data demodulation. Meanwhile, downlink data received by the first terminal 200 on full-duplex symbols may suffer from co-channel interference by other terminals with the cell or self-interference. If the uplink and downlink transmission scheduling of the terminals in the cell by the base station is improper or the self-interference cancellation capability of the first terminal 200 utilizing full-duplex decreases, the first terminal 200 may fail in demodulation.

FIG. 18 illustrates a method 180 for transmitting information on demodulation failure by the first terminal 200 to the base station 210.

In operation 1800, the first terminal 200 receives data from the base station 210 and demodulates the data.

In operation 1805, the first terminal 200 determines N demodulation failure reasons respectively associated with N second terminals causing inter-terminal interference to the first terminal 200 when demodulation of the data fails, where N is an integer greater than 0, and the inter-terminal interference is interference to the first terminal 200 caused by the second terminals when the second terminals perform uplink transmission using the same communication resources as the communication resources used by the first terminal 200 when performing downlink reception, and each demodulation failure reason includes one of a first reason and a second reason.

In the following description, the first reason may be excessive power of inter-terminal interference to the first terminal 200 caused by a corresponding second terminal, and the second reason may be poor downlink quality of the first terminal 200.

The first terminal 200 may determine the N demodulation failure reasons associated with the N second terminals in various manners, which will be described below by taking Mode (1) and Mode (2) as examples.

Mode (1):
performing the following steps for each of the N second terminals:
determining the power of inter-terminal interference to the first terminal 200 caused by a corresponding second terminal;
determining that the demodulation failure reason associated with the corresponding second terminal is the first reason when the power of the inter-terminal interference is greater than or equal to a predetermined threshold; and
determining that the demodulation failure reason associated with the corresponding second terminal is the second reason when the power of the inter-terminal interference is less than the predetermined threshold.

By adopting Mode (1), the first terminal 200 may determine the demodulation failure reason associated with the second terminal based on less physical quantities, thereby reducing computational complexity.

The method described below may be used to determine the power of inter-terminal interference to the first terminal 200 caused by the corresponding second terminal.

When the first terminal 200 does not know the uplink reference signal sequences of the N second terminals, but only knows the locations of communication resources (e.g., time-frequency resources) used by the uplink reference signals of the N second terminals, the power of inter-terminal interference to the first terminal 200 caused by the corresponding second terminal may be determined (approximately estimated) by using the communication resources used by the uplink reference signal of the corresponding second terminal and the downlink reference signal of the first terminal 200.

In particular, first, the first terminal 200 may determine received power $P_D$ of the downlink reference signal of the first terminal 200 based on the downlink reference signal of the first terminal 200, where the subscript D represents downlink. Then, if the uplink reference signal of the corresponding second terminal and the downlink reference signal of the first terminal 200 are differentiated through different time resources (e.g., as illustrated in FIG. 15) or different frequency resources (e.g., as illustrated in FIG. 16), the first terminal 200 determines average power $P_{noise}$ of noise by a difference between average power of the communication resources used by the reference signal of the first terminal 200 and $P_D$. Then the average power $P_{noise}$ of noise may be estimated by subtracting $P_D$ from the average power of the Resource Elements (REs) where the downlink reference signal of the first terminal 200 is located, and then estimated power $P_1$ of inter-terminal interference to the first terminal 200 caused by the second terminal may be obtained by subtracting the average power $P_{noise}$ of noise from the average power of the resource elements where the uplink reference signal is located. If the uplink reference signal of the corresponding second terminal and the downlink reference signal of the first terminal 200 are differentiated through different code resources (e.g., as illustrated in FIG. 17), a difference between the average power of the resource elements where the uplink reference signal of the first terminal 200 and the downlink reference signal of the corresponding second terminal are located and $P_D$ is a sum of the power $P_1$ of inter-terminal interference to the first terminal 200 caused by the second terminal and the average power $P_{noise}$ of noise. When the power of inter-terminal interference is much greater than the power of noise, the difference may approximately serve as the power $P_1$ of the inter-terminal interference to the first terminal 200 caused by the second terminal.

By determining the power $P_1$ of inter-terminal interference to the first terminal 200 caused by the second terminal in the aforementioned manner, the first terminal 200 does not need to obtain the uplink reference signal sequence of the second terminal from the base station, thereby reducing signaling overhead of the system.

Optionally or alternatively, another method described below may be used to determine the power of inter-terminal interference to the first terminal 200 caused by the corresponding second terminal.

If the first terminal 200 knows the uplink reference signal sequences of the N second terminals, the first terminal 200 may directly calculate the power $P_1$ of inter-terminal interference to the first terminal 200 caused by the corresponding second terminal based on the uplink reference signal of the corresponding second terminal: $P_1=RSRP_U$, where RSRP represents received power of the uplink reference signal, and the subscript U represents uplink.

The uplink reference signal sequence of the corresponding second terminal may be notified of the first terminal 200 by the base station 210, or the uplink reference signal sequence and the downlink reference signal sequence may be bound to enable the first terminal 200 to derive the uplink reference signal sequence of the corresponding second terminal from the downlink reference signal sequence of the first terminal 200.

By determining the power $P_1$ of the inter-terminal interference to the first terminal 200 caused by the second terminal in the aforementioned manner, the first terminal 200 may more accurately determine the power $P_1$ of the inter-terminal interference.

Mode (2):

A signal-to-noise ratio SNR of the first terminal 200 and a signal-to-interference-plus-noise ratio $SINR_{prev}$ of the first terminal 200 that is reported most recently and determined based on the inter-terminal interferences with the first terminal 200 caused by all of previous second terminals are determined; and the following steps are performed for each of the N second terminals: determining a signal-to-interference-plus-noise ratio $SINR_w$ of the first terminal 200 based on inter-terminal interference to the first terminal 200 caused by a corresponding second terminal; determining that a demodulation failure reason associated with the corresponding second terminal is a first reason, when $SINR_{prev}-SNR<a$ first threshold $SINR_{th1}$ and $SNR-SINR_w>a$ second threshold $SINR_{th2}$; and determining that the demodulation failure reason associated with the corresponding second terminal is a second reason, when $SINR_{prev}-SNR>$the first threshold $SINR_{th1}$ and $SNR-SINRw<$the second threshold $SINR_{th2}$.

The first terminal 200 may determine the received power $P_D$ of the downlink reference signal of the first terminal 200 based on the downlink reference signal of the first terminal 200, where the subscript D represents downlink.

The first terminal 200 determines the SNR by a ratio of the received power $P_D$ of the downlink reference signal of the first terminal 200 to the average power $P_{noise}$ of noise, i.e., $SNR=P_D/P_{noise}$.

The first terminal 200 determines the $SINR_w$ by a ratio of $P_D$ to a sum of $P_{noise}$ and the power of inter-terminal interference to the first terminal 200 caused by the corresponding second terminal, i.e., $SINR_w=P_D/(P_{noise}+P_1)$.

If the uplink reference signal of the corresponding second terminal and the downlink reference signal of the first terminal 200 are differentiated through different time resources (e.g., as illustrated in FIG. 15) or different frequency resources (e.g., as illustrated in FIG. 16), the first terminal 200 determines average power $P_{noise}$ of noise by a difference between average power of the communication resources used by the reference signal of the first terminal 200 and $P_D$. Then the average power $P_{noise}$ of noise may be estimated by subtracting $P_D$ from the average power of the Resource Elements (REs) where the downlink reference signal of the first terminal 200 is located, and then estimated power $P_1$ of inter-terminal interference to the first terminal 200 caused by the second terminal may be obtained by subtracting the average power $P_{noise}$ of noise from the average power of the resource elements where the uplink reference signal is located, thereby obtaining ($P_{noise}+P_1$). Optionally or alternatively, the first terminal 200 may directly obtain ($P_{noise}+P_1$) based on the average power of the communication resources used by the uplink reference signal of the corresponding second terminal.

If the uplink reference signal of the corresponding second terminal and the downlink reference signal of the first terminal 200 are differentiated through different code resources (e.g., as illustrated in FIG. 17), then a difference between the average power of the resource elements where the uplink reference signal of the first terminal 200 and the downlink reference signal of the corresponding second terminal are located and $P_D$ is a sum of the power $P_1$ of inter-terminal interference to the first terminal 200 caused by the second terminal and the average power $P_{noise}$ of noise, that is, ($P_{noise}+P_1$).

$SINR_{th1}$ and $SINR_{th2}$ are thresholds set by the system.

$SINR_{prev}$ is a most recently reported value, which is stored in the first terminal 200, and is determined by a ratio of the previously measured $P_D$ to a sum of the previously measured $P_{noise}$ and the power of inter-terminal interference to the first terminal 200 caused by all of previous second terminals respectively.

By adopting the Mode (2), the first terminal 200 may more accurately determine the contribution of inter-terminal interference and downlink quality to demodulation failure, thereby more accurately determining the reason of demodulation failure.

Referring back to FIG. 18, in operation 1810, the first terminal 200 generates information on demodulation failure based on the determined N demodulation failure reasons.

The first terminal 200 may generate information on demodulation failure in a variety of manners, which will be described below by taking Mode A, Mode B, and Mode C as examples. It should be clear to those skilled in the art that the manner in which the first terminal 200 generates information on demodulation failure is not limited to these.

Mode A:

The first terminal 200 generates M-bit indication information for the N second terminals as the information on demodulation failure, and where M is an integer greater than 0; determines the M bits as a first value when it is determined that a demodulation failure reason associated with at least one of the N second terminals is a first reason; and determines the M bits as a second value when it is determined that demodulation failure reasons associated with all of the N second terminals are all the second reasons.

Where the first value may be a first predetermined bit sequence; and the second value may be a second predetermined bit sequence different from the first predetermined bit sequence.

For example, when M is 1, the first predetermined bit sequence may be 1 and the second predetermined bit sequence may be 0. That is, when M is 1, if it is determined that a demodulation failure reason associated with at least one second terminal is excessive inter-terminal interference, the first terminal 200 feeds back one more bit indicating 1 when feeding back a 1-bit or 2-bit NACK (1-bit for feeding back the demodulation result of 1 code block and 2-bit for feeding back the demodulation result of 2 code blocks), otherwise, if it is determined that the demodulation failure reasons associated with all terminals of the N second terminals are all the second reasons, the first terminal 200 feeds back one more bit indicating 0 when feeding back NACK.

By adopting Mode A, the first terminal 200 may report the demodulation failure reason with lower signaling overhead.
Mode B:

The first terminal 200 performs the following steps for each of the N second terminals: generating M-bit indication information having a first value when it is determined that a demodulation failure reason associated with a corresponding second terminal is a first reason, where M is an integer greater than 0; and generating M-bit indication information having a second value when it is determined that the demodulation failure reason associated with the corresponding second terminal is a second reason; and generating the information on demodulation failure in one of the following ways: combining the M-bit indication information having the first value; or combining the M-bit indication information having the first value and the M-bit indication information having the second value.

The first value is a first predetermined bit sequence; and the second value is a second predetermined bit sequence different from the first predetermined bit sequence.

For example, when M is 1, the first predetermined bit sequence may be 1 and the second predetermined bit sequence may be 0. That is, when M is 1, if it is determined that a demodulation failure reason associated with a second terminal is excessive inter-terminal interference, the first terminal 200 feeds back one more bit indicating 1 for the second terminal when feeding back NACK, otherwise, if it is determined that the demodulation failure reason associated with the second terminal is the second reason, the first terminal 200 feeds back one more bit indicating 0 for the second terminal when feeding back NACK.

Optionally or alternatively, the first value may indicate the power of inter-terminal interference to the first terminal 200 caused by the corresponding second terminal; and the second value may also indicate the power of inter-terminal interference to the first terminal 200 caused by the corresponding second terminal. In this case, depending on whether the base station 210 is configured to allow the first terminal 200 to multiplex and report channel state information (CSI) information and ACK/NACK information, the first terminal 200 will adopt different methods when feeding back the power of inter-terminal interferences. If the base station 210 is configured to allow the first terminal 200 to multiplex and report CSI information and ACK/NACK information, the first terminal 200 reports the NACK after multiplexing the NACK with the measured power of inter-terminal interferences when feeding back the NACK; and if the base station 210 is not configured to allow the first terminal 200 to report the NACK after multiplexing the NACK with the measured power of inter-terminal interferences when feeding back the NACK, the first terminal 200 reports the measured power of inter-terminal interferences on the communication resources configured by the base station 210 for reporting CSI information.

The reported interference power information is a quantization level. For example, the interference power is quantized into 256 levels, $I_0$-$I_{255}$, and the terminal reports the corresponding quantization level.

The first terminal 200 combines only the M-bit indication information having the first value in a certain order, or the first terminal 200 combines both the M-bit indication information having the first value and the M-bit indication information having the second value in a certain order, so that the base station 210 may identify which second terminal each of the M-bit indication information corresponds to. For example, if the uplink reference signals of the second terminals are differentiated through different time resources (e.g., as illustrated in FIG. 15), the order of several M-bit information fed back is based on a chronological order of the uplink reference signals, i.e., M-bit information corresponding to an uplink reference signal preceding in time precedes; if the uplink reference signals of the second terminals are differentiated through different frequency resources (e.g., as illustrated in FIG. 16), the order of several M-bit information fed back is based on the order of the uplink reference signals in the frequency domain, that is, M-bit information corresponding to an uplink reference signal preceding in frequency position precedes; and if the uplink reference signals of the second terminals are differentiated through different code resources (e.g., as illustrated in FIG. 17), the order of several M-bit information fed back is based on the order of different codes used by the uplink reference signals, which is specified in advance by the base station 210.

By adopting Mode B, the first terminal 200 may reflect the contribution of each second terminal to the demodulation failure to the base station 210, thereby facilitating the base station 210's different scheduling decision for each second terminal.
Mode C:

The first terminal 200 determines at least one of a scrambling code sequence and a spreading code sequence used when feeding back a negative acknowledgment (NACK) based on the N demodulation failure reasons; and performs corresponding at least one of a scrambling operation and a spreading operation on the NACK using the determined at least one of the scrambling code sequence and the spreading code sequence.

As an example, the first terminal 200 may indicate a demodulation failure reason with 1 bit for each of the N second terminals, and arrange the N bits in a certain order, so as to determine a code sequence, where the certain order may be an aforementioned order determined based on the order of the uplink reference signals of the second terminals in time domain/frequency domain/code domain.

Specifically, if uplink reference signals of the second terminals are differentiated through different time resources (e.g., as illustrated in FIG. 15), the bits for the second terminals (where 1-bit for one second terminal) in the code sequence may be arranged in chronological order of the uplink reference signals, i.e., a 1-bit corresponding to an uplink reference signal preceding in time precedes code sequence; if the uplink reference signals of the second terminals are differentiated through different frequency resources (e.g., as illustrated in FIG. 16), the bits for the second terminals (where 1-bit for one second terminal) in the code sequence may be arranged in sequential order of the uplink reference signals in the frequency domain, that is, a 1-bit corresponding to an uplink reference signal preceding in frequency position precedes in the code sequence; and if the uplink reference signals of the second terminals are differentiated through different code resources (e.g., as illustrated in FIG. 17), the 1-bit information for the second terminals in the code sequence may be arranged in the order of different codes used by the uplink reference signals, which is specified in advance by the base station 210.

After determining the code sequence, the first terminal 200 may determine at least one of the scrambling code sequence and the spreading code sequence used in feeding back NACK based on the code sequence.

As an example, assuming that the first terminal 200 divides the scrambling code sequences/spreading code sequences into a plurality of categories or numbering reserved scrambling codes, the first terminal 200 may, for example, determine a category of the scrambling code sequence/spreading code sequence or a number of the reserved scrambling code used in feedback, by determining a decimal number corresponding to the N bits as a category of the scrambling code sequence/spreading code or a number of the reserved scrambling codes to be used.

For example, assuming that there are three second terminals 1402, 1403 and 1404, where the demodulation failure reason associated with the second terminal 1402 is the poor downlink quality of the first terminal 200, the demodulation failure reason associated with the second terminal 1003 is the excessive power of inter-terminal interference to the first terminal 200 caused by the second terminal 1003, and the demodulation failure reason associated with the second terminal 1004 is the excessive power of inter-terminal interference to the first terminal 200 caused by the second terminal 1004, then the first terminal 200 determines the code sequence as 011 according to the demodulation failure reasons associated with them. Since a decimal number corresponding to the binary sequence 011 is 3, when feeding back NACK, the first terminal 200 uses a scrambling code sequence/spreading code sequence of category 3 or uses a reserved scrambling code with a number 3 to perform an additional level of scrambling.

By adopting the Mode C, the first terminal 200 may feedback the demodulation failure reason without adding additional bits, thereby reducing signaling overhead.

Referring back to FIG. 18, in operation 1815, the first terminal 200 transmits the information on demodulation failure to the base station 210.

FIG. 19 illustrates a method 190 for processing information on demodulation failure received from the first terminal 200 and performing scheduling by the base station 210.

In operation 1900, the base station 210 receives the information on demodulation failure from the first terminal 200.

In operation 1905, the base station 210 determines N demodulation failure reasons respectively associated with N second terminals causing inter-terminal interference to the first terminal 200 based on the information on demodulation failure, where N is an integer greater than 0, and the inter-terminal interference is interference to the first terminal 200 caused by a second terminal(s) when the second terminal(s) perform uplink transmission using the same communication resources as the communication resources used by the first terminal when performing downlink reception, and each demodulation failure reason includes one of a first reason and a second reason.

In the following description, the first reason may be excessive power of inter-terminal interference to the first terminal 200 caused by a corresponding second terminal, and the second reason may be poor downlink quality of the first terminal 200.

The base station 210 may determine the N demodulation failure reasons associated with the N second terminals in various manners, which will be described below by taking Mode 1, Mode 2, Mode 3, and Mode 4 as examples.

Mode 1:

The base station 210 may extract M-bit indication information for the N second terminals from information on demodulation failure, where M is an integer greater than 0; and determine that at least one of the N demodulation failure reasons is a first reason when the M-bit indication information is a first value; and determine that the N demodulation failure reasons are all the second reasons when the M-bit indication information is a second value.

The first value may be a first predetermined bit sequence; and the second value may be a second predetermined bit sequence different from the first predetermined bit sequence.

For example, the first value may be "1" and the second value may be "0".

For example, when the first terminal 200 generates information on demodulation failure through Mode A described above, the base station 210 may determine N demodulation failure reasons through Mode 1. However, the case where the base station 210 adopts Mode 1 is not limited to this.

By adopting Mode 1, the base station 210 may quickly reduce the inter-terminal interference to the first terminal 200 with less signaling information, thereby improving user experience of the user of the first terminal 200.

Mode 2:

The base station 210 may extract N pieces of M-bit indication information for the N second terminals respectively from the information on demodulation failure, where M is an integer greater than 0; and perform the following steps for each of the N second terminals: determining that a demodulation failure reason associated with a corresponding second terminal is a first reason, when the M-bit indication information for the corresponding second terminal is a first value; and determining that the demodulation failure reason associated with the corresponding second terminal is a second reason, when the M-bit indication information for the corresponding second terminal is a second value.

As an example, the first value may be a first predetermined bit sequence; and the second value may be a second predetermined bit sequence different from the first predetermined bit sequence.

For example, the first value may be "1" and the second value may be "0".

Optionally or alternatively, the first value may indicate the power of inter-terminal interference to the first terminal 200 caused by the corresponding second terminal and the power is greater than or equal to a predetermined threshold $P_{th}$; and the second value may indicate the power of inter-terminal interference to the first terminal 200 caused by the corresponding second terminal and the power is less than the predetermined threshold $P_{th}$.

Specifically, the base station 210 may extract the power of inter-terminal interference to the first terminal 200 respectively caused by the N second terminals from the information on demodulation failure. When the base station 210 determines that power $P_1$ of inter-terminal interference to the first terminal 200 caused by a certain second terminal is greater than or equal to the predetermined threshold $P_{th}$, the base station 210 determines that the demodulation failure reason associated with the second terminal is the first reason; and when the base station 210 determines that the power $P_1$ of the inter-terminal interference to the first terminal 200 caused by the second terminal is less than the predetermined threshold $P_{th}$, the base station 210 determines that the demodulation failure reason associated with the second terminal is the second reason.

For example, when the first terminal 200 generates information on demodulation failure by combining both the M-bit indication information having the first value and the M-bit indication information having the second value in a certain order as described in Mode B described above, the base station 210 may determine N demodulation failure reasons through Mode 2. However, the case where the base station 210 adopts Mode 2 is not limited to this.

By adopting Mode 2, the base station 210 may determine the contribution of each second terminal to the demodulation failure to determine different scheduling decisions for different second terminals, so as to prevent restriction of uplink transmission of the second terminals that do not cause inter-terminal interference to the first terminal 200 that results in deterioration of user experience of the second terminal, thus improving throughput of the system.

Mode 3:

The base station 210 may extract K pieces of M-bit indication information for K second terminals of the N second terminals respectively from the information on demodulation failure, where M is an integer greater than 0 and K is an integer greater than 0 and less than N; and perform the following steps for each of the N second terminals: determining that a demodulation failure reason associated with a corresponding second terminal is a first reason, when the extracted K pieces of M-bit indication information contains M-bit indication information for the corresponding second terminal; and determining that the demodulation failure reason associated with the corresponding second terminal is a second reason, when the extracted K pieces of M-bit indication information does not contain M-bit indication information for the corresponding second terminal.

For example, when the first terminal 200 generates information on demodulation failure by combining only M-bit indication information having a first value in a certain order as described in Mode B described above, the base station 210 may determine N demodulation failure reasons through Mode 3. However, the case where the base station 210 adopts Mode 3 is not limited to this.

By adopting Mode 3, the base station 210 may know which second terminals cause excessive inter-terminal interference to the first terminal 200 with relatively less signaling overhead.

Mode 4:

The base station 210 may determine at least one of a scrambling code sequence and a spreading code sequence used when the first terminal 200 feeds back a negative acknowledgment (NACK), based on the information on demodulation failure; and determine N demodulation failure reasons respectively associated with the N second terminals, based on the determined at least one of the scrambling code sequence and the spreading code sequence.

For example, when the first terminal 200 generates information on demodulation failure through Mode C described above, the base station 210 may determine N demodulation failure reasons through Mode 4. However, the case where the base station 210 adopts Mode 4 is not limited to this.

For example, the base station 210 may extract a code sequence containing bits where 1-bit is for a demodulation failure reason for each of the N second terminals, based on information on demodulation failure, and determine N demodulation failure reasons respectively associated with the N second terminals based on the code sequence.

Specifically, the base station 210 determines the code sequence based on a category of a scrambling code sequence/spreading code sequence or a number of a reserved scrambling code used by the first terminal 200. For example, assuming that there are three second terminals 1402, 1403 and 1404, if the base station 210 determines that the first terminal 200 uses a scrambling code sequence/spreading code sequence of category 3 when feeding back NACK, or uses a reserved scrambling code of a number 3 to perform an additional level of scrambling when feeding back NACK, the base station 210 may convert the category/number "3" into a binary number "011", thereby determining that the 1 bit associated with the second terminal 1402 in the code sequence is "0", the 1 bit associated with the second terminal 1403 in the code sequence is "1" and the 1 bit associated with the second terminal 1404 in the code sequence is "1", where "1" may indicate that a demodulation failure reason associated with a corresponding second terminal is the first reason, and "0" may indicate that the demodulation failure reason associated with the corresponding second terminal is the second reason. Thus, the base station 210 determines the demodulation failure reason associated with each second terminal.

The base station 210 performs retransmission scheduling based on an updated terminal pairing situation table, or no longer schedules uplink transmission of any terminal during retransmission.

By adopting Mode 4, the base station 210 may know the demodulation failure reason of the first terminal 200 without receiving additional bits, thereby reducing signaling overhead.

Referring back to FIG. 19, in operation 1910, the base station 210 schedules uplink transmission of the N second terminals based on the determined N demodulation failure reasons.

The base station 210 maintains an inter-terminal interference pairing table (as illustrated in Table 2) and/or an inter-terminal interference power table (as illustrated in Table 3).

TABLE 2

Terminal pairing situation table

| Second terminal | First terminal | | | |
|---|---|---|---|---|
| | 1 | 2 | ... | N + 1 |
| 1 | 0 | 0 | ... | 1 |
| 2 | 0 | — | ... | 1 |
| ... | ... | ... | ... | ... |
| N + 1 | 1 | 1 | ... | 1 |

In Table 2, a value at position (i, j) indicates whether the second terminal i can be paired with the first terminal j, where "0" indicates no, "1" indicates yes and "–" indicates that pairing relationship has not been determined. The base station 210 performs terminal scheduling based on the terminal pairing situation table, and only terminals that can be paired will be respectively scheduled for uplink and downlink transmission on the same communication resources (e.g., time-frequency resources). That is, when (i, j)=0, the second terminal i cannot perform uplink transmission on the communication resources used by the first terminal j to perform downlink reception; when (i, j)=1, the second terminal i may perform uplink transmission on the communication resources used by the first terminal j to perform downlink reception; and when (i, j)=–, the base station 210 has not yet determined whether the second terminal i can perform uplink transmission on the communication resources used by the first terminal j to perform downlink reception.

TABLE 3

Inter-terminal Interference Power Information Table

| Second terminal | First terminal | | | |
|---|---|---|---|---|
| | 1 | 2 | ... | N + 1 |
| 1 | $I_0$ | $I_{20}$ | ... | $I_{235}$ |
| 2 | $I_{20}$ | — | ... | $I_{167}$ |

TABLE 3-continued

Inter-terminal Interference Power Information Table

| Second terminal | First terminal | | | |
|---|---|---|---|---|
| | 1 | 2 | ... | N + 1 |
| ... | ... | ... | ... | ... |
| N + 1 | $I_{235}$ | $I_{167}$ | ... | $I_{10}$ |

In Table 3, a value at position (i, j) represents a quantization level of the power of inter-terminal interference to the first terminal j caused by the second terminal i. For example, as illustrated in Table 3, the power of inter-terminal interference may be quantized into 256 levels $I_0$-$I_{255}$, or may be quantized into other numbers of levels. When (i, j)=–, the base station 210 has not yet determined the power of inter-terminal interference to the first terminal j caused by the second terminal i.

The base station 210 may schedule uplink transmission of the N second terminals during retransmission based on the determined N demodulation failure reasons. Specifically, the base station 210 may update at least one of the inter-terminal interference pairing table and the inter-terminal interference power table of the base station 210 based on the determined N demodulation failure reasons; and schedule uplink transmission of the N second terminals based on the updated at least one of the inter-terminal interference pairing table and the inter-terminal interference power table of the base station 210.

Specifically, when the base station 210 determines that the demodulation failure reason associated with the second terminal i is the first reason from the information on demodulation failure received from the first terminal j, the base station 210 may update the element (i, j) in the terminal pairing situation table to "0" to indicate that the first terminal j cannot be paired with the second terminal i, or may update the element (i, j) in the inter-terminal interference power information table to power of inter-terminal interference to the first terminal j caused by the second terminal i.

When the base station 210 determines that the demodulation failure reason associated with the second terminal i is the second reason from the information on demodulation failure received from the first terminal j, the base station 210 may update the element (i, j) in the terminal pairing situation table to "1" to indicate that the first terminal j can be paired with the second terminal i or the base station 210 may not update the terminal pairing situation table. In addition, the base station 210 may update the element (i, j) in the inter-terminal interference power information table to the power of inter-terminal interference to the first terminal j caused by the second terminal i, or may not update the inter-terminal interference power information table.

After updating the inter-terminal interference pairing table and/or the inter-terminal interference power table, the base station 210 may schedule uplink transmission of the N second terminals during retransmission based on the updated inter-terminal interference pairing table and/or the updated inter-terminal interference power table.

Specifically, when the base station 210 schedules uplink transmission of the N second terminals based on the updated inter-terminal interference pairing table during retransmission, taking the element (i, j) of the updated inter-terminal interference pairing table as an example, when (i, j)=1, the base station 210 may schedule uplink transmission of the second terminal i on the communication resources used by the first terminal j for downlink reception, and when (i, j)=0, the base station 210 may schedule no uplink transmission of the second terminal i on the communication resources used by the first terminal j for downlink reception. In this way, the base station 210 can perform fast and targeted scheduling for each second terminal.

When the base station 210 schedules the uplink transmission of the N second terminals based on the updated inter-terminal interference power table during retransmission, taking the element (i, j) of the updated inter-terminal interference power table as an example, when (i, j)<a predetermined threshold $P_{th}$, the base station 210 may schedule the uplink transmission of the second terminal i on the communication resources used by the first terminal j for downlink reception, and when (i, j)≥the predetermined threshold $P_{th}$, the base station 210 may schedule no uplink transmission of the second terminal i on the communication resources used by the first terminal j for downlink reception. In this way, the base station 210 may utilize the timely inter-terminal interference power to realize accurate scheduling.

Optionally or alternatively, the base station 210 may not update any one of the inter-terminal interference pairing table and the inter-terminal interference power table of the base station 210, and when it is determined that at least one of the N demodulation failure reasons is the first reason, the base station 210 may schedule no uplink transmission of the N second terminals within a following predetermined period of time, and when it is determined that the N demodulation failure reasons are all the second reasons, the base station 210 may continue to schedule uplink transmission of the N second terminals within a following predetermined period of time. In this way, the base station 210 may quickly reduce the inter-terminal interference to the first terminal 200 and improve the user experience of the user of the first terminal 200.

FIG. 20 is a schematic diagram illustrating a structure of the first terminal 200.

In FIG. 20, the first terminal 200 includes a transceiver 2010 and a controller 2020. The transceiver 2010 is configured to receive and demodulate data from the base station 210. The controller 2020 is configured to: determine N demodulation failure reasons respectively associated with N second terminals causing inter-terminal interference to the first terminal 200 when demodulation of the data fails; generate information on demodulation failure based on the determined N demodulation failure reasons; and control the transceiver to transmit the information on demodulation failure to the base station 210, where N is an integer greater than 0, and the inter-terminal interference is interference to the first terminal 200 caused by the second terminals when the second terminals perform uplink transmission using the same communication resources as the communication resources used by the first terminal when performing downlink reception, and where each demodulation failure reason includes one of a first reason and a second reason.

The first reason may be excessive power of inter-terminal interference to the first terminal 200 caused by a corresponding second terminal, and the second reason may be poor downlink quality of the first terminal 200.

FIG. 21 is a schematic diagram illustrating a structure of a base station 210.

In FIG. 21, the base station 210 includes a transceiver 2110 and a controller 2120.

The transceiver 2110 is configured to receive the information on demodulation failure from the first terminal 200. The controller 2120 is configured to: determine N demodulation failure reasons respectively associated with N second terminals causing inter-terminal interference to the first terminal 200 based on the information on demodulation failure; schedule uplink transmission of the N second terminals based on the determined N demodulation failure reasons, where N is an integer greater than 0, and the inter-terminal interference is interference to the first terminal 200 caused by the second terminals when the second terminals perform uplink transmission using the same communication resources as the communication resources used by the first terminal when performing downlink reception, and where each demodulation failure reason includes one of a first reason and a second reason.

The first reason may be excessive power of inter-terminal interference to the first terminal 200 caused by a corresponding second terminal, and the second reason may be poor downlink quality of the first terminal 200.

Various embodiments of the present disclosure may be implemented as computer readable codes embodied on a computer readable recording medium from a specific perspective. The computer readable recording medium is any data storage device that can store data readable by a computer system. Examples of the computer-readable recording medium may include read-only memory (ROM), random access memory (RAM), optical disk read-only memory (CD-ROM), magnetic tape, floppy disk, optical data storage device, carrier wave (e.g., data transmission via the Internet), and the like. The computer readable recording medium may be distributed through computer systems connected through a network, and thus the computer readable codes may be stored and executed in a distributed manner. Moreover, functional programs, codes, and code segments for implementing various embodiments of the present disclosure may be easily interpreted by those skilled in the art to which the embodiments of the present disclosure are applied.

It will be understood that embodiments of the present disclosure may be implemented in hardware, software, or a combination of hardware and software. The software may be stored as program instructions or computer readable codes executable on a processor on a non-transitory computer readable medium. Examples of the non-transitory computer readable recording medium include magnetic storage media (e.g., ROM, floppy disk, hard disk, etc.) and optical recording media (e.g., CD-ROM, digital video disk (DVD), etc.). The non-transitory computer readable recording medium may also be distributed across network-coupled computer systems such that the computer readable codes are stored and executed in a distributed manner. The medium may be read by a computer, stored in a memory, and executed by a processor. Various embodiments may be implemented by a computer or a portable terminal including a controller and a memory, and the memory may be an example of a non-transitory computer readable recording medium adapted to store a program(s) having instructions to implement embodiments of the present disclosure. The present disclosure may be implemented by a program having codes for specifically implementing the apparatuses and methods described in the claims, which is stored in a machine (or computer) readable storage medium. The program may be electronically carried on any medium, such as a communication signal transmitted via a wired or wireless connection, and the present disclosure suitably includes equivalents thereof.

In order to make purposes, technical means and advantages of the present application more explicit and apparent, inventive concepts of the present application will be further explained below with reference to the accompanying drawings.

FIG. 23 illustrates a first embodiment of the present application. FIG. 23 is only an example and is not intended to limit the scope of protection claimed by the present invention.

As shown in FIG. 23, in the first embodiment, a base station (BS) performs a procedure of scheduling full-duplex communication for a user equipment (UE) by the following method steps.

In step S2310, if the UE has a full-duplex communication capability, the BS receives information reported by the UE that the UE has the full-duplex communication capability from the UE after the UE accesses a wireless system. Through actively reporting capability information of UEs within the BS's coverage area by the UEs when accessing the wireless system, the BS may acquire performance of the UEs immediately, thus improving scheduling efficiency.

In step S2320, the BS transmits control signaling to the UE to activate the UE's full-duplex communication capability.

After receiving the information that the UE has the full-duplex communication capability, and before scheduling full-duplex communication for the UE, the BS transmits control signaling to the UE to notify the UE to activate its own full-duplex communication capability, and meanwhile allocates some uplink resources to the UE for the UE to initialize a self-interference cancellation module. These uplink resources may be reference signal resources dedicated to initialization of the self-interference cancellation module of the UE, or may be uplink transmission resources for scheduling uplink transmission of the UE. By allocating resources for initializing the self-interference cancellation module to the UE, self-interference of the UE can be eliminated by the UE, thus the communication efficiency when performing full-duplex communication can be improved.

In addition, the BS configures a full-duplex mode timer for the UE while transmitting activation signaling, and notifies the UE of configuration of the timer through control signaling. The initial value of the timer may be determined according to a duration of the full-duplex communication service of the UE. The UE may maintain a full-duplex operation mode until the duration of the timer expires.

In step S2330, the BS schedules full-duplex transmission for the UE after the UE completes initialization of its self-interference cancellation module.

After receiving signaling transmitted from the BS for activating the full-duplex communication capability, the UE initializes the self-interference cancellation module using uplink resources allocated by the BS. For example, the UE may initialize coefficients of the self-interference cancellation module. In addition, the UE starts the timer according to the configuration of the full-duplex mode timer notified by the BS.

It should be noted that the UE may perform full-duplex transmission only after a period of time T after receiving the signaling transmitted from the BS for controlling the UE to activate the full-duplex communication capability. Where T is the time required by the UE to perform initialization of the self-interference cancellation module, and the value of T is configured by the system. For example, T may be equal to 1 ms, 5 ms, 10 ms or 20 ms, etc. Within the period of time T after the UE receiving the signaling, the BS may only schedule half-duplex transmission for the UE since the initialization of the self-interference cancellation module by the UE has not been completed yet; after the period of time T and before the full-duplex timer expires, the UE has completed the initialization of the self-interference cancellation module, and the BS may schedule full-duplex transmission for the UE.

Further, before the full-duplex timer expires, in order to ensure that the self-interference cancellation module of the UE can continuously track the change of the self-interference channel, the BS needs to allocate uplink resources for updating the coefficients of the self-interference cancellation module of the UE to the UE. The allocation of the uplink resources may be performed periodically, for example, a time interval between two adjacent resource allocations may set to be less than a correlation time of the self-interference channel; and the allocation of the uplink resources may also be driven by event, for example, if the UE detects that the power of residual self-interference is higher than a certain threshold, it transmits a request for resources to the BS, and the BS allocates certain uplink resources to the UE after receiving the request for resources from the UE. By allocating resources for updating the self-interference cancellation module to the UE in the procedure of full-duplex communication, the UE can eliminate self-interference during the communication process, thereby improving the communication efficiency when performing full-duplex communication.

In addition, before the full-duplex timer expires, the BS may notify the user to restart the timer or turn off the timer through control signaling. After receiving a command for restarting the timer, the user may restart the timer or turn off the timer according to the command.

After the full-duplex timer is turned off, the BS may only schedule half-duplex transmission for the UE. If the UE needs to re-enable the full-duplex transmission capability, the BS may re-perform the above method steps based on the stored information about the UE, and configure the UE to re-perform the full-duplex transmission.

FIG. 24 illustrates a second embodiment of the present application. FIG. 24 is only an example and is not intended to limit the scope of protection claimed by the present invention.

In the application scenario of the second embodiment, the system has a wide bandwidth, while the UE having a full-duplex communication capability can only communicate on a narrow channel bandwidth. At this time, the BS will schedule the UE, which leads to a switching of the communication channel of the UE. When performing the channel switching, different signaling designs are required depending on an operation mode (full-duplex mode or half-duplex mode) of the UE. If the UE is currently in a half-duplex operation mode, the BS adopts an operation process of the first embodiment as shown in FIG. 23 to schedule full-duplex transmission for the user after switching the UE into a new channel; and if the UE is currently in full-duplex mode, according to different situations of the self-interference channel before and after the channel switching, the following procedures may be adopted respectively:

Procedure 1: if the self-interference channel after the channel switching is basically unchanged compared with that before the channel switching, the user still has good self-interference cancellation capability on the switched new channel, and at this time, the BS may schedule full-duplex transmission for the UE on the new channel, and the UE may use the same full-duplex timer as on the previous channel before the switching, or may start a new full-duplex timer;

Procedure 2: if the self-interference channel after the channel switching changes to a certain extent compared with that before the channel switching, the self-interference cancellation capability of the UE will be reduced by a certain extent, and at this time, the BS allocates a number of uplink resources to the UE while scheduling the UE to switch the channel, so that the UE updates its own self-interference cancellation module, thus maintaining the self-interference level of the UE at a low level. Where the number of the allocated uplink resources is less than that of the resources required by the UE to initialize the self-interference cancellation module, and the UE may use the same full-duplex timer as on the previous channel before the switching or start a new full-duplex timer. During this procedure, the UE updates its own self-interference cancellation module using the allocated uplink resources, and then maintains the full-duplex operation mode;

Procedure 3: if the self-interference channel after the channel switching changes greatly compared with that before the channel switching, the self-interference cancellation capability of the UE is not sufficient to reduce the self-interference to a sufficiently low level after the switching, and at this time, the BS firstly performs half-duplex transmission scheduling for the UE, and when the full-duplex communication capability is enabled on switched channel, the method steps of the first embodiment as shown in FIG. 23 are adopted to schedule full-duplex communication for the UE, and the UE turns off the full-duplex timer for the previous channel before the switching.

From the above description, it can be seen that scheduling mode of the BS for the UE depends on the extent of change of the self-interference channel of the UE.

The BS may adopt the following methods to determine the extent of change of the self-interference channel:

1) if the previous channel (before switching) and the switched channel (after switching) have different frequency points and the same bandwidth, but a distance between two frequency points is less than a first frequency point threshold $\Delta f_1$, or if the previous channel (before switching) and the switched channel (after switching) have the same frequency point and different bandwidths, but a difference between two channel bandwidths is less than a first bandwidth threshold $\Delta B_1$, then the BS determines that the UE still works in full-duplex mode after the channel switching, and performs processing according to the aforementioned procedure 1;

2) if the previous channel (before switching) and the switched channel (after switching) have different frequency points and the same bandwidth, but the distance between two frequency points is greater than the first frequency point threshold $\Delta f_1$ but less than a second frequency point threshold $\Delta f_2$, or, the previous channel and the switched channel have the same frequency point and different bandwidths, but the difference between the two channel bandwidths is greater than the first bandwidth threshold $\Delta B_1$, and less than a second bandwidth threshold $\Delta B_2$, then the BS determines that the user needs certain uplink resources to update the coefficients of the self-interference cancellation module, and performs processing according to the aforementioned procedure 2;

3) if the previous channel (before switching) and the switched channel (after switching) have different frequency points and the same bandwidth, but the distance between two frequency points is greater than the second frequency point threshold $\Delta f_2$, or, the previous channel (before switching) and the switched channel (after switching) have the same frequency point and different bandwidths, but the difference between two channel bandwidths is greater than the second bandwidth threshold $\Delta B_2$, then the BS determines that the user still works in the full-duplex mode after the channel switching, and performs processing according to the aforementioned procedure 3.

In the above methods for determining the extent of change of the self-interference channel, thresholds $\Delta f_1$, $\Delta f_2$, $\Delta B_1$ and $\Delta B_2$ are set by the system according to actual measurement results.

In addition, the BS may not determine the extent of change of the self-interference channel, but adopt any one of the aforementioned procedures 1-3 by default.

In both the previously described first and second embodiments, the BS configures the full-duplex communication capability of the UE through signaling. Unlike this, in a third embodiment, a UE reports its own operation mode according to information on power of residual self-interference measured by itself.

First, after accessing the wireless communication system, the UE reports its capability of supporting full-duplex communication to the BS. In this embodiment, the BS does not allocate to the UE additional uplink resources for initializing the self-interference cancellation module of the UE. Instead, the UE initializes its self-interference cancellation module on its own using the previously allocated uplink resources during transmission. Since the UE reports its operation mode on its own and the BS does not need to allocate uplink resources for initializing the self-interference cancellation module of the UE additionally, workload of the BS is reduced and the utilization efficiency of resources is improved.

During measurement, the UE uses uplink resources transmitted by itself to measure the power of residual self-interference, and uses uplink resources transmitted by other UEs to measure power of interference between the UE and the other UEs. Specific measurement methods for interference power may be found in the relevant descriptions in the patents "method and procedure for interference measurement, Chuang ZHANG, etc." and "method and system for information transmission, Chen QIAN, etc."

Like the methods described in the above patents, the BS maintains a table for describing the situation of user pairing, as shown in Table 4 below.

TABLE 4

User Pairing Table

| Uplink users | Downlink users | | | |
|---|---|---|---|---|
| | 1 | 2 | ... | N |
| 1 | 0 | 0 | ... | 1 |
| 2 | 0 | — | ... | 1 |
| . | . | . | ... | . |
| N | 1 | 1 | ... | 1 |

In Table 4, value (i, j) of the element in row i and column j indicates the pairing situation between UE i and UE j. For example, if the value is 1, it means that the uplink transmission of UE i and the downlink transmission of UE j are scheduled in the same time and in the same frequency; if the value is 0, it means that this procedure cannot be performed, and if the value is "–", it means that there is no measurement result currently. In addition, the value (i, i) of row i and column i indicates whether UE i can perform full-duplex communication, and if the value is 1, it indicates yes; if the value is 0, it means no; and when the value is "–", it means that there is no measurement result currently.

The UE compares the measured power of residual self-interference or power of interference between UEs with an interference power threshold $I_{th}$ preset by the system, and feeds back "1" to the BS if the power of residual self-interference or the power of interference between UEs is less than the threshold $I_{th}$, and feeds back "0" otherwise.

After receiving the feedback from the UE, the BS updates the pairing table of the UE according to the feedback, and schedules the UE according to the updated pairing table. For example, when scheduling UE i, if the value (i, i) in the pairing table is 1, indicating that UE i can perform full-duplex communication, then the BS can schedule full-duplex communication for UE i; otherwise, the BS cannot schedule full-duplex communication for UE i.

In order to enable the BS to perform scheduling more accurately, the BS may maintain a user interference power information table, as shown in Table 5 below.

TABLE 5

User Interference Power Information Table

| Uplink users | Downlink users | | | |
|---|---|---|---|---|
| | 1 | 2 | ... | N |
| 1 | $I_0$ | $I_{20}$ | ... | $I_{235}$ |
| 2 | $I_{20}$ | — | ... | $I_{167}$ |
| | | | ... | |
| N | $I_{235}$ | $I_{167}$ | ... | $I_{10}$ |

In Table 5, value (i, j) of the element in row i and column j indicates the power of interference between UE i and UE j, and value (i, i) of row i and column i indicates the power of residual self-interference of the UE i. Where, methods used for the UE to transmit the measured results to the BS may also be found in patents "method and procedure for interference measurement, Chuang ZHANG, etc." and "method and system for information transmission, Chen QIAN, etc.".

In addition, in the third embodiment, the UE may quantize the measured power of interference between the UEs and the power of residual self-interference with corresponding levels. For example, an 8-bit field may be used to quantize the power of interference between the UEs, and a 1-bit field may be used to quantize the power of self-interference. If a 1-bit field is used to quantize the power of residual self-interference of the UE, then "0" is fed back when the power of residual self-interference is greater than a preset threshold, otherwise, "1" is fed back. Similarly, for power of interference between UEs quantized with an 8-bit field, the power of interference is divided into 256 levels, so a total of 255 thresholds are set in advance; by comparing the measured power of interference with these preset thresholds, a quantization interval in which the power of interference is located is determined, and a corresponding 8-bit field indicating the quantization interval is returned. At this time, in the interference power information table for UEs maintained at the BS, a quantization level on the diagonal (representing power of residual self-interference of a UE) is less than a quantization level off the diagonal (representing power of interference between the UEs). However, the aforementioned method is merely an example. The UE may also use bit fields of other lengths to respectively quantize the measured power of interference between UEs and the power of residual self-interference, and the power of interference between the UEs and the power of residual self-interference may also be quantized with the same quantization level, i.e., may be quantized with bit fields of the same length.

According to the above interference power information table, when the BS schedules full-duplex communication for the UEs, if one certain UE is selected for transmission in one direction (uplink or downlink direction), when selecting a UE in the other direction (downlink or uplink direction), according to the result of querying the interference power information table, if a same UE meets the scheduling requirements (the UE has traffic in the other direction and supports full-duplex communication), then the BS may preferentially select the UE.

With the method in the third embodiment, the UE having the full-duplex communication capability updates the coefficients of its self-interference cancellation module when performing uplink transmission, and whether the UE operates in the full-duplex communication mode depends on the scheduling of the BS. If the uplink and downlink resources allocated to the UE by the BS based on the user pairing table or the user interference power information table are at the same time and at the same frequency, then the UE performs full-duplex communication; otherwise it performs half-duplex communication. In the third embodiment, there is no need to involve additional activation signaling or setting a timer, thus reducing the workload of the BS and improving the scheduling efficiency.

Similar to the second embodiment, if the system bandwidth is wide while the bandwidth supported by the UE is narrower than the system bandwidth, the BS may perform channel switching for the UE according to the load condition or the channel state. Due to the difference between channels before and after the switching, the power of interference between UEs or the power of residual self-interference measured on the channel before the switching may or may not be applicable on the channel after the switching. If still applicable, the BS schedules the full-duplex communication for the UE based on the user pairing table or the user interference power information table for the channel before the switching; and if no longer applicable, the UE needs to remeasure the power of interference between UEs and the power of residual self-interference on the channel after switching and report the measurement results to the BS, which updates the user pairing table or the user interference power information table based on the measurement results, and schedules the full-duplex communication for the UE based on the updated user pairing table or user interference power information table.

Determining whether the result measured on the channel before the switching is applicable to the channel after the switching may be performed based on the difference of the channels, for example, using the methods of determining by a threshold of frequency point or bandwidth in the second embodiment. Another way is that the BS may adopt one of the methods by default, for example, if the UE experiences channel switching, when the BS schedules full-duplex communication for the UE on the channel after the switching, the UE needs to re-measure on the channel after the switching and report the re-measured result to the BS, and the BS schedules the UE based on the re-measured result; or, on the channel after the switching, the BS still uses the user pairing table or the user interference power information table for the channel before the switching, but updates the measurement result when scheduling full-duplex communication for the UE.

Those skilled in the art will appreciate that the present invention includes devices related to performing one or more of the operations described in the present application. These devices may be specially designed and manufactured for the desired purpose, or may also include known devices in general purpose computers. These devices have computer programs stored therein that are selectively activated or reconfigured. Such computer programs may be stored in a device (e.g., a computer) readable medium or may be stored in any type of medium suitable for storing electronic instructions and coupled to a bus respectively, including, but not limited to, any type of disk (including floppy disk, hard disk, optical disk, CD-ROM, and magneto-optical disk), ROM (Read-Only Memory), RAM (Random Access Memory), EPROM (Erasable Programmable Read-only Memory), EEPROM (Electrically Erasable Programmable Read-only Memory), flash memory, magnetic card or light card. That is, a readable medium includes any medium that stores or transmits information in a device (e.g., a computer) readable form.

Those skilled in the art will appreciate that each block in these structure diagrams and/or block diagrams and/or flow diagrams and combinations of blocks in these structure diagrams and/or block diagrams and/or flow diagrams may be implemented with computer program instructions. Those skilled in the art will appreciate that these computer program instructions may be provided to a processor of a general purpose computer, a special purpose computer or other programmable data processing device for implementation, thus schemes specified in the block or blocks of structure diagrams and/or block diagrams and/or flow diagrams disclosed herein are performed by the processor of the general purpose computer or other programmable data processing device.

Those skilled in the art will appreciate that steps, measures and schemes in various operations, methods, processes that have been discussed in the present invention may be alternated, modified, combined, or deleted. Furthermore, other steps, measures and schemes in various operations, methods, processes that have been discussed in the present invention may also be alternated, modified, rearranged, decomposed, combined or deleted. Furthermore, steps, measures and schemes in various operations, methods and processes in the prior art disclosed in the present invention may also be alternated, modified, rearranged, decomposed, combined or deleted.

The above description is only a part of embodiments of the present invention. It should be pointed out that for those of ordinary skill in the art, several improvements and embellishments can be made without departing from the principles of the present invention, which should also be considered within the scope of protection of the present invention.

The following detailed description is provided to assist readers in obtaining a comprehensive understanding of methods, apparatuses, and/or systems described in the present disclosure. However, various changes, modifications, and equivalents of the methods, apparatuses, and/or systems described in the present disclosure will become apparent after understanding the disclosure of the present application. For example, the order of operations described in the present disclosure is merely an example and is not limited to those set forth in the present disclosure, and may be changed, as will become apparent after understanding the disclosure of the present application, except for operations that must occur in a particular order. In addition, descriptions of features well-known in the art may be omitted for clarity and conciseness.

Features described in the present disclosure may be embodied in different forms and should not be construed as limited to examples described in the present disclosure. On the contrary, the examples described in the present disclosure are only for the purpose of illustrating some of the many possible ways of implementing the methods, apparatuses, and/or systems described in the present disclosure that will become apparent after understanding the disclosure of the present application.

In order to make the purposes, technical schemes and advantages of the embodiments of the present disclosure clearer, clear and complete description of the technical schemes of the embodiments of the present disclosure will be made below with reference to the drawings of the embodiments of the present disclosure. It is apparent that, the described embodiments are some of the embodiments of the present disclosure and are not all the embodiments. Based on the described embodiments of the present disclosure, all other embodiments obtained by those of ordinary skill in the art without creative labor are within the scope sought protection for by the present disclosure.

Unless otherwise defined, technical terms or scientific terms used in the present disclosure should have general meanings understood by those of ordinary skill in the art to which the present invention belongs. Words "first", "second" and the like used in the present disclosure do not indicate any order, quantity or importance, but are only used to distinguish different components. Similarly, words "a", "an" or "the" and the like do not denote a limitation of quantity, but rather denote the presence of at least one. Words "including" or "containing" and the like mean that elements or items preceding the words encompass elements or items following the words and equivalents thereof, and do not exclude other elements or items. Words "connecting" or "connected" and the like are not limited to physical or mechanical connections, but may include electrical connections, whether directly or indirectly. "Up", "down", "left" and "right" and the like are only used to indicate a relative positional relationship, and when the absolute position of the described object changes, the relative positional relationship may also change accordingly.

It is generally believed that application of full duplex technology needs to overcome two main problems: first, self-interference, that is, interference caused by an apparatus's own uplink transmission to its downlink reception; second, co-channel interference among apparatuses within the same cell, that is, interference caused by an apparatus performing uplink transmission to an apparatus performing downlink reception using the same time-frequency resources as the apparatus performing uplink transmission. The apparatus mentioned here may be a user terminal communicating with a base station, an integrated access and backhaul (IAB) node communicating with the base station, or a mobile terminal (MT) module of the IAB node.

For these two types of interference, there are some corresponding solutions. For self-interference, for example, some self-interference cancellation schemes can reduce the self-interference below a noise level. For co-channel interference among apparatuses, some apparatus scheduling schemes can well handle the co-channel interference among apparatuses. In addition, when the apparatus is a full duplex apparatus, if time-frequency resources allocated to different full duplex apparatuses are orthogonal, the co-channel interference among apparatuses may be avoided.

However, in a full duplex system, in addition to self-interference and co-channel interference among apparatuses within a cell, there is additional interference due to inter-apparatus time misalignment. Even if orthogonal time-frequency resources are allocated to full-duplex communication apparatuses, this additional interference due to inter-apparatus time misalignment still exists.

There is a need for methods and devices for handling additional interference due to inter-apparatus time misalignment.

Hereinafter, an apparatuses (e.g., apparatus 3600) may be a user terminal communicating with base station 3500, an IAB node communicating with the base station 3500, or a MT module of the IAB node.

Specifically, the additional interference due to inter-apparatus time misalignment is analyzed with a full duplex system 100 shown in FIG. 25.

FIG. 25 is a diagram showing a full duplex system 100 according to the present disclosure. As shown in FIG. 25, the full duplex system 100 includes 4 Integrated Access and Backhaul (IAB) nodes 1001, 1002, 1003 and 1004 directly communicating with the base station 3500. The Mobile Terminal (MT) module of each IAB node is equipped with full duplex communication function. Although 4 IAB nodes are shown in FIG. 25, the number of IAB nodes is not limited thereto, and the full duplex system 100 may include more or fewer IAB nodes. In addition, the full duplex system 100 includes user terminals 1005 and 1007 directly communicating with the base station 3500, and also includes user terminals 1006, 1008, 1009, 1010 and 1011 directly communicating with the IAB nodes. This is merely an example, and the number of user terminals is not limited thereto. Then, for each of the IAB nodes 1001, 1002, 1003 and 1004 and each of the user terminals 1005 and 1007 directly communicating with the base station 3500, the base station 3500 may allocate the same time-frequency resources for its uplink and downlink.

Hereinafter, additional interference due to time misalignment will be described taking an IAB node as an example. If the time-frequency resources allocated for different IAB nodes are orthogonal (i.e., orthogonal time divided or orthogonal frequency divided), then theoretically, uplink transmission of one certain IAB node will not cause co-channel interference to downlink reception of other IAB nodes within the same cell. However, since a time when the uplink transmission of the certain IAB node reaches other IAB nodes is different from a time of a time window (e.g., OFDM window) when the other IAB nodes perform downlink reception, the uplink transmission signal of the IAB node may still cause additional interference due to time misalignment to the downlink reception of the other IAB nodes.

If the base station 3500 allocates time-frequency resources for the 4 IAB nodes 1001, 1002, 1003 and 1004 in an orthogonal frequency division manner, the allocation of the time-frequency resources and the signals received by the 4 IAB nodes 1001, 1002, 1003 and 1004 are shown in FIG. 26.

FIG. 26 shows a situation of resource allocation and signal reception when orthogonal frequency divided resources are allocated for apparatuses 3600.

Taking IAB node 1001 as an example, it receives uplink signals transmitted by other IAB nodes 1002, 1003 and 1004 in addition to downlink signals from the base station 3500. Due to the different distances from different IAB nodes to IAB node 1001, the uplink signals transmitted by these IAB nodes reach IAB node 1001 at different timings. When the IAB node 1001 determines the time window according to the reception of the downlink signals from the base station 3500, uplink signals transmitted by the IAB node 1002 may not fall completely within the determined time window, that is, the time when uplink signals transmitted by the IAB node 1002 reach the IAB node 1001 is not aligned with the downlink reception time window of the IAB node 1001, so the uplink signals of the IAB node 1002 may cause additional interference due to time misalignment to the IAB node 1001. In this case, the caused additional interference is Inter-carrier Interference (ICI). Similarly, uplink signals transmitted by IAB node 1001 and IAB node 1003 may also cause inter-carrier interference to downlink reception of IAB node 1002.

If the base station 3500 allocates time-frequency resources for the 4 IAB nodes 1001, 1002, 1003 and 1004 in an orthogonal time division manner, the allocation of the time-frequency resources and the signals received by the 4 IAB nodes 1001, 1002, 1003 and 1004 are shown in FIG. 27.

FIG. 27 shows a situation of resource allocation and signal reception when orthogonal time divided resources are allocated for apparatuses 3600.

Due to different IAB nodes have different Timing Advances (TAs), and considering a propagation delay from one IAB node to another IAB node, uplink transmission of a certain IAB node may still cause the aforementioned additional interference due to time misalignment to downlink reception of other IAB nodes. For example, in FIG. 27, the signals transmitted by the IAB node 1002 falls within the downlink reception time window of the IAB node 1001, thus causing the aforementioned additional interference due to time misalignment to the downlink reception of the IAB node 1001.

To sum up, in addition to self-interference and co-channel interference, there is also additional interference due to inter-apparatus misalignment between the arrival time of uplink signals and the downlink reception time in the full duplex system. This additional interference will affect both half duplex apparatuses and full duplex apparatuses with the full duplex function. The invention aims to design some resource allocation schemes to solve this problem.

FIG. 28 is a diagram showing a method 2800 of allocating resources by a base station 3500 for a plurality of apparatuses 3600 communicating with the base station 3500 according to the present disclosure.

If an apparatus 3600 is a full duplex apparatus supporting full duplex communication function, the base station 3500 may allocate the same resources (e.g., time-frequency resources) for the uplink and downlink of the apparatus 3600.

In step S2810, the base station 3500 allocates resources for the plurality of apparatuses 3600 based on a level of inter-apparatus interference.

Where, the inter-apparatus interference refers to the additional interference due to time misalignment between the time when the signals transmitted by the base station are received by an apparatus and the time when the signals transmitted by another apparatus are received by the apparatus, which is caused by the other apparatus to the apparatus in addition to the co-channel interference, that is, the additional interference due to time misalignment between the downlink reception time window of the apparatus and the time when the signals from the other apparatus reach the apparatus.

In order to eliminate the inter-apparatus interference, the base station 3500 may further adjust the resource allocation scheme on the basis of resource allocation based on a predetermined resource allocation criterion (e.g., proportional fairness criterion). For example, the base station 3500 may allocate unallocated resources to an apparatus causing inter-apparatus interference of a level lower than a predetermined level to an apparatus(es) to which adjacent resources of the unallocated resources are allocated (hereinafter, also referred to as a resource-adjacent apparatus(es)) and most satisfying the predetermined resource allocation criterion. This will be described in further detail with reference to FIGS. 29 and 30.

When the base station 3500 allocates resources for apparatuses 3600 in an orthogonal time division manner, the adjacent resources refer to OFDM symbols adjacent to the allocated OFDM symbols, including the preceding and succeeding OFDM symbols; and when the base station 3500 allocates resources for apparatuses 3600 in an orthogonal frequency division manner, the adjacent resources refer to subcarriers adjacent to the allocated subcarriers, including the subcarriers above and below the allocated subcarriers.

Next, the method 2800 proceeds to step S2820. In step S2820, the base station 3500 indicates the allocated resources to the plurality of apparatuses 3600.

The base station 3500 may indicate to each apparatus 3600 resources allocated to the apparatus 3600 through separate signaling respectively. Alternatively, the base station 3500 may notify each apparatus 3600 within an apparatus group (e.g., a cell or a UE group) of resources allocated to the apparatus 3600 through apparatus group signaling (e.g., cell-specific signaling or UE group-specific signaling).

Next, the method shown in FIG. 28 will be described in more detail with reference to FIG. 29. FIG. 29 is a diagram illustrating a method 2900 for allocating resources by the base station 3500 for the apparatuses 3600 communicating with the base station 3500 according to the present disclosure.

In step S2910, the base station 3500 determines candidate apparatuses for the unallocated resources according to a predetermined resource allocation criterion (e.g., proportional fairness criterion). For example, the base station 3500 may determine a best candidate apparatus (i.e., an apparatus that most conforms to the predetermined resource allocation criterion), a second best candidate apparatus, a third best candidate apparatus and so on for the unallocated resources according to the predetermined resource allocation criterion.

In step S2920, the base station 3500 allocates the unallocated resources to an optimal apparatus selected from the candidate apparatuses based on inter-apparatus interference.

Specifically, the base station 3500 may select the optimal apparatus from the candidate apparatuses by means of three modes (Mode 1', Mode 2', and Mode 3').

Mode 1':

In the case of Mode 1', the base station 3500 selects the optimal apparatus from the candidate apparatuses based on power of co-channel interference caused by an interfering apparatus to an interfered apparatus under the assumption that the interfering apparatus and the interfered apparatus use the same resources for communication.

The base station 3500 maintains a co-channel interference power table as shown in Table 6 below.

TABLE 6

Co-channel Interference Power Table

| Interfering apparatus | Interfered apparatus | | | |
| --- | --- | --- | --- | --- |
| | 1 | 2 | ... | N |
| 1 | $I_{11}$ | $I_{12}$ | ... | $I_{1N}$ |
| 2 | $I_{21}$ | $I_{22}$ | ... | $I_{2N}$ |
| ... | ... | ... | ... | ... |

TABLE 6-continued

Co-channel Interference Power Table

| Interfering apparatus | Interfered apparatus | | | |
|---|---|---|---|---|
| | 1 | 2 | ... | N |
| N | $I_{N1}$ | $I_{N2}$ | ... | $I_{NN}$ |

In Table 6, value $I_{ij}$ at position (i, j) indicates the power of co-channel interference caused by apparatus i to apparatus j under the assumption that apparatus i performs uplink transmission on the same time-frequency resources as those on which apparatus j performs downlink reception. The diagonal value $I_{ii}$ indicates the self-interference power of the apparatus i.

The base station 3500 may estimate co-channel interference power based on locations of the plurality of apparatuses 3600, or obtain the co-channel interference power by measurement.

Specifically, the base station 3500 estimates the co-channel interference power based on the locations of the plurality of apparatuses 3600 using the following method.

First, the base station 3500 acquires location information of the plurality of apparatuses 3600 (e.g., user terminals, IABs or mobile terminal modules of the IABs).

The base station 3500 may acquire the location information of an apparatus 3600 using, for example, GPS, cellular-based positioning, or the like. As for an IAB node, due to its fixed location, it generally needs to report its location to the base station 3500 only once, and does not need to report frequently. Alternatively, in order for the base station 3500 to obtain the location of the IAB node more accurately, the IAB node may be made to report results of multiple measurements of its location, and the base station 3500 takes an average value of the results of the multiple measurements as the location of the IAB node. As for a moving apparatus 3600 (e.g., a user terminal), due to its varying location, it is necessary to report its updated location to the base station 3500 in time.

Then, the base station 3500 may estimate the power of co-channel interference among apparatuses based on the location information reported by apparatuses 3600. Estimation methods may be acquired by referring to the Chinese patent document entitled "SCHEDULING METHOD, BASE STATION AND COMPUTER READABLE MEDIUM" with an application number of 201810957759.7, inventors of which are Chuang ZHANG, etc.

In addition to aforementioned estimating the power of co-channel interference among apparatuses based on the locations of apparatuses 3600, the base station 3500 may also obtain the power of co-channel interference by measurement. Obtaining methods may be acquired by referring to, for example, a Chinese patent document entitled "INTERFERENCE MEASUREMENT METHOD AND CORRESPONDING APPARATUS" with an application number of 201910311687.3, inventors of which are Chuang ZHANG, etc., or a Chinese patent document entitled "METHOD AND SYSTEM FOR INFORMATION TRANSMISSION" with an application number of 201910116881.6, inventors of which are Chen QIAN, etc.

After obtaining the power of co-channel interference, the base station 3500 allocates resources for apparatuses 3600 using the following method.

In principle, when allocating resources for a plurality of apparatuses 3600, the base station 3500 allocates adjacent resources to the apparatuses 3600 that cause small co-channel interference to each other. Specifically, the base station 3500 makes reference to a threshold $I_{th}$ of co-channel interference power. The threshold $I_{th}$ may be preset by the system, or may be determined according to experience or simulation. When power of one or more co-channel interference caused by a best candidate apparatus determined for the unallocated resources according to the predetermined resource allocation criterion to one or more resource-adjacent apparatuses to which adjacent resources are allocated are all smaller than or equal to the threshold $I_{th}$, the base station 3500 allocates the resources to the best candidate apparatus; and when at least one of power of the one or more co-channel interference is greater than the threshold $I_{th}$, the base station 3500 does not allocate the unallocated resources to the best candidate apparatus, and further repeats the aforementioned process for the second best candidate apparatus, the third best candidate apparatus and so on in sequence, until a candidate apparatus causing one or more co-channel interference the power of which are all smaller than the threshold $I_{th}$ to the one or more resource-adjacent apparatuses is selected as the optimal apparatus, and the unallocated resources are allocate to the optimal apparatus. By means of this resource allocation mode, the additional interference due to inter-apparatus time misalignment can be effectively reduced, thereby improving the throughput of the whole system.

Mode 2':

In the case of Mode 2', the base station 3500 selects the optimal apparatus from the candidate apparatuses based on distance relationship between the candidate apparatuses and the resource-adjacent apparatuses.

The base station 3500 selects a candidate apparatus that causes small inter-apparatus interference to each other with the resource-adjacent apparatus(es) from the candidate apparatuses according to the distance relationship between the candidate apparatuses and the resource-adjacent apparatuses. For apparatus i and apparatus j, the distance between the base station 3500 and apparatus i is denoted by $d_{Oi}$, the distance between the base station 3500 and apparatus j is denoted by $d_{Oj}$, and the distance between apparatus i and apparatus j is denoted by $d_{ij}$. If $d_{ij}=d_{Oi}+d_{Oj}$, the time when uplink signals transmitted by apparatus i reach apparatus j is substantially temporally aligned with the time when downlink signals are received by apparatus j at an OFDM symbol level. Therefore, when apparatus j performs FFT according to an OFDM window for the downlink signals, the uplink signals transmitted by apparatus i will not cause additional inter-carrier interference or will cause only small inter-carrier interference. Similarly, the uplink signals of apparatus j will not cause additional inter-carrier interference or will cause only small inter-carrier interference to the downlink reception of apparatus i. Based on this, in principle, when allocating resources for a plurality of apparatuses 3600, the base station 3500 may allocate adjacent resources to apparatuses 3600 that are time aligned or relatively aligned as far as possible.

Specifically, the base station 3500 makes reference to a threshold $d_{th}$ of distance. The threshold $d_{th}$ may be preset by the system. The setting of the threshold $d_{th}$ may depend on a level of power of inter-apparatus interference within the system, for example, an average value of power of inter-apparatus interference within the system. For another example, the threshold of distance may be equivalently set based on the threshold of co-channel interference power in Mode 1'.

Assuming that the best candidate apparatus determined for the unallocated resources according to the predetermined resource allocation criterion is apparatus i, one of one or more resource-adjacent apparatuses to which adjacent resources are allocated is apparatus j, and the distance between the base station 3500 and apparatus i is denoted by $d_{Oi}$, the distance between the base station 3500 and apparatus j is denoted by $d_{Oj}$, and the distance between apparatus i and apparatus j is denoted by $d_{ij}$. If $d_{0i}+d_{0j}-d_{ij} \leq d_{th}$, it means that interference caused to each other between apparatus i and apparatus j due to time misalignment is small, and if $d_{0i}+d_{0j}-d_{ij} > d_{th}$, it means that the interference caused to each other between apparatus i and apparatus j due to time misalignment is large. When the interference due to time misalignment caused to each other between apparatus i and each of the one or more resource-adjacent apparatuses is small, the unallocated resources are allocated to the apparatus i; and when the interference due to time misalignment caused to each other between apparatus i and at least one of the one or more resource-adjacent apparatuses is large, the unallocated resources are not allocated to apparatus i, and then the aforementioned process is repeated for the second best candidate apparatus, the third best candidate apparatus and so on in sequence, until a candidate apparatus between which and each of the one or more resource-adjacent apparatuses the interference due to time misalignment to each other is small is selected as the optimal apparatus, and the unallocated resources are allocated to the optimal apparatus.

The method for determining the above distances $d_{0i}$, $d_{0j}$ and $d_{ij}$ may be that: the base station 3500 may obtain apparatus location information reported from apparatuses i and j, and then may determine the distances between the apparatuses according to the location information. For example, assuming that there are N apparatuses, with the locations of $(x_1, y_1, z_1)$, $(x_2, y_2, z_2)$, ..., $(x_N, y_N, z_N)$ respectively, and the location of the base station 3500 is $(x_0, y_0, z_0)$, then the distance between apparatuses i and j is $d_{ij} = \sqrt{(x_i-x_j)^2+(y_i-y_j)^2+(z_i-z_j)^2}$, the distance between the base station 3500 and apparatus i is $d_{oi} = \sqrt{(x_0-x_i)^2+(y_0-y_i)^2+(z_0-z_i)^2}$, and the distance between the base station 3500 and apparatus j is $d_{oj} = \sqrt{(x_0-x_j)^2+(y_0-y_j)^2+(z_0-z_j)^2}$.

By means of this resource allocation mode, the plurality of apparatuses 3600 to which adjacent resources are allocated are temporally aligned as much as possible, so that the additional interference due to inter-apparatus time misalignment can be effectively reduced, thereby improving the throughput of the whole system.

Mode 3':

In the case of Mode 3', the base station 3500 selects the optimal apparatus from the candidate apparatuses based on a time difference between a downlink reception time window of a corresponding candidate apparatus and a time when a signal(s) from a resource-adjacent apparatus(es) reach the corresponding candidate apparatus.

Each apparatus 3600 may measure a time difference between an arrival time of uplink signals transmitted by another apparatus 3600 and its own downlink reception window and report the time difference to the base station 3500. The time difference is shown in Table 7.

TABLE 7

Inter-apparatus Time Difference Table

| Interfering apparatus | Interfered apparatus | | | |
|---|---|---|---|---|
| | 1 | 2 | ... | N |
| 1 | $T_{11}$ | $T_{12}$ | ... | $T_{1N}$ |
| 2 | $T_{21}$ | $T_{22}$ | ... | $T_{2N}$ |
| ... | ... | ... | ... | ... |
| N | $T_{N1}$ | $T_{N2}$ | ... | $T_{NN}$ |

In Table 7, value $T_{ij}$ at position (i, j) indicates the time difference between the time when an uplink signal transmitted by apparatus i reaches apparatus j and the downlink reception time window of apparatus j. Value $T_{ij}$ may be positive or negative. Value $T_{ii}$ at position (i, i) indicates a time difference between the uplink reception of apparatus i and the downlink reception of the apparatus i, i.e., Timing Advance (TA) of apparatus i.

The method for apparatus j to determine the inter-apparatus time difference T may be that: first, apparatus j detects signaling (e.g., broadcast control signaling) transmitted by base station 3500, where the signaling contains a preamble ID, and the preamble ID is used to configure a certain apparatus 3600 to transmit a preamble; next, if apparatus j detects that the preamble ID is for itself, it transmits a preamble corresponding to the preamble ID on the allocated resources in a manner of normally transmitting an uplink signal, i.e., using the same timing advance (TA) as the TA for performing uplink transmission; if apparatus j detects that the ID is for another apparatus i, then apparatus j detects a preamble corresponding to the preamble ID on the allocated resources, and determines a time difference between the time when the preamble arrives at apparatus j and its own downlink reception OFDM window as $T_{ij}$.

FIG. 31 shows a time difference between a downlink reception time window of apparatus j and an arrival time of a preamble transmitted by apparatus i according to the present disclosure. As shown in FIG. 31, apparatus j measures the time difference between the arrival time of the preamble transmitted by apparatus i and its own downlink reception time window. Apparatus j may report the time difference to the base station 3500. The reported time difference may be quantized with several bits, and the number of quantized bits depends on the size of the inter-apparatus time difference and a required time precision in the system. Base station 3500 maintains an inter-apparatus time difference table based on the time differences reported by apparatuses 3600, as shown in Table 7.

After obtaining the inter-apparatus time differences, the base station 3500 allocates resources for apparatuses 3600 using the following method.

Based on the inter-apparatus time difference table, in principle, the base station 3500 makes the absolute value of the time differences among the apparatuses 3600 to which adjacent resources (e.g., time-frequency resources) are allocated as small as possible when scheduling the apparatuses 3600, thereby reducing or avoiding additional interference due to inter-apparatus time misalignment between the arrival time of the transmitted signal and the signal reception time.

The system makes reference to a time difference threshold $T_{th}$. The time difference threshold $T_{th}$ may be preset by the system, or may be determined according to experience or simulation. Assuming that the best candidate apparatus determined for the unallocated resources based on the predetermined resource allocation criterion is apparatus and one of the one or more resource-adjacent apparatuses to which adjacent resources are allocated is apparatus j, if apparatus i measures that the absolute value $|T_{ij}|$ of the difference between the arrival time of the uplink signals transmitted by apparatus j and its own downlink reception time window meets $|T_{ij}| \leq T_{th}$, it is considered that the inter-apparatus interference between apparatus i and apparatus j is small; and if $|T_{ij}| > T_{th}$, it is considered that the inter-apparatus interference between apparatus i and apparatus j would be large if the unallocated resources are allocated to apparatus i. When inter-apparatus interference between apparatus i and each of the one or more resource-adjacent apparatuses is small, the unallocated resources may be allocated to apparatus i; and when inter-apparatus interference between apparatus i and at least one of the one or more resource-adjacent apparatuses is large, the unallocated resources are not allocated to apparatus i, and then the aforementioned process is repeated for the second best candidate apparatus, the third best candidate apparatus and so on in sequence, until a candidate apparatus between which and each of the one or more resource-adjacent apparatuses the time difference is smaller than the time difference threshold $T_{th}$ is selected as the optimal apparatus, and the resources are allocated to the optimal apparatus.

By means of this resource allocation mode, more accurate scheduling can be realized and interference can be better suppressed, thereby improving the throughput of the system.

Then, the method 2900 proceeds to step S2930. In step S2930, the base station 3500 indicates the allocated resources to the optimal apparatus. The base station 3500 may indicate resources allocated for the optimal apparatus to the optimal apparatus through signaling (e.g., downlink control information (DCI)).

After an apparatus 3600 obtains the resources allocated to it from the base station 3500 through signaling, apparatus 3600 may determine the allocated resources as resources for communication and communicate on the determined resources.

Figure 32:
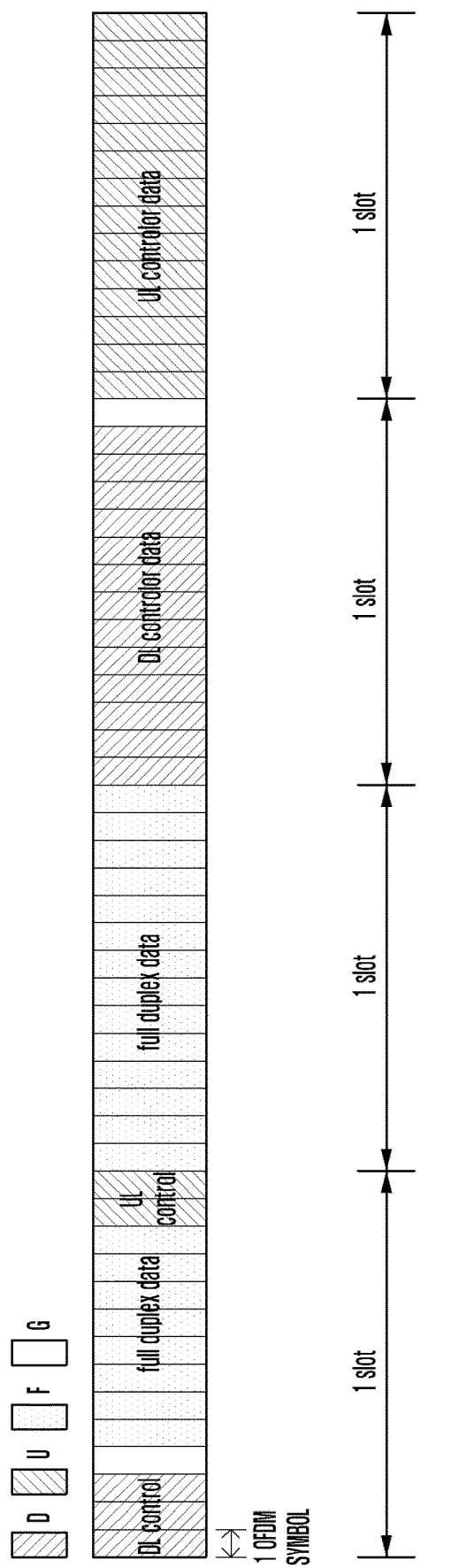
FIG. 32 shows a frame structure according to the present disclosure.

Alternatively, apparatus 3600 may determine resources for communication based on the allocated resources and frame structure information, and communicate on the determined resources. The frame structure is shown in FIG. 32. FIG. 32 shows a frame structure according to the present disclosure.

As shown in FIG. 32, resources in the frame structure are divided into downlink-only resources, uplink-only resources, full-duplex resources, and a guard interval. Where, downlink-only resources, indicated by D in FIG. 32, are allowed for downlink transmission only; uplink-only resources, indicated by U in FIG. 32, are allowed for uplink transmission only; full-duplex resources, indicated by F in FIG. 32, may be used for uplink transmission and downlink transmission simultaneously; and the guard interval, indicated by G in FIG. 32, is used for no transmission.

The base station 3500 may notify apparatus 3600 of the frame structure through signaling (e.g., RRC signaling or DCI). Alternatively, the base station 3500 may notify apparatus 3600 of information about the guard interval in the frame structure through a guard interval command. Upon receiving the signaling notifying the frame structure or the guard interval command from the base station 3500, apparatus 3600 may determine the resources remaining after subtracting resources corresponding to the guard interval from downlink resources in the allocated resources as resources for downlink reception, and determine resources remaining after subtracting resources corresponding to the guard interval from uplink resources in the allocated resources as resources for uplink transmission.

Next, the method shown in FIG. 28 will be described in more detail with reference to FIG. 30. FIG. 30 is a diagram showing a method 3000 of allocating resources by a base station 3500 for a plurality of apparatuses 3600 communicating with the base station 3500 according to the present disclosure.

In step S3010, the base station 3500 allocates reserved edge resources for apparatuses 3600 based on the level of the inter-apparatus interference.

The base station 3500 may reserve some edge resources (sub-carriers or OFDM symbols) as guard regions when allocating resources for apparatuses 3600, to reduce additional interference due to inter-apparatus time misalignment. This method does not require additional information exchange for obtaining location information or time differences of apparatuses, and can meanwhile effectively reduce the additional interference.

For example, if the resources allocated by the system for different apparatuses 3600 are orthogonal frequency divided, when allocating frequency domain resources for full duplex apparatuses 3600, the base station 3500 allocates downlink frequency domain resources continuously without reserving any guard region, and allocates uplink frequency domain resources discontinuously.

Allocation of frequency resources in an existing system (e.g., LTE, NR) is in unit of a Physical Resource Block (PRB), then the reserved guard regions when allocating uplink resources are also in unit of a physical resource block, and a minimum guard region is a physical resource block. In fact, if the inter-apparatus time difference is small, the inter-carrier interference is also small, so that there is no need to reserve a physical resource block as a guard region. In this case, the base station 3500 may indicate a number of reserved edge subcarriers when allocating uplink resources for apparatuses 3600. That is, some subcarriers at the edges (one end or both ends) of frequency domain resources allocated to different apparatuses 3600 are reserved as guard regions, as shown in FIG. 33. FIG. 33 shows a situation of resource allocation when orthogonal frequency divided resources are allocated for apparatuses 3600 according to the present disclosure.

Guard regions of different apparatuses 3600 in the system may use the same or different numbers of subcarriers. For convenience of scheduling and indication, the same number of subcarriers may be set preferably. The numbers of subcarriers in the guard regions depend on the inter-carrier interference caused by apparatuses 3600 to each other. If different apparatuses 3600 use different numbers of subcarriers as guard regions, it is necessary to ensure that the inter-carrier interference caused by apparatuses 3600 that are allocated adjacent frequency domain resources to each other are all smaller than a given threshold $I_{th1}$; and if different apparatuses 3600 use the same number of subcarriers as guard regions, it is necessary to ensure that the inter-carrier interference caused by any two apparatuses 3600 in the system that are allocated adjacent frequency domain resources to each other is smaller than a given threshold $I_{th2}$. In general, more subcarriers are reserved as guard regions when inter-carrier interference among apparatuses is large, and fewer subcarriers are reserved as guard regions when inter-carrier interference is small. A specific value of the number of reserved subcarriers may be determined by simulation.

For another example, if the resources allocated by the system for different apparatuses 3600 are orthogonal time divided, the base station 3500 may set the cyclic prefix of the first OFDM symbol of an apparatus 3600 to be null, or may set the first OFDM symbol to be null, to avoid interference to downlink reception of another apparatus 3600 when the OFDM symbol reaches the other apparatus 3600.

Then, the method 3000 proceeds to step S3020. In step S3020, the base station 3500 indicates the reserved edge resources to apparatuses 3600 through signaling.

The base station 3500 may designate reserved edge resources which are used as guard regions in signaling for allocating uplink resources for apparatuses 3600. For example, the base station 3500 may use N bits in Downlink Control Information (DCI) to indicate the number of reserved edge subcarriers, where N=1, 2, 3 . . . , or the base station 3500 may use M bits to indicate the number of reserved OFDM symbols, where M=1, 2, 3 . . . , or the base station 3500 may use 1 bit to indicate whether the cyclic prefix of the first OFDM symbol is a normal cyclic prefix or a null cyclic prefix.

Additionally or alternatively, the base station 3500 may predefine some modes for allocating reserved edge resources in the system, as shown in FIG. 34, and indicate the modes in signaling for allocating uplink resources for apparatuses 3600. FIG. 34 shows modes for reserving edge resources according to the present disclosure. In FIG. 34, mode m1 indicates that N subcarriers are reserved at only one end of the frequency band edges as a guard region; mode m2 indicates that N subcarriers are reserved at one end of the frequency band edges while the cyclic prefix of the first OFDM symbol is set to be a null cyclic prefix, to serve as a guard region; mode m3 indicates that N subcarriers are reserved at one end of the frequency band edges while one OFDM symbol is reserved, to serve as a guard region; mode m4 indicates that only one OFDM symbol is reserved as a guard region; and mode m5 sets a null cyclic prefix as a guard region. Herein, modes m1, m2 and m3 are applicable to the case of allocating orthogonal frequency divided resources for apparatuses 3600, while modes m4 and m5 are applicable to the case of allocating orthogonal time divided resources for apparatuses 3600. The base station 3500 may encode these modes m1-m5 and indicate the encoding to apparatuses 3600 in downlink control information (DCI) for allocating uplink resources.

It should be noted that FIG. 34 is only some examples of uplink resource allocation modes, and other uplink resource allocation modes may also be similarly encoded and notified. For example, subcarriers may be reserved at both ends of the frequency band edges as a guard region. Since the aforementioned additional interference due to inter-apparatus time misalignment only has a large impact on the edges of the allocated resources, the additional interference can be effectively resisted and the throughput of the whole system can be improved by reserving a guard region at the edges of the resources.

The base station 3500 may designate, for each apparatus 3600, reserved edge resources as a guard region in separate signaling for allocating uplink resources for the apparatus 3600.

Additionally or alternatively, the base station 3500 may notify apparatuses 3600 to reserve several edge subcarriers for the uplink as guard regions, or to reserve several OFDM symbols as guard regions, or to set a null cyclic prefix as a guard region, through apparatus group-specific signaling, for example, cell-specific control signaling or UE group-specific control signaling. Since there is no need to separately signal the reserved edge resources to each apparatus 3600, this method can further reduce signaling overhead.

As described above, the base station 3500 may notify each apparatus 3600 of the reserved edge resources used as the guard region through separate signaling respectively, or may notify all apparatuses 3600 within an apparatus group (e.g., all apparatuses within a cell or all UEs within a specific UE group) of the reserved edge resources used as guard regions through apparatus group-specific signaling, while the base station 3500 allocates uplink resources and downlink resources for apparatuses 3600 through a downlink control channel (PDCCH).

After an apparatus 3600 obtains reserved edge resources from the base station 3500 through separate signaling/apparatus group-specific signaling, and obtains resources scheduled (e.g., semi-persistently scheduled) by the base station 3500 for the apparatus 3600 through resource scheduling information in the downlink control channel, the apparatus 3600 may determine resources for communication, and communicate on the determined resources. Steps for the apparatus 3600 to determine resources for communication include: determining, by the apparatus 3600, downlink resources (e.g., downlink-only resources or full-duplex resources, where the full-duplex resources are resources that may be used for both uplink transmission and downlink reception simultaneously) scheduled by the base station indicated in the resource scheduling information as resources used by apparatus 3600 for downlink reception, or determining the resources remaining after subtracting the reserved edge resources indicated in the separate signaling/apparatus group-specific signaling from the downlink resources (downlink-only resources or full-duplex resources) scheduled by the base station indicated in the resource scheduling information as resources used by apparatus 3600 for downlink reception; furthermore, determining, by the apparatus 3600, the resources remaining after subtracting the reserved edge resources indicated in the separate signaling/apparatus group-specific signaling from the uplink resources (e.g., uplink-only resources or full-duplex resources) scheduled by the base station indicated in the resource scheduling information as resources used by the apparatus 3600 for uplink transmission.

Alternatively, apparatus 3600 may determine resources for communication based on reserved edge resources, resources scheduled by the base station 3500 for the apparatus 3600 and frame structure information, and communicate on the determined resources. The frame structure is shown in FIG. 32 and will not be described here again.

As mentioned above, the base station 3500 may notify apparatus 3600 of the frame structure through signaling (e.g., RRC signaling or DCI). Alternatively, the base station 3500 may notify the apparatus 3600 of information about the guard interval in the frame structure through a guard interval command. Upon receiving the signaling notifying the frame structure or the guard interval command from the base station 3500, apparatus 3600 may determine the resources for communication by the following steps: determining the resources remaining after subtracting resources corresponding to the guard interval from downlink resources (e.g., downlink-only resources or full-duplex resources) scheduled by the base station indicated in the resource scheduling information as resources for downlink reception, or determining the resources remaining after subtracting both the reserved edge resources and the resources corresponding to the guard interval from the downlink resources (e.g., downlink-only resources or full-duplex resources) scheduled by the base station indicated in the resource scheduling information as resources for downlink reception; and, determining the resource remaining after subtracting both the reserved edge resources and the resources corresponding to the guard interval from the uplink resources (e.g., uplink-only resources or full-duplex resources) scheduled by the base station indicated in the resource scheduling information as resources for uplink transmission.

FIG. 35 is a block diagram showing a structure of a base station 3500 according to the present disclosure.

Referring to FIG. 35, the base station 3500 includes a transceiver 3510 and a controller 3520. The transceiver 3510 is configured to transmit and receive signals. The controller 3520 is configured to allocate resources for a plurality of apparatuses 3600 communicating with the base station 3500 based on a level of inter-apparatus interference among the plurality of apparatuses 3600, and to control the transceiver 3510 to indicate the allocated resources to the plurality of apparatuses 3600.

FIG. 36 is a block diagram showing a structure of an apparatus 3600 according to the present disclosure.

Referring to FIG. 36, the apparatus 3600 includes a transceiver 3610 and a controller 3620. The transceiver 3610 is configured to transmit signals and receive signals. The controller 3620 is configured to acquire, from signaling from the base station 3500, resources allocated for the apparatus 3600 based on a level of inter-apparatus interference between the apparatus 3600 and a plurality of apparatuses 3600 communicating with the base station 3500 by the base station 3500, and to control the transceiver 3610 to communicate based on the allocated resources.

The apparatus 3600 may be a user terminal communicating with the base station 3500, an integrated access and backhaul (IAB) node communicating with the base station, or a mobile terminal (MT) module of the IAB node.

Various embodiments of the present disclosure may be implemented as computer readable codes embodied on a computer readable recording medium from a specific perspective. The computer readable recording medium is any data storage device that can store data readable by a computer system. Examples of the computer-readable recording medium may include read only memory (ROM), random access memory (RAM), optical disk read only memory (CD-ROM), magnetic tape, floppy disk, optical data storage device, carrier (e.g., data transmission via the Internet), and the like. The computer readable recording medium may be distributed through computer systems connected via a network, and thus the computer readable codes may be stored and executed in a distributed manner. Moreover, functional programs, codes, and code segments for implementing various embodiments of the present disclosure may be easily interpreted by those skilled in the art to which the embodiments of the present disclosure are applied.

It will be understood that embodiments of the present disclosure may be implemented in hardware, software, or combination of hardware and software. The software may be stored as program instructions or computer readable codes executable on a processor on a non-transitory computer readable medium. Examples of the non-transitory computer readable recording medium include magnetic storage media (e.g., ROM, floppy disk, hard disk, etc.) and optical recording media (e.g., CD-ROM, digital video disk (DVD), etc.). The non-transitory computer readable recording medium may also be distributed across network-coupled computer systems such that the computer readable codes are stored and executed in a distributed manner. The medium may be read by a computer, stored in a memory, and executed by a processor. Various embodiments may be implemented by a computer or a portable terminal including a controller and a memory, and the memory may be an example of a non-transitory computer readable recording medium adapted to store a program(s) having instructions to implement embodiments of the present disclosure. The present disclosure may be implemented by a program having codes for embodying the apparatuses and methods described in the claims, which is stored in a machine (or computer) readable storage medium. The program may be electronically carried on any medium, such as a communication signal transmitted via a wired or wireless connection, and the present disclosure suitably includes equivalents thereof.

What has been described above is only detailed description of the present disclosure, the protection scope of the present disclosure is not limited to this. Any skilled in the art can make various changes or substitutions within the technical scope disclosed by the present disclosure, and these changes or substitutions should fall within the protection scope of the present disclosure. Therefore, the protection scope of the present disclosure should be based on the protection scope of the claims.

The invention claimed is:

1. A method performed by a user equipment (UE) in a communication systems, the method comprising:
    receiving, from a base station, downlink reference signals;
    identifying at least one first category downlink reference signal among the downlink reference signals and at least one second category downlink reference signal among the downlink reference signals;
    obtaining interference strength information on a difference between an average power of symbols corresponding to the at least one first category downlink reference signal and an average power of symbols corresponding to the at least one second category downlink reference signal; and
    reporting, to the base station, the interference strength information,
    wherein each of the at least one first category downlink reference signal is a downlink reference signal received on a time frequency resource configured for full duplex on which an uplink transmission is scheduled, and each of the at least one second category downlink reference signal is a downlink reference signal received on a time frequency resource configured for the full duplex on which an uplink transmission is not scheduled.

2. The method of claim 1, further comprising:
    receiving, from the base station, information including a configuration mode of the downlink reference signals, a duration of the configuration mode, and an initial location of the configuration mode,
    wherein the identification is based on the information.

3. The method of claim 2, wherein the information further includes a number of the at least one first category downlink reference signal in a period, a number of the at least one second category downlink reference signal in the period, and an order of the at least one first downlink reference signal and the at least one second category downlink reference signal in the period.

4. The method of claim 1, wherein the interference strength information indicates:
    a quantized value of the difference between the average power of the symbols corresponding to the at least one first category downlink reference signal and the average power of the symbols corresponding to the at least one second category downlink reference signal.

5. A method performed by a base station in a communication system, the method comprising:
    transmitting, to a user equipment (UE), downlink reference signals including at least one first category downlink reference signal and at least one second category downlink reference signal, wherein each of the first category downlink reference signal is a downlink reference signal transmitted on a time frequency resource configured for full duplex on which an uplink transmission is scheduled, and each of the second category downlink reference signal is a downlink reference signal transmitted on a time frequency resource configured for the full duplex on which an uplink transmission is not scheduled;

receiving, from the UE, interference strength information on a difference between an average power of symbols corresponding to the at least one first category downlink reference signal and an average power of symbols corresponding to the at least one second category downlink reference signal; and updating an interference strength table associated with a plurality of UEs including the UE based on the interference strength information.

6. The method of claim 5, further comprising:
scheduling, based on the interference strength table, at least one of uplink transmission or downlink transmission for a pair of UEs on a same time frequency resource,
wherein the pair of UEs are identified among the plurality of UEs based on co-channel interference between the pair of UEs.

7. The method of claim 5, further comprising:
transmitting, to the UE, information including indicating a configuration mode of the downlink reference signals, a duration of the configuration mode, and an initial location of the configuration mode,
wherein the information is associated with whether each of the downlink reference signals is the first category downlink reference signal or the second category downlink reference signal.

8. The method of claim 7, wherein the information further includes a number of the at least one first category downlink reference signal in a period, a number of the at least one second category downlink reference signal in the period, and an order of the at least one first downlink reference signal and the at least one second category downlink reference signal in the period.

9. A user equipment (UE) in a communication system, the UE comprising:
a transceiver; and
a processor coupled with the transceiver and configured to:
receive, from a base station, downlink reference signals;
identify at least one first category downlink reference signal among the downlink reference signals and at least one second category downlink reference signal among the downlink reference signals;
obtain interference strength information on a difference between an average power of symbols corresponding to the at least one first category downlink reference signal and an average power of symbols corresponding to the at least one second category downlink reference signal; and
report, to the base station, the interference strength information,
wherein each of the at least one first category downlink reference signal is a downlink reference signal received on a time frequency resource configured for full duplex on which an uplink transmission is scheduled, and each of the at least one second category downlink reference signal is a downlink reference signal received on a time frequency resource configured for the full duplex on which an uplink transmission is not scheduled.

10. The UE of claim 9, wherein the processor is further configured to:
receive, from the base station, information including a configuration mode of the downlink reference signals, a duration of the configuration mode, and an initial location of the configuration mode,
wherein the identification is based on the information.

11. The UE of claim 10, wherein the information further includes a number of the at least one first category downlink reference signal in a period, a number of the at least one second category downlink reference signal in the period, and an order of the at least one first downlink reference signal and the at least one second category downlink reference signal in the period.

12. The UE of claim 9, wherein the interference strength information indicates:
a quantized value of the difference between the average power of the symbols corresponding to the at least one first category downlink reference signal and the average power of the symbols corresponding to the at least one second category downlink reference signal.

13. A base station in a communication system, the base station comprising:
a transceiver; and
a processor coupled with the transceiver and configured to:
transmit, to a user equipment (UE), downlink reference signals including at least one first category downlink reference signal and at least one second category downlink reference signal, wherein each of the first category downlink reference signal is a downlink reference signal transmitted on a time frequency resource configured for full duplex on which an uplink transmission is scheduled, and each of the second category downlink reference signal is a downlink reference signal transmitted on a time frequency resource configured for the full duplex on which an uplink transmission is not scheduled;
receive, from the UE, interference strength information on a difference between an average power of symbols corresponding to the at least one first category downlink reference signal and an average power of symbols corresponding to the at least one second category downlink reference signal; and
update an interference strength table associated with a plurality of UEs including the UE based on the interference strength information.

14. The base station of claim 13, wherein the processor is further configured to:
schedule, based on the interference strength table, at least one of uplink transmission or downlink transmission for a pair of UEs on a same time frequency resource,
wherein the pair of UEs are identified among the plurality of UEs based on co-channel interference between the pair of UEs.

15. The base station of claim 13, wherein the processor is further configured to:
transmit, to the UE, information including indicating a configuration mode of the downlink reference signals, a duration of the configuration mode, and an initial location of the configuration mode, wherein the information is associated with whether each of the downlink reference signals is the first category downlink reference signal or the second category downlink reference signal.

16. The base station of claim 15, wherein the information further includes a number of the at least one first category downlink reference signal in a period, a number of the at least one second category downlink reference signal in the period, and an order of the at least one first downlink reference signal and the at least one second category downlink reference signal in the period.

* * * * *